United States Patent
Lee et al.

(10) Patent No.: US 10,935,752 B2
(45) Date of Patent: Mar. 2, 2021

(54) LENS DRIVING DEVICE, AND CAMERA MODULE AND OPTICAL DEVICE, WHICH INCLUDE SAME

(71) Applicant: LG INNOTEK CO., LTD., Seoul (KR)

(72) Inventors: Kap Jin Lee, Seoul (KR); Sang Ok Park, Seoul (KR); Seung Taek Shin, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 96 days.

(21) Appl. No.: 16/319,141

(22) PCT Filed: Jul. 11, 2017

(86) PCT No.: PCT/KR2017/007397
§ 371 (c)(1),
(2) Date: Jan. 18, 2019

(87) PCT Pub. No.: WO2018/016789
PCT Pub. Date: Jan. 25, 2018

(65) Prior Publication Data
US 2020/0049939 A1   Feb. 13, 2020

(30) Foreign Application Priority Data

Jul. 21, 2016 (KR) .................. 10-2016-0092607
Aug. 1, 2016 (KR) .................. 10-2016-0097981

(51) Int. Cl.
*G02B 7/10* (2021.01)
*G02B 13/00* (2006.01)
*H04N 5/225* (2006.01)

(52) U.S. Cl.
CPC .............. *G02B 7/10* (2013.01); *G02B 13/001* (2013.01); *H04N 5/2254* (2013.01)

(58) Field of Classification Search
CPC .... H04N 5/238; H04N 5/2253; H04N 5/2254; H04N 5/2257; G02B 7/102;
(Continued)

(56) References Cited

U.S. PATENT DOCUMENTS

| 5,682,097 A | 10/1997 | Bryant et al. |
| 2003/0198148 A1* | 10/2003 | Choi .................... G11B 7/0933 369/44.16 |

(Continued)

FOREIGN PATENT DOCUMENTS

| CN | 1933303 A | 3/2007 |
| CN | 1940698 A | 4/2007 |

(Continued)

OTHER PUBLICATIONS

Supplementary European Search Report dated Nov. 22, 2019 in European Application No. 17831262.5.
(Continued)

*Primary Examiner* — Dawayne Pinkney
(74) *Attorney, Agent, or Firm* — Saliwanchik, Lloyd & Eisenschenk

(57) ABSTRACT

An embodiment comprises: a housing; a bobbin, disposed in the housing, for mounting a lens; a first coil arranged on an outer circumferential surface of the bobbin; a magnet arranged in the housing; a second coil arranged in the housing; and a magnetic member, which is attached to the second coil and increases the strength of an induction voltage induced to the second coil by means of an interaction according to a movement of the first coil.

20 Claims, 46 Drawing Sheets

(58) Field of Classification Search
CPC ........ G02B 15/173; G02B 7/10; G02B 7/021; G02B 7/04; G02B 7/08; G02B 27/646; G03B 3/10; G03B 3/14; G03B 2205/0007; G03B 2205/0069; G11B 7/0932
USPC ........ 359/694, 811–830, 696, 676, 699–701, 359/557; 396/133, 137; 348/374
See application file for complete search history.

(56) References Cited

U.S. PATENT DOCUMENTS

| | | |
|---|---|---|
| 2008/0304154 A1 | 12/2008 | Lee |
| 2012/0014002 A1 | 1/2012 | Ollila et al. |
| 2013/0027600 A1* | 1/2013 | Pavithran ............ H04N 5/2171 348/335 |
| 2013/0089311 A1 | 4/2013 | Jung et al. |
| 2014/0355120 A1* | 12/2014 | Yeo ........................ G03B 3/10 359/557 |
| 2015/0207983 A1 | 7/2015 | Kang et al. |
| 2016/0198070 A1* | 7/2016 | Nakano ................ H04N 5/2252 348/374 |
| 2019/0033614 A1* | 1/2019 | Jung ....................... G02B 7/08 |

FOREIGN PATENT DOCUMENTS

| | | | |
|---|---|---|---|
| CN | 102111056 | A | 6/2011 |
| CN | 102884782 | A | 1/2013 |
| CN | 104267559 | A | 1/2015 |
| CN | 204405924 | U | 6/2015 |
| CN | 104902149 | A | 9/2015 |
| CN | 104902150 | A | 9/2015 |
| CN | 104937482 | A | 9/2015 |
| CN | 105607383 | A | 5/2016 |
| CN | 105717726 | A | 6/2016 |
| JP | H05-093841 | A | 4/1993 |
| JP | 2015-191213 | A | 11/2015 |
| KR | 10-0965913 | B1 | 6/2010 |
| KR | 10-1069619 | B1 | 10/2011 |
| KR | 10-1421223 | B1 | 7/2014 |
| KR | 10-2015-0097998 | | 8/2015 |
| KR | 10-2016-0001577 | A | 1/2016 |
| WO | WO-2015102382 A1 * | 7/2015 | ......... H02K 41/0356 |

OTHER PUBLICATIONS

International Search Report dated Oct. 18, 2017 in International Application No. PCT/KR2017/007397.
Notice of Allowance dated Oct. 30, 2020 in Chinese Application No. 201780044818.5, along with its English translation.

* cited by examiner

LENS DRIVING DEVICE, AND CAMERA MODULE AND OPTICAL DEVICE, WHICH INCLUDE SAME

CROSS-REFERENCE TO RELATED APPLICATIONS

This application is the U.S. national stage application of International Patent Application No. PCT/KR2017/007397, filed Jul. 11, 2017, which claims the benefit under 35 U.S.C. § 119 of Korean Application Nos. 10-2016-0092607, filed Jul. 21, 2016, and 10-2016-0097981, filed Aug. 1, 2016, the disclosures of each of which are incorporated herein by reference in their entirety.

TECHNICAL FIELD

Embodiments relate to a lens moving apparatus and to a camera module and an optical device each including the same.

BACKGROUND ART

Cellular phones and smartphones are being continually developed, on each of which a camera module, functioning to take an image or moving image of an object and to store the image or moving image, is mounted. Typically, a camera module may include a lens, an image sensor module and a voice coil motor (VCM) which controls the spacing between the lens and the image sensor module.

In the case of a camera module configured to be mounted in a small electronic product, such as a smart phone, the camera module may frequently receive shocks when in use, and may undergo fine shaking due to, for example, the shaking of a user's hand. In consideration of this fact, there is a demand for the development of technology enabling a device for inhibiting handshake to be additionally installed to a camera module.

DISCLOSURE

Technical Problem

The embodiments provide a lens moving apparatus capable of suppressing malfunction of OIS operation attributable to drive signals of a first coil, error in output of a position sensor or noise generation in output of an image sensor, and a camera module and an optical device each including the lens moving apparatus.

Furthermore, the embodiments provide a lens moving apparatus capable of realizing an increase in induction voltage generated in a second coil and reduction in thickness, and a camera module and an optical instrument including the lens moving apparatus.

Technical Solution

A lens moving apparatus according to an embodiment includes a housing; a bobbin disposed in the housing, to which a lens is mounted; a first coil disposed on an outer peripheral surface of the bobbin; a magnet disposed on the housing; a second coil disposed on the housing; and a magnetic member attached to the second coil so as to increase an intensity of an induction voltage induced to the second coil by virtue of interaction with the first coil upon movement of the first coil.

The housing may include a mounting portion, the mounting portion including a support surface positioned under a peripheral region of an upper surface of the housing and having a height difference with respect to the upper surface in an optical-axis direction; and a side surface positioned between the upper surface and the support surface, wherein the magnetic member and the second coil are disposed on the mounting portion.

Each of the second coil and the magnetic member may have a ring shape.

The second coil may be disposed above the magnetic member.

The magnetic member may be disposed above the second coil.

The magnetic member may surround a side portion of the second coil.

The second coil may surround a side portion of the magnetic member.

The magnetic member may include a plurality of magnetic segments disposed on a side portion of the housing so as to be spaced apart from each other.

A lens moving apparatus according to another embodiment includes a housing; a bobbin disposed in the housing, to which a lens is mounted; a first coil disposed on an outer peripheral surface of the bobbin; a magnet disposed on a side portion of the housing; a base disposed under the housing; a second coil disposed on the base; and a magnetic member attached to the second coil so as to increase an intensity of an induction voltage induced to the second coil by virtue of interaction with the first coil upon movement of the first coil.

The base may include a groove formed in an outer surface thereof, and the second coil may be disposed in the groove.

Advantageous Effects

Embodiments are capable of suppressing malfunction of OIS operation attributable to drive signals of a first coil, error in output of a position sensor and noise generation in output of an image sensor.

Furthermore, embodiments are capable of realizing increase in the induction voltage generated in a second coil and a reduction in thickness.

DESCRIPTION OF DRAWINGS

FIG. 4 is an assembled perspective view of a housing, magnets and a circuit board, which are illustrated in FIG. 3a;

BEST MODE

Figure 1:
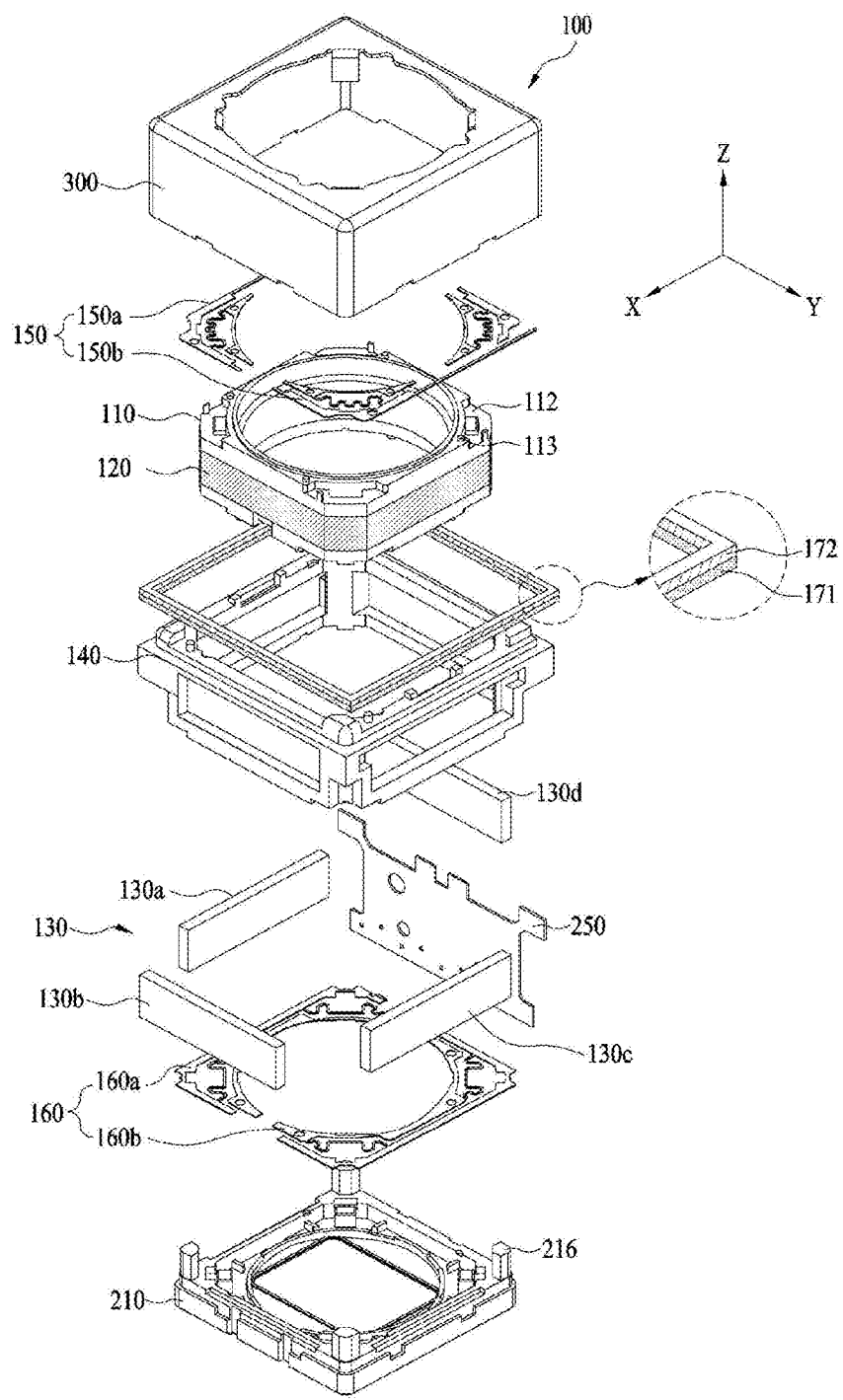
FIG. 1 is an exploded perspective view illustrating a lens moving apparatus according to an embodiment.

Hereinafter, embodiments will be clearly revealed via description thereof with reference to the accompanying drawings. In the following description of the embodiments, it will be understood that, when an element such as a layer (film), region, pattern, or structure is referred to as being "on" or "under" another element, it can be "directly" on or under another element or can be "indirectly" formed such that an intervening element may also be present. In addition, it will also be understood that the criteria for "on" or "under" are determined on the basis of the drawings.

In the drawings, the dimensions of layers are exaggerated, omitted or illustrated schematically for clarity and convenience of description. In addition, the dimensions of constituent elements do not entirely reflect the actual dimensions. Wherever possible, the same reference numbers will be used throughout the drawings to refer to the same or like parts.

For the convenience of description, although the lens moving apparatus is described using a rectangular coordinate system (x, y, z), the lens moving apparatus may be described using some other coordinate systems, and the embodiment is not limited thereto. In the respective drawings, the X-axis and the Y-axis mean directions perpendicular to an optical axis, i.e. the Z-axis, and the optical axis (Z-axis) direction or a direction parallel to the optical axis may be referred to as a "first direction", the X-axis direction may be referred to as a "second direction", and the Y-axis direction may be referred to as a "third direction".

A "handshake correction device", which is applied to a subminiature camera module of a mobile device such as, for example, a smart phone or a tablet PC, may be a device that is configured to inhibit the contour line of a captured image from being indistinctly formed due to vibration caused by shaking of the user's hand when capturing a still image.

In addition, an "auto-focusing device" is a device that automatically focuses an image of a subject on an image sensor surface. The handshake correction device and the auto-focusing device may be configured in various ways, and the lens moving apparatus according to the embodiment may move an optical module, which is constituted of at least one lens, in the first direction, which is parallel to the optical axis, or relative to a plane defined by the second and third directions, which are perpendicular to the first direction, thereby performing handshake correction motion and/or auto-focusing.

FIG. 1 is an exploded perspective view of a lens moving apparatus 100 according to an embodiment.

Referring to FIG. 1, the lens moving apparatus may include a bobbin 110, a first coil 120, magnets 130, a housing 140, an upper elastic member 150, a lower elastic member 160, a magnetic member 171, a second coil 172 and a circuit board 250. The lens moving apparatus 100 may further include a cover member 300 and a base 210. Hereinafter, the "magnetic member" may be represented as a "magnetic reinforcing member".

First, the cover member 300 will be described.

The cover member 300 accommodates the components 110, 120, 130, 140, 150, 160 and 250, in the space defined between the cover member 300 and the base 210.

The cover member 300 may take the form of a box, which has an open bottom and includes a top plate and a side plate. The bottom of the cover member 300 may be coupled to the top of the base 210. The upper end portion of the cover member 300 may have a polygonal shape, such as, for example, a square or octagonal shape.

The cover member 300 may have an opening or bore formed in the top plate thereof in order to expose a lens (not shown), coupled to the bobbin 110, to outside light. In addition, the opening or bore of the cover member 300 may be provided with a window formed of a light-transmitting material, in order to inhibit impurities, such as, for example, dust or moisture, from entering a camera module.

Although the material of the cover member 300 may be a non-magnetic material such as, for example, SUS in order to inhibit the cover member 300 from being attracted by the magnets 130, the cover member 300 may be formed of a magnetic material, and may function as a yoke.

Next, the bobbin 110 will be described.

The bobbin 110 is positioned inside the housing 140, and is movable in the direction of the optical axis or in the first direction (for example, in the Z-axis direction), via electromagnetic interaction between the coil 120 and the magnets 130.

Although a lens may be directly mounted on the bobbin, the disclosure is not limited thereto. In another embodiment, the bobbin 110 may include a lens barrel (not shown) in which at least one lens is installed. The lens barrel may be coupled inside the bobbin 110 in various manners.

The bobbin 110 may be configured to have an opening or bore for mounting the lens or the lens barrel. The opening or bore of the bobbin 110 may have a shape that coincides with that of a lens or a lens barrel which is mounted therein, for example, a circular, elliptical, or polygonal shape, without being limited thereto.

The bobbin 110 may include at least one upper support protrusion 113, which is disposed on the upper surface thereof and is coupled and secured to a first inner frame 151 of the upper elastic member 150, and at least one lower support protrusion (not shown), which is disposed on the lower surface thereof and is coupled and secured to a second inner frame 161 of the lower elastic member 160.

The bobbin 110 may include an upper escape recess 112, which is provided in a region of the upper surface thereof so as to correspond to or be aligned with a connecting portion 153 of the upper elastic member 150. Furthermore, the bobbin 110 may include a lower escape recess (not shown), which is provided in a region of the lower surface thereof so as to correspond to or be aligned with a connecting portion 163 of the lower elastic member 150. In another embodiment, by designing the connecting portion of the upper elastic member and the bobbin so as to inhibit interference therebetween, the upper escape recess and/or the lower escape recess of the bobbin may not be provided.

The bobbin 110 may be provided in the outer peripheral surface thereof with at least one groove (not shown), in which the first coil 120 is disposed or mounted. The first coil 120 may be disposed or mounted in the recess formed in the outer peripheral surface of the bobbin 110. The shape and number of recess may correspond to the shape and number of first coil disposed on the outer peripheral surface of the bobbin 110. In another embodiment, the bobbin 110 may not include the coil-mounting groove, and the first coil 120 may be directly wound around the outer peripheral surface of the bobbin 110, and may be secured thereto.

Next, the first coil 120 will be described.

The first coil 120 may be a drive coil, which is disposed on the outer peripheral surface of the bobbin 110 so as to perform electromagnetic interaction with the magnets 130 disposed on the housing 140. In order to create electromagnetic force through electromagnetic interaction with the magnets 130, a drive signal (for example, drive current or voltage) may be applied to the first coil 120.

For example, the drive signal may include an AC signal (for example, pulse with modulation (PWM)), or AC and DC signals.

An AF movable unit may be moved in the first direction by virtue of electromagnetic force resulting from the electromagnetic interaction between the first coil 120 and the magnets 130. By controlling a drive signal applied to the first coil 120 and thus controlling electromagnetic force, it is possible to control the movement of the movable unit in the first direction, thereby performing an autofocus function.

The AF movable unit may include the bobbin 110, which is elastically supported by the upper and lower elastic members 150 and 160, and components, which are mounted on the bobbin 110 and are moved therewith. For example, the AF movable unit may include the bobbin 110 and the first coil 120. The AF movable unit may further include a lens (not shown) mounted on the bobbin 110.

The first coil 120 may be wound around the outer peripheral surface of the bobbin 110 in a clockwise or counterclockwise direction about the optical axis. In another embodiment, the first coil 120 may be embodied as a coil ring, which is wound in a clockwise or counterclockwise direction about an axis perpendicular to the optical axis. Although the number of coil ring may be equal to the number of magnets 130, the disclosure is not limited thereto.

The first coil 120 may be conductively connected to at least one of the upper and lower elastic members 150 and 160.

Next, the housing 140 will be described.

Figure 2:
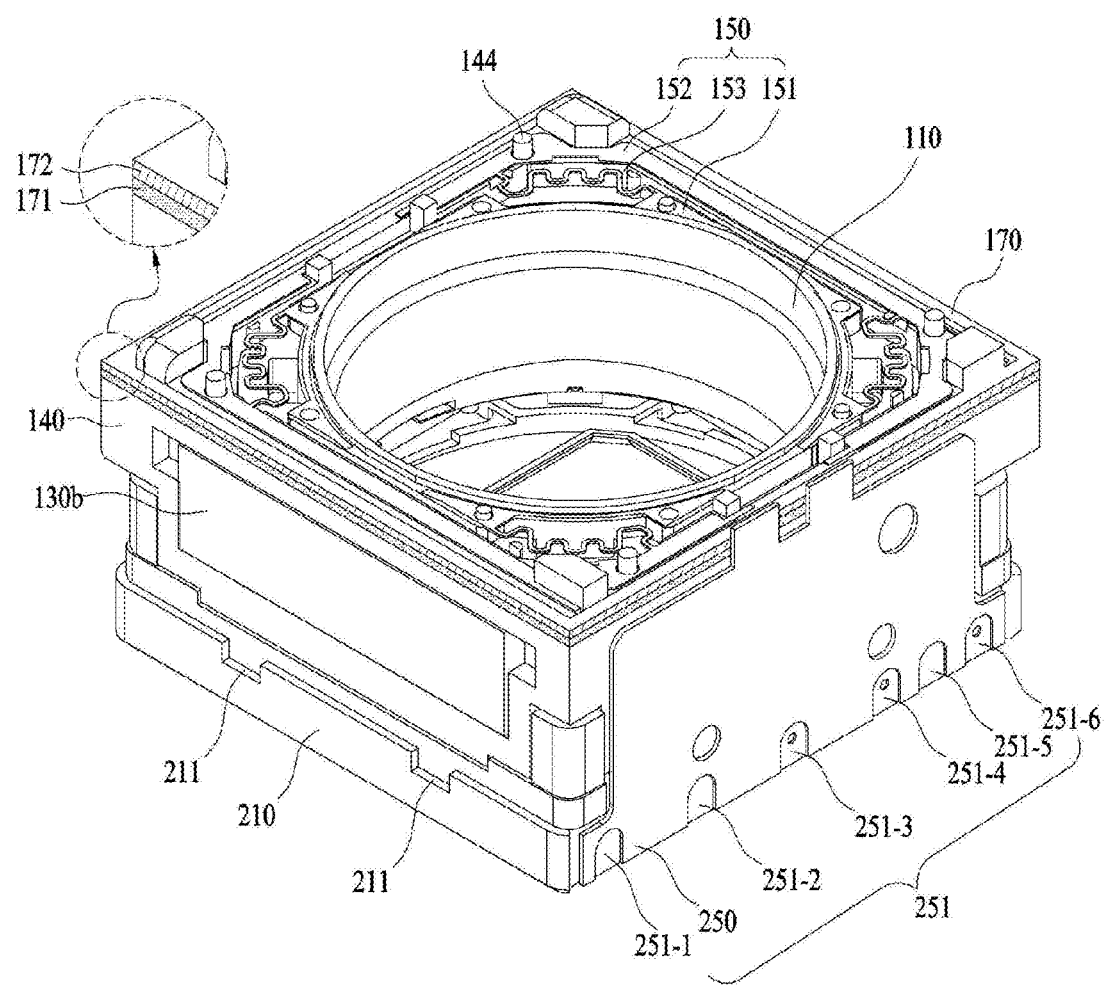
FIG. 2 is an assembled perspective view of FIG. 1, from which a cover is removed.
Figure 3A:
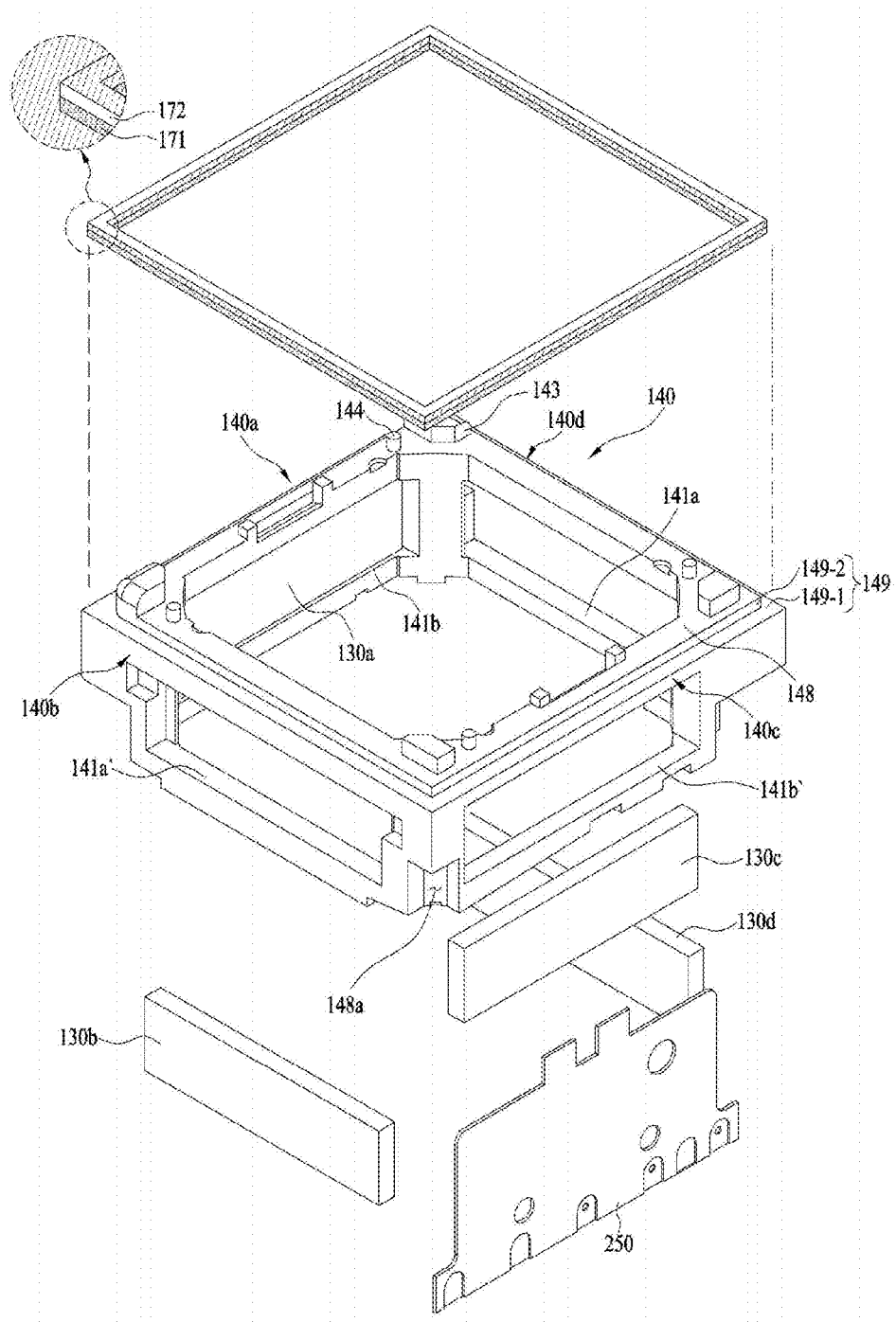
FIGS. 3a to 3e show the disposition of a magnetic member and a second coil, according to embodiments.
Figure 4:
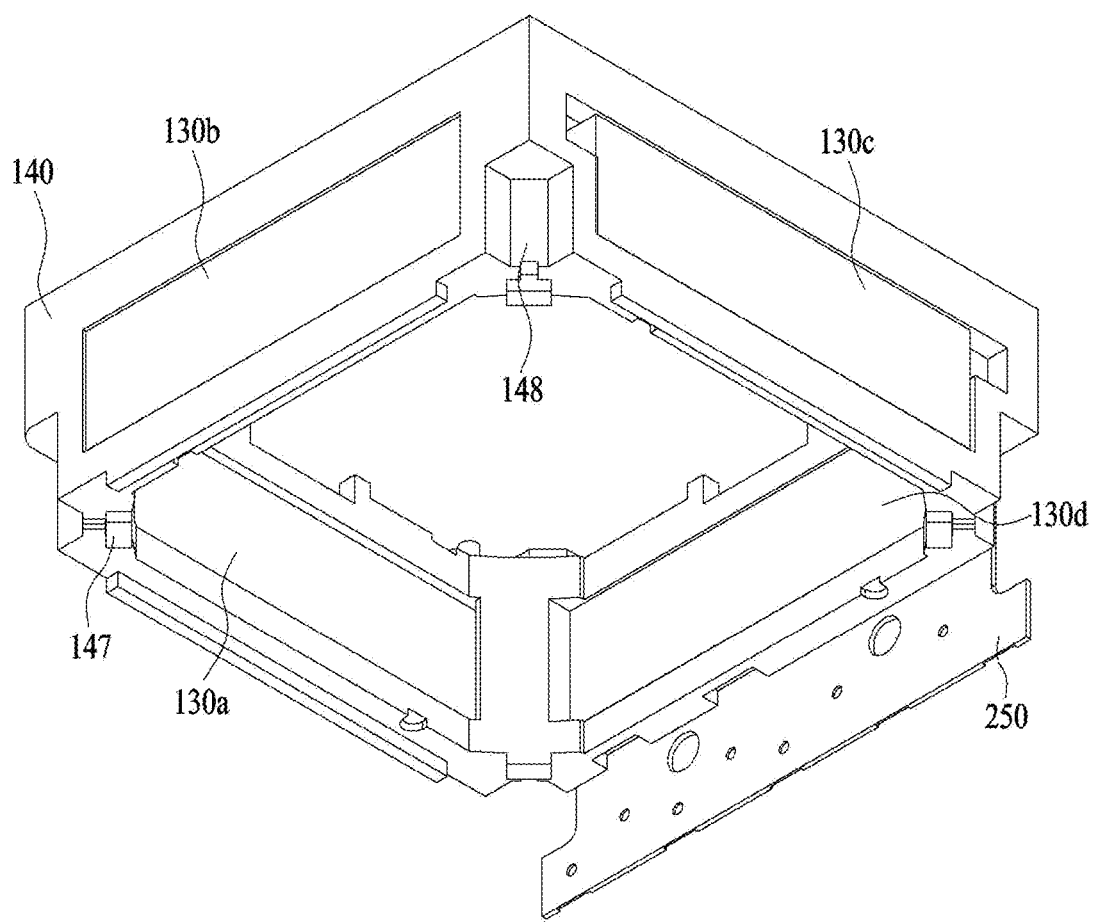

FIG. 2 is an assembled perspective view of FIG. 1, from which the cover 300 is removed. FIG. 3a is an exploded perspective view of the housing 140, the magnets 130, the magnetic member 171, the second coil 172 and the circuit board 250, which are illustrated in FIG. 1. FIG. 4 is an assembled perspective view of the housing 140, the magnets 130 and the circuit board 250, which are illustrated in FIG. 3a.

Referring to FIGS. 2 to 4, the housing 140 accommodates the bobbin 110 therein, and supports the magnets 130, the magnetic member 171 and the second coil 172. The housing 140 may secure or support the circuit board 250.

The housing 140 may be configured to have a hollow column shape overall.

For example, the housing 140 may include a plurality of side sections 140a to 140d and corner portions disposed between the side sections 140a to 140d, and may include an opening or bore having a polygonal shape (for example, a square or octagonal shape) or circular shape.

The side sections 140a to 140d of the housing 140 may include magnet grooves 141a, 141a', 141b and 141b', in which the magnets 130 are mounted, disposed or secured. Although each of the magnet grooves 141a, 141a', 141b and 141b' is illustrated as being a through hole in FIG. 3a, the closure is not limited thereto, and the magnet groove may be a recess. In another embodiment, the magnet grooves may not be provided.

The housing 140 may include a first stopper 143, which protrudes from the upper surface thereof.

The first stopper 143 of the housing 140, which is intended to inhibit the cover member 300 from colliding with the housing 140, is able to inhibit the upper surface of the housing 140 from directly colliding with the upper and inner surface of the cover member 300 in the event of external shocks.

The upper surface 148 of the housing 140, for example, the upper surfaces of the side sections 140a to 140d, may be provided with a plurality of upper frame support protrusions 144, to which the first outer frame 152 of the upper elastic member 150 is coupled. The lower surface of the housing 140 may be provided with a plurality of lower frame support protrusions 147, to which the second outer frame 162 of the lower elastic member 160 is coupled.

The lower ends of the corners of the side sections 140a to 140d of the housing 140 may further be provided with lower guide grooves 148a, to which guide members 216 of the base 210 are fitted, fastened or coupled.

The peripheral regions of the upper surface 148 of the housing 140, for example, the peripheral regions of the upper surfaces of the side sections 140a to 140d, may be provided with a mounting portion 149, on which the magnetic member 171 and the second coil 172 are mounted.

The mounting portion 149 of the housing 140 may be positioned at the peripheral region of the upper surface 148 of the housing 140 that is adjacent to the edge at which the upper surfaces of the side sections 140a to 140d meet the side surfaces of the side sections 140a to 140d.

A height difference may be provided between the mounting portion 149 and the upper surface 148 of the housing 149 in the vertical or first direction.

For example, the mounting portion 149 of the housing 140 may include a support surface 149-1, which is positioned under the edge of the upper surface 148 of the housing 140, and a side surface 149-2, which is positioned between the upper surface 148 of the housing 140 and the support surface 148-2 of the mounting portion 149. A height difference may be present between the support surface 149-1 of the mounting portion 149 and the upper surface 148 of the housing 140 in the first direction. Although the height difference between the support surface 149-1 of the mounting portion 149 and the upper surface 148 of the housing 140 may be greater than or equal to, for example, the sum of the thickness of the magnetic member 171 and the thickness of the second coil 172, the disclosure is not limited thereto. Although the angle defined between the support surface 149-1 and the side surface 149-2 of the mounting portion 149 may be a right angle, the disclosure is not limited thereto.

Next, the magnetic member 171 and the second coil 172 will be described.

The magnetic member 171 and the second coil 172 are disposed on the housing 140 so as to be spaced apart from the first coil 120. For example, the magnetic member 171 and the second coil 172 may be secured to the housing by means of an adhesive member. The magnetic member 171 may also be referred to as a "core".

The magnetic member 171 may increase the intensity of the induction voltage induced to the second coil 172 by virtue of interaction with the first coil 120 upon movement of the first coil 120.

For example, the magnetic member 171 may be disposed so as to be spaced apart from the magnets 130 and to surround the peripheral region of the upper surface of the housing 140 or the upper end of the side sections of the housing 140. The second coil 172 may be disposed so as to be spaced apart from the magnets 130 and to surround the upper surface of the housing 140 or the upper ends of the side sections of the housing 140 in the state of being in contact with the magnetic member 171.

Although the magnetic member 171 may be disposed at an outer region of the housing 140, the disclosure is not limited thereto. In another embodiment, the magnetic member 171 may also be disposed an inner region of the housing 140.

The second coil 172 may be disposed on the magnetic member 171, and the lower surface of the second coil 172 may be in contact with the upper surface of the magnetic member 171.

For example, the magnetic member 171 and the second coil 172 may be disposed on the mounting portion 149 of the housing 140.

Referring to FIG. 3a, the magnetic member 171 may be disposed on the mounting portion 149 of the housing 140, and the second coil 172 may be disposed on the magnetic member 171. For example, the lower surface of the magnetic member 171 may be in contact with the support surface 149-1 of the mounting portion 149 of the housing 140, and the lower surface of the second coil 172 may be in contact with the upper surface of the magnetic member 171. In another embodiment, the magnetic member 171 may be disposed under the second coil 172 in the state of being spaced apart from the second coil 172. In this case, various positional relationships therebetween are illustrated in FIGS. 3a to 3e.

For example, the magnetic member 171 may be configured to have a closed loop shape, for example, a ring shape, which surrounds the side surface 149-2 of the mounting portion 149 of the housing 140.

The second coil 172 may be wound about the optical axis in a clockwise or counterclockwise direction so as to form a ring shape. For example, the second coil 172 may be configured to have a closed loop shape, for example, a ring shape, which surrounds the side surface 149-2 of the mounting portion 149 of the housing 140. The magnetic member 171 and the second coil 172 may come into contact with the side surface 149-2 of the mounting portion 149 of the housing 140.

Although the second coil 172 and the magnetic member 171 may have, for example, shapes that, which correspond to each other or are identical to each other, the disclosure is not limited thereto.

For example, the second coil 172 and the magnetic member 171 may overlap each other in the optical-axis direction or in the first direction.

Furthermore, the second coil 172 and the magnetic member 171 may not overlap each other in a direction perpendicular to the optical axis.

Although the second coil 172 and the magnetic member 171 may overlap the magnets 130 in the optical-axis direction or in the first direction, the disclosure is not limited thereto. In another embodiment, the second coil 172 and the magnetic member 171 may not overlap the magnets 130 in the optical-axis direction or the first direction.

Furthermore, the second coil 172 and the magnetic member 171 may not overlap the magnets 130 in a direction perpendicular to the optical axis.

Furthermore, at the initial position of the bobbin 110, the second coil 172 and the magnetic member 171 may not overlap the first coil 120 in a direction perpendicular to the optical axis. However, the embodiment is not limited thereto. In another embodiment, at the initial position of the bobbin 110, the second coil 172 and the magnetic member 171 may overlap the first coil 120 in a direction perpendicular to the optical axis.

The second coil 172 may be an induction coil for detecting the position or displacement of the AF movable unit, for example, the bobbin 110. The second coil 172 may be embodied so as to be of an FPCB type or an FP coil type.

For example, when the AF movable unit is moved by virtue of interaction between the first coil 120, to which a drive signal is supplied, and the magnet, induction voltage may be generated in the second coil 172, and the intensity of the induction voltage of the second coil 172 may vary depending on displacement of the AF movable unit. Consequently, it is possible to detect displacement of the AF movable unit by detecting the intensity of the induction voltage generated in the second coil 172.

The magnetic member 171 functions to increase induction voltage generated in the second coil 172 due to mutual induction between the first coil 120 and the second coil 172.

In other words, the intensity of the induction voltage generated in the second coil 172 is proportional to coefficient of mutual induction and a rate of change of a drive signal of the first coil 120 over time. The coefficient of mutual induction is proportional to the numbers of turns of the first and second coils 120 and 172, a magnetic constant, and an effective permeability. Since the magnetic member 171 is able to increase the magnetic constant or the effective permeability, it is possible to increase the intensity of the induction voltage generated in the second coil 172.

Furthermore, since it is possible to increase the intensity of the induction voltage generated in the second coil 172 by virtue of the magnetic member 171, it is possible to adjust the intensity of the induction voltage of the second coil 172 within a predetermined target voltage range even when the intensity of a drive signal (for example, the intensity of a drive signal including a DC signal and an AC signal) applied to the first coil 120 is reduced.

Even when the intensity of a drive signal applied to the first coil 120 is reduced within a range in which AF operation is not affected, the embodiment is able to obtain an induction voltage of the second coil 172 within a predetermined target voltage range by virtue of the magnetic member 171.

Noise may be generated in output of an image sensor of a camera module due to a high-frequency pulse signal, which is a drive signal applied to the first coil 120. Since it is possible to reduce the intensity of a drive signal applied to the first coil 120, the embodiment is able to suppress the generation of noise in output of an image sensor attributable to a drive signal of the first coil 120.

The magnetic member 171 may be a ferrite core. The ferrite core may be made of, for example, MnZn or NiZn. A MnZn-based ferrite core may be used for low frequencies, and a NiZn-based ferrite core may be used for high frequencies.

In another embodiment, an iron core having no magnetism may be used, in place of the magnetic member 171.

Although the magnetic member 171 and the second coil 172, which are disposed on the mounting portion 149, may be disposed, for example, between the upper elastic member 150 and the first coil 120 so as to be aligned with the same in the vertical direction or in the first direction, the disclosure is not limited thereto.

Although the magnetic member 171 may be disposed on the bobbin 110, the magnetic member 171 may be disposed on the housing 140 in order to reduce influence or interference from the a magnetic field of the magnets 130 disposed on the housing 140.

When the magnetic member 171 is disposed between the first coil 120 disposed on the bobbin 110 and the housing 140, the size of the lens moving apparatus may be increased in a direction perpendicular to the optical axis. However, the embodiment is able to inhibit an increase in the size of the lens moving apparatus attributable to mounting of the magnetic member 171 because the magnetic member 171 is disposed on the housing 130 so as not to overlap the magnets 130 in a direction perpendicular to the optical axis.

Although the magnetic member 171 is disposed on the upper ends of the side sections of the housing 130 in FIG. 3a, the disclosure is not limited thereto. In another embodiment, the magnetic member 171 may also be disposed on the inner surface of the housing 140.

Although the magnetic member 171 and the second coil 172 are in contact with each other in FIG. 3a, the magnetic member 171 and the second coil 172 may be disposed on the side sections of the housing 140 in the state of being spaced apart from each other in another embodiment, wherein the magnetic member and the second coil, which are spaced apart from each other, may or may not overlap each other in the optical-axis direction.

Figure 3B:
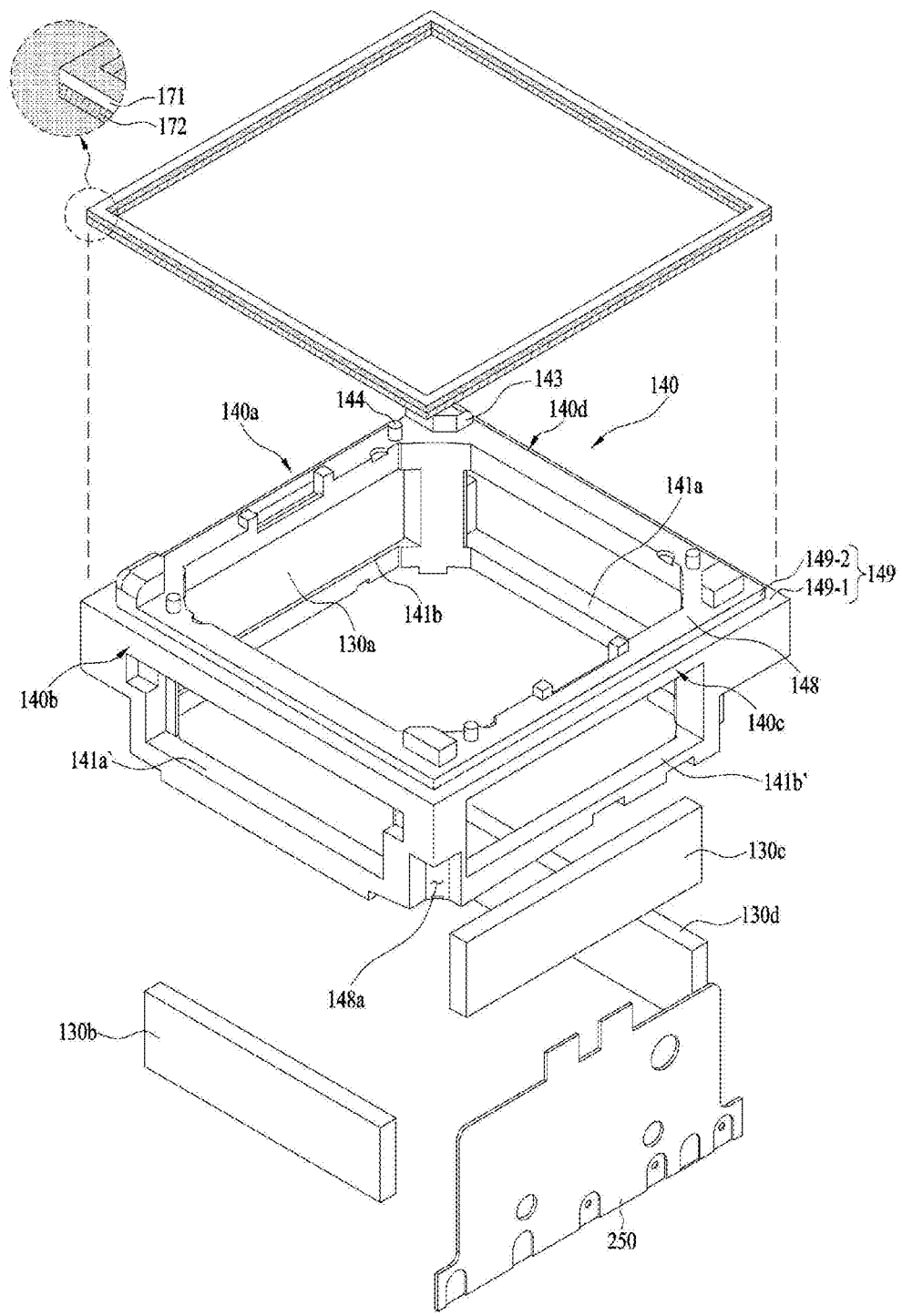

FIG. 3b shows the disposition of the magnetic member 171 and the second coil 172 according to another embodiment.

Referring to FIG. 3b, the magnetic member 171 may be disposed on the second coil 172, and the lower surface of the magnetic member 172 may be in contact with the upper surface of the second coil 172.

For example, the second coil 172 may be disposed on the support surface 149-1 of the mounting portion 149 of the housing 140, and the magnetic member 171 may be disposed on the second coil 172.

For example, the lower surface of the second coil 172 may be brought into contact with the support surface 149-1 of the mounting portion 149 of the housing 140, and the lower surface of the magnetic member 171 may be brought into contact with the upper surface of the second coil 172. In another embodiment, the second coil 172 may be disposed under the magnetic member 171 in the state of being spaced apart from the magnetic member 171, and the magnetic member 171 and the second coil 172, which are spaced apart from each other, may or may not overlap each other in the optical-axis direction.

Figure 3C:
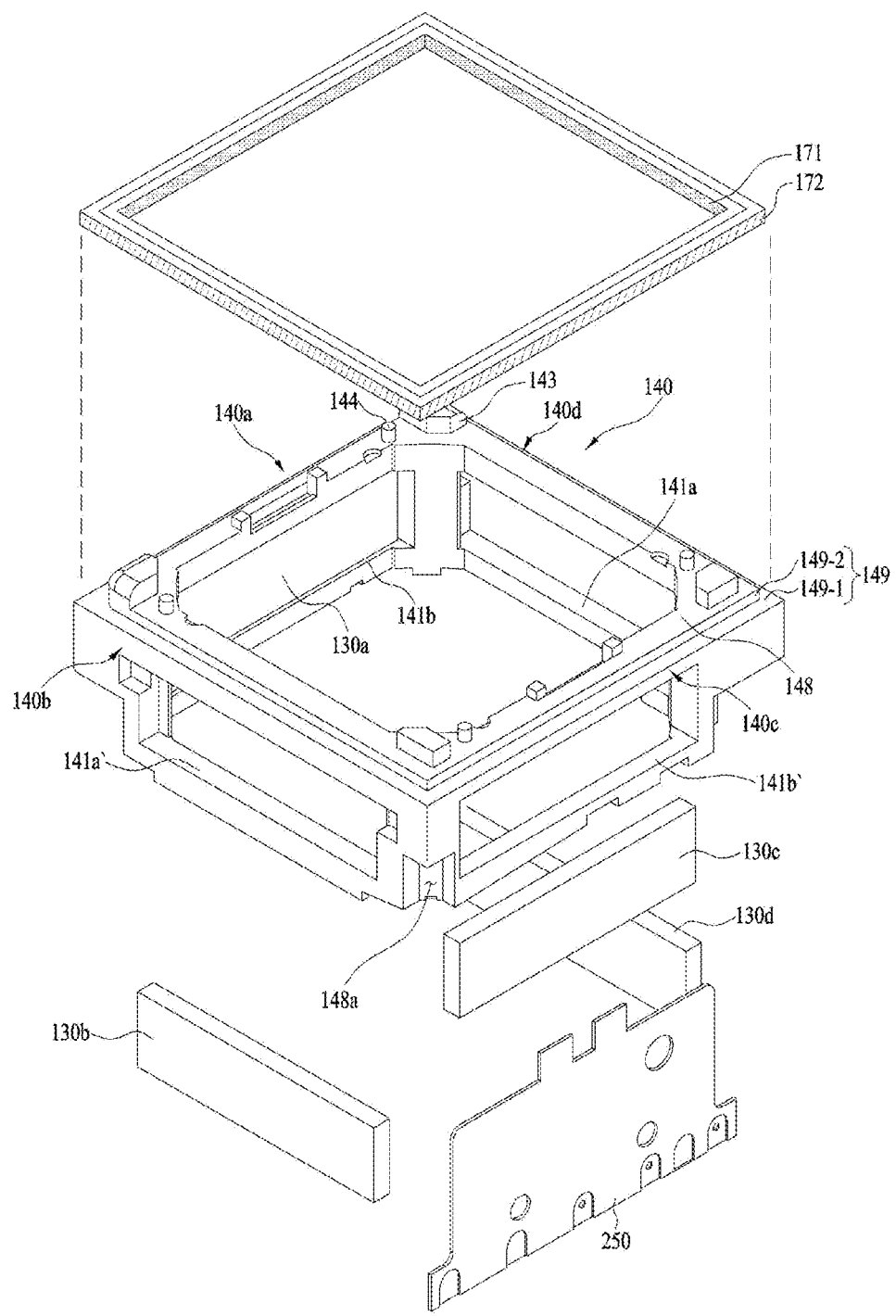

FIG. 3c shows the disposition of the magnetic member 171 and the second coil 172, according to still another embodiment.

Referring to FIG. 3c, the second coil 172 may surround the outer peripheral portion of the magnetic member 171.

The magnetic member 171 may be brought into contact with the outer peripheral surface of the side sections of the housing 140, and the second coil 172 may be disposed outside the magnetic member 171. For example, the magnetic member 171 may be brought into contact with the side surface 149-2 of the mounting portion 149 of the housing 140, and the inner surface of the second coil 172 may be brought into contact with the outer surface of the magnetic member 171. The lower surfaces of the magnetic member 171 and the second coil 172 may be brought into contact with the support surface 149-1 of the mounting portion 149. Since the second coil 172 is disposed outside the magnetic member 172, it is possible to increase the total length of the second coil 172, and thus the embodiment is able to increase the induction voltage of the second coil 172.

In yet another embodiment, the magnetic member may surround the outer portion of the second coil. In other words, the second coil may be brought into contact with the outer peripheral surfaces of the side sections of the housing 140, and the magnetic member may be disposed outside the second coil.

The second coil 172 and the magnetic member 171, illustrated in FIG. 3c, may not overlap each other in the optical-axis direction or in the first direction, but may overlap each other in a direction perpendicular to the optical axis.

Although the magnetic member 171 and the second coil 172 are in contact with each other in FIG. 3c, the magnetic member and the second coil may be spaced apart from each other in another embodiment, wherein the magnetic member and the second coil, which are spaced apart from each other, may or may not overlap each other in a direction perpendicular to the optical axis.

The magnetic member 171, which is illustrated in FIGS. 3a to 3c, may be configured to have the shape of a single core. Furthermore, each of the magnetic member 172 and the second coil 172, which are illustrated in FIGS. 3a to 3c, may be configured to have a ring shape. In addition, each of the magnetic member 172 and the second coil 172, which are illustrated in FIGS. 3a to 3c, may be configured to have a shape with at least four sides, for example, a square shape.

Figure 3D:
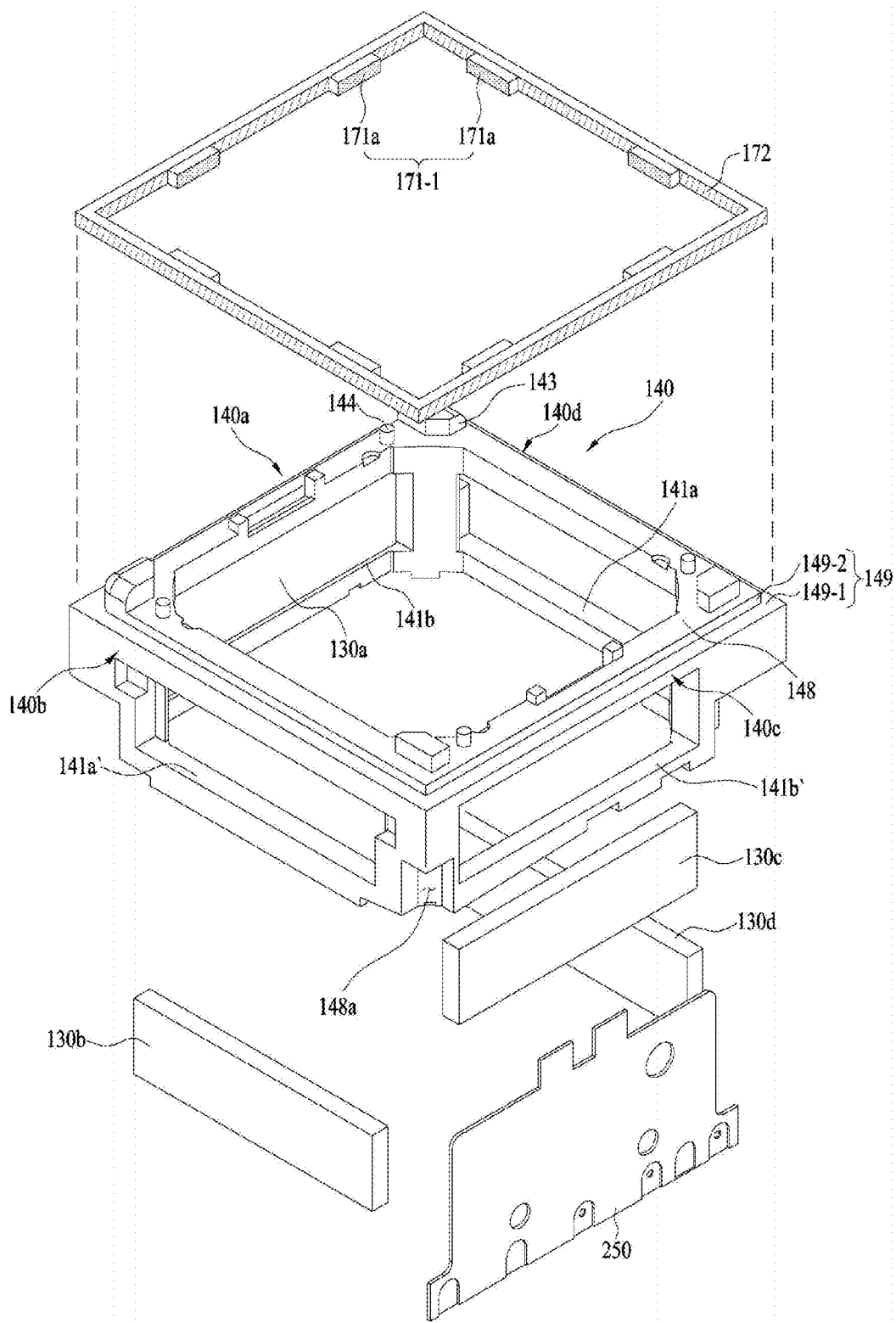

FIG. 3d shows the disposition of a magnetic member 171-1 and the second coil 172 according to yet another embodiment.

The magnetic member 171-1, which is illustrated in FIG. 3d, may include magnetic portions (hereinafter, referred to as "first magnetic members") 171a, which are spaced apart from each other. Although the magnetic member 171, which is illustrated in FIGS. 3a to 3c, may have a ring shape, each of the first magnetic members 171a of the magnetic member 171-1 may have a bar shape. The first magnetic members 171a may be bonded to the second coil 171 by means of an adhesive member.

The first magnetic members 171a may be disposed inside the second coil 172. For example, the first magnetic members 171a may be in contact with the side surfaces 149-2 of the mounting portion 149 of the housing 140. The inner surface of the second coil 172 may be in contact with the outer surfaces of the first magnetic members 171a. The lower surfaces of the first magnetic members 171a and the lower surface of the second coil 172 may be brought into contact with the support surface 149-1 of the mounting portion 149.

For example, the first magnetic members 171a may not overlap the second coil 172 in the optical-axis direction or in the first direction but may overlap the second coil 172 in a direction perpendicular to the optical axis.

Although the first magnetic members 171a are in contact with the second coil 172 in FIG. 3d, the first magnetic members and the second coil may be spaced apart from each other in another embodiment, wherein the first magnetic members and the second coil, which are spaced apart from each other, may or may not overlap each other in a direction perpendicular to the optical axis.

FIG. 22 shows an embodiment of the positional relationship between the magnetic member 171 and the second coil 172, which are illustrated in FIGS. 3a to 3d.

Figure 22A:
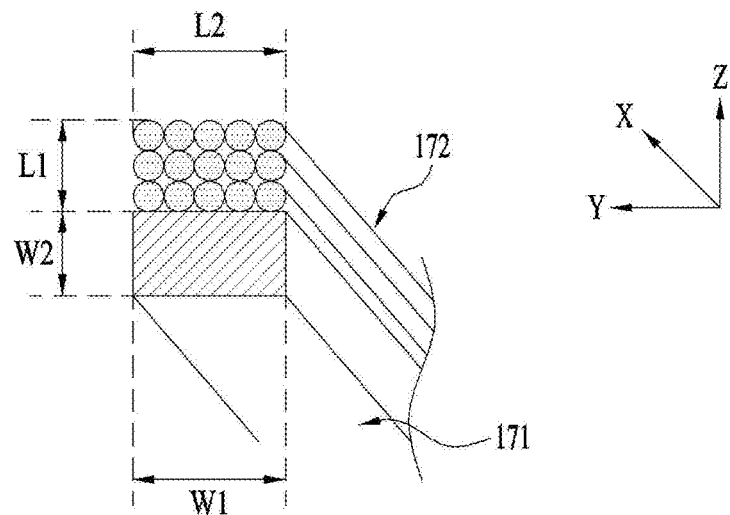
FIG. 22a shows an embodiment of the positional relationship between the magnetic member and the second coil, which are illustrated in FIGS. 3a to 3d.

Referring to FIG. 22a, the second coil 172, disposed on the housing 140, may be wound m times (for example, 3 times) in the optical-axis direction (for example, in the z-axis direction) and may then be wound n times (for example, 5 times) in a direction perpendicular to the optical axis (for example, in the y-axis direction).

For example, a cross section of the second coil 172, which is obtained by cutting the second coil 172 in a direction perpendicular to the longitudinal direction of the second coil 172, may have a first length (L1) in the optical-axis direction (for example, in the z-axis direction) and a second length (L2, L2>L1) in a direction perpendicular to the optical axis (for example, in the y-axis direction).

The magnetic member 172 may be disposed on the second coil 172 so as to correspond to or face the longer side (the side having the longer length) in the cross section of the second coil 172.

For example, the magnetic member 172 may be disposed so as to contact or face a first side portion of the second coil 172. The first side portion of the second coil 172 may be a side portion including a longer side in the cross section of the second coil 172.

For example, the length (W1) of the magnetic member 172 in a direction perpendicular to the optical axis (for example, in the y-axis direction) may be greater than the length (L1) of the shorter side (the side having a shorter length) in the cross section of the second coil 172 (W1>L1).

Although the second length (L2) of the second coil 172 may be equal to, for example, the length (W1) of the magnetic member 172 (W1=L2), the disclosure is not limited thereto. In a further embodiment, the length (W1) may be less than or greater than the length (L2).

Although the length (W2) may be less than the length (W1) as illustrated in FIG. 22a (W2<W1), the disclosure is not limited thereto. In another embodiment, the length (W2) may be equal to or greater than the length (W1) (W2≥W1).

Figure 22B:
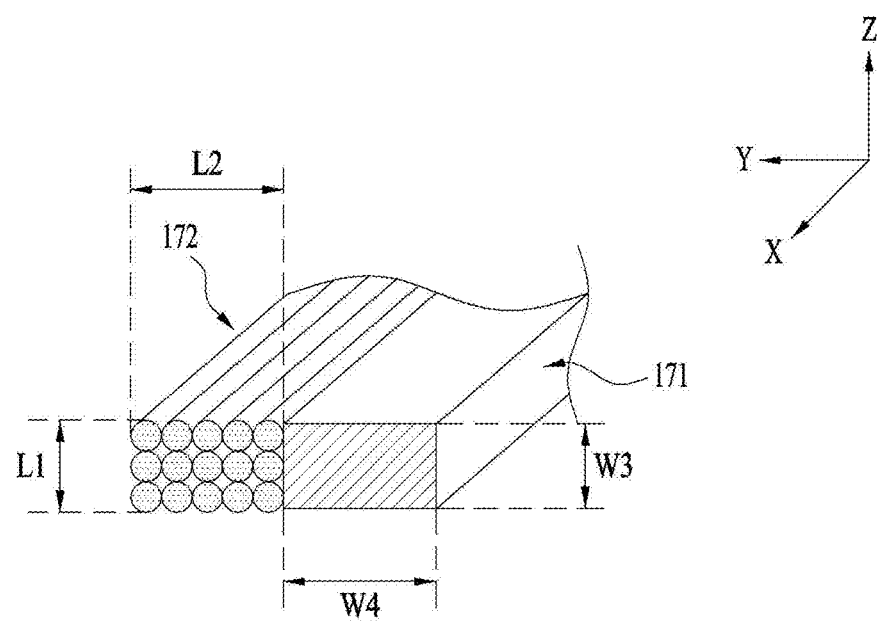
FIG. 22b shows another embodiment of the positional relationship between the magnetic member and the second coil, which are illustrated in FIGS. 3a to 3d.

FIG. 22b shows another embodiment of the positional relationship between the magnetic member 171 and the second coil 172, which are illustrated in FIGS. 3a to 3d.

Referring to FIG. 22b, the magnetic member 172 may be disposed on the second coil 172 so as to correspond or face the shorter side in a cross section of the second coil 172.

For example, the magnetic member 172 may be disposed so as to contact or face a second side portion of the second coil 172. The second side portion of the second coil 172 may be a side portion, which includes the shorter side in the cross section of the second coil 172.

For example, the length (W3) of the magnetic member 172 in the optical-axis direction (for example, in the z-axis direction) may be less than the length (L2) of the longer side in the cross section of the second coil 172 (W3<L2).

Although the length (W4) may be less than the length (W3) as illustrated in FIG. 22b (W4>W3), the disclosure is not limited thereto. In another embodiment, the length (W4) may be equal to or less than the length (W3) (W4<W3).

Furthermore, although the first length (L1) of the second coil 172 may be equal to the length (W3) of the magnetic member 172 (L1=W3), the disclosure is not limited thereto. In a further embodiment, the first length (L1) may be less than or greater than the length (W3).

Although the number of times the second coil 172 is wound in the optical-axis direction is greater than the number of times the second coil 172 is wound in a direction perpendicular to the optical axis in FIGS. 22a and 22b, the disclosure is not limited thereto. In another embodiment, the reverse case is also possible.

Figure 3E:
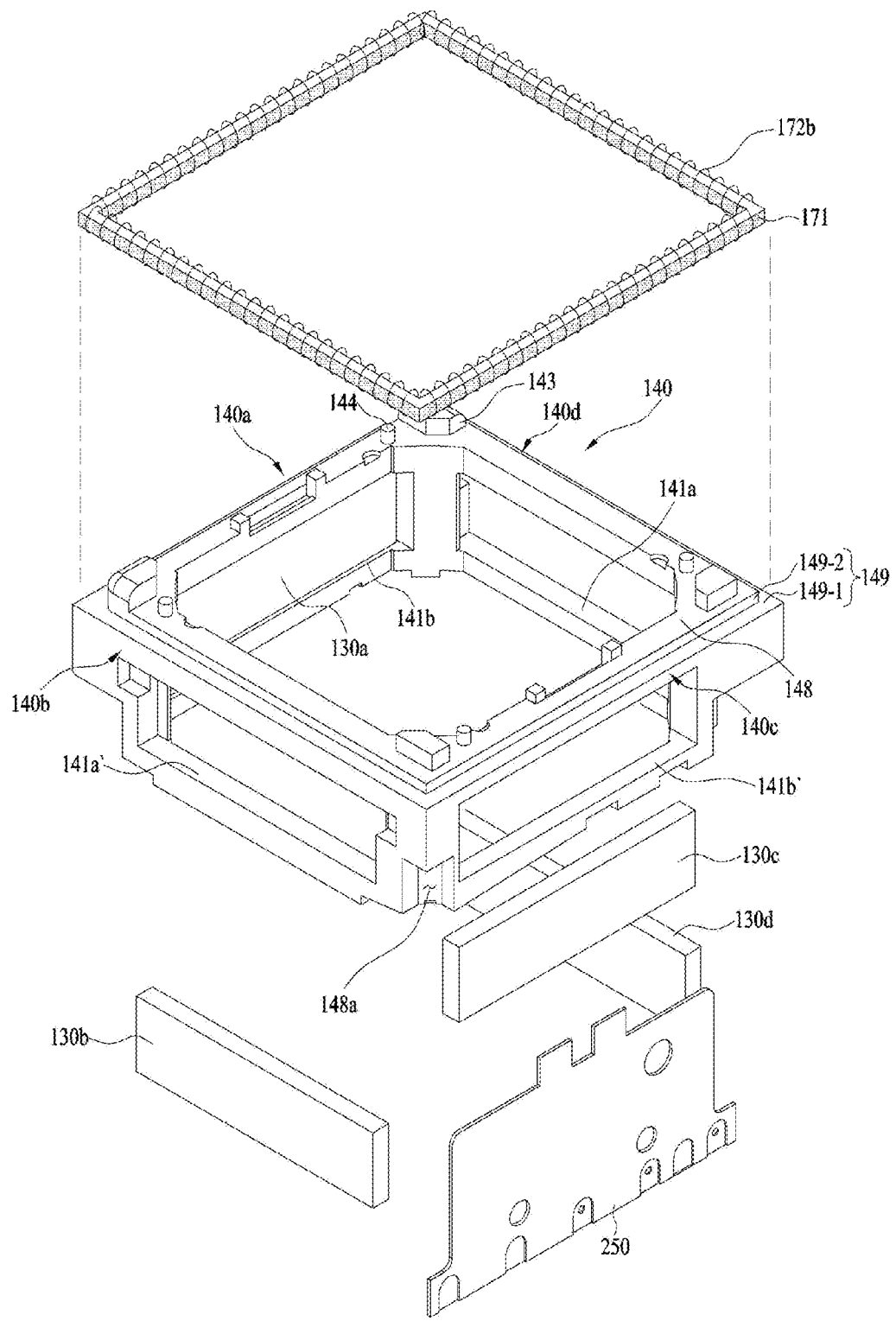

FIG. 3e shows the disposition of the magnetic member 171 and a second coil 127b according to a further embodiment.

Referring to FIG. 3e, the second coil 172b may be wound around the outer peripheral surface of the magnetic member 171. For example, the second coil 172b may be wound around the ring-shaped magnetic member 171 in a clockwise or counterclockwise direction.

In another embodiment, the mounting portion of the housing 140 may be a groove, which is provided in the side surfaces of the side sections of the housing 140, in which the magnetic member 171 and the second coil 172 are disposed in the groove provided in the side surfaces of the side sections of the housing 140.

The magnetic member 171 or 171a and the second coil 172 or 172b, which are mounted on the mounting portion as illustrated in FIGS. 3a to 3e, may be positioned under the first outer frame 152 of the upper elastic member 150.

For example, at least one of the magnetic member 171 or 171a and the second coil 172 or 172b may overlap the first outer frame 152 of the upper elastic member 150 in the optical-axis direction or the first direction.

Furthermore, the magnetic member 171 or 171a and the second coil 172 or 172b may not overlap the first outer frame 152 in a direction perpendicular to the optical axis.

The magnetic member 171 or 171a and the second coil 172 or 172b, which are mounted on the mounting portion 149 as illustrated in FIGS. 3a to 3e, may be spaced apart from the upper elastic member 150, which is disposed or positioned on the upper surface 148 of the housing 140. The reason for this is to inhibit the magnetic member 171 and the second coil 172 from being conductively connected to the upper member 150 coupled to the first coil 120.

For example, the mounting portion 149 may be positioned at the edges at which the upper surfaces of the first stoppers 143 and the side sections 140a to 140d meet the side surfaces of the housing, and the stoppers 143 may guide mounting or the disposition of the magnetic member 171 and the second coil 172 to the mounting portion 140.

Next, the magnets 130 will be described.

The magnets 130 may be disposed on the side sections 140a to 140d of the housing 140 so as to correspond to or be aligned with the first coil 120 in a direction perpendicular to the optical axis.

For example, the magnets 130 may be disposed in the magnet grooves 141a, 141a', 141b, 141b' in the housing 140 so as to overlap the first coil 120 in a direction perpendicular to the optical axis. For example, the direction perpendicular to the optical axis may be the second direction or the third direction.

In another embodiment, the magnet grooves may not be formed in the side sections 140a to 140d of the housing 140, and the magnets 130 may be disposed inside or outside the side sections 140a to 140d of the housing 140.

Although each of the magnets 130 may have a shape that corresponds to a corresponding one of the side sections 140a to 140d of the housing 140, for example, a rectangular shape, the disclosure is not limited thereto.

Although each of the magnets 130 may be a monopole-magnetized magnet which is constructed such that a first surface thereof that faces the first coil 120 is an S pole and the opposite second surface thereof is an N pole, the disclosure is not limited thereto, and the reverse disposition is also possible. Alternatively, the magnets 130 may bipole-magnetized magnets.

Although the number of magnets 130 is four in the embodiment, the disclosure is not limited thereto, and the number of magnets 130 may be at least two. Although each of the surfaces of the magnets 130 that face the coil 120, may be a flat surface, the disclosure is not limited thereto, and the surface may be a curved surface.

Next, the upper elastic member 150 and the lower elastic member will be described.

Figure 5:
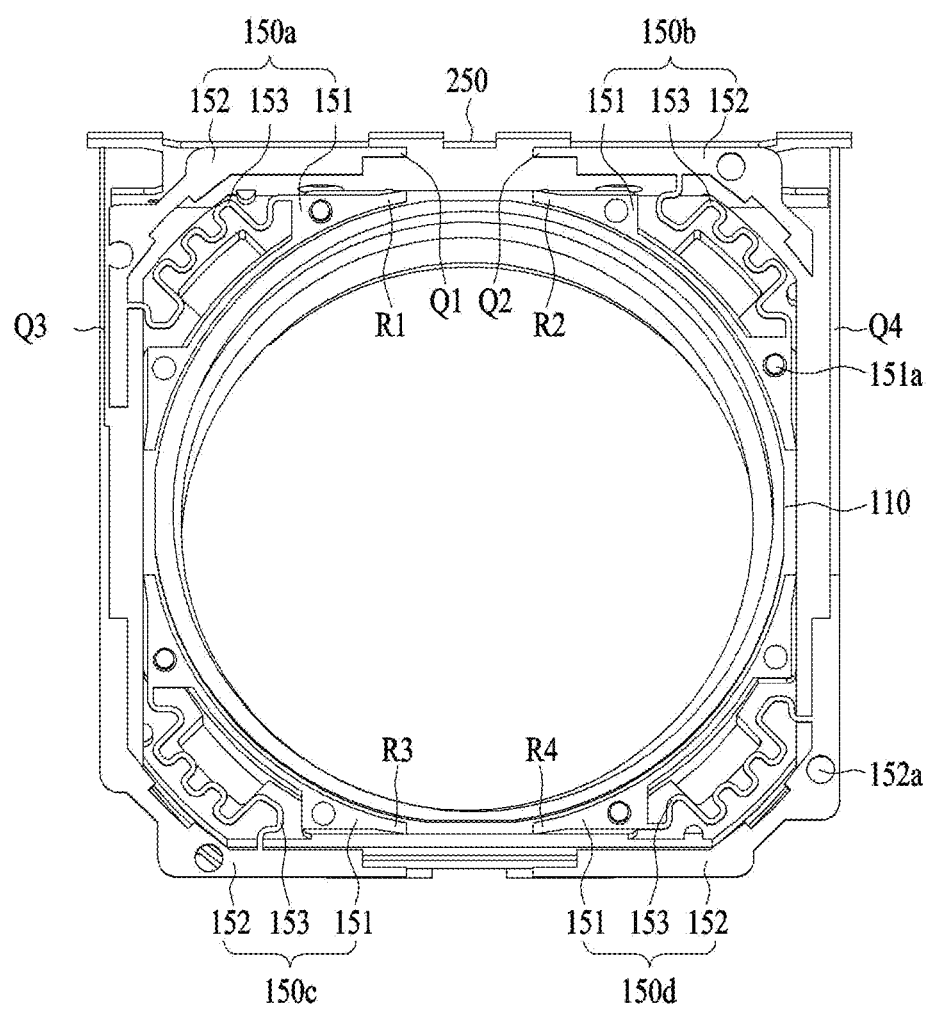
FIG. 5 shows a bobbin, an upper elastic member and the circuit board, which are illustrated in FIG. 1.
Figure 6:
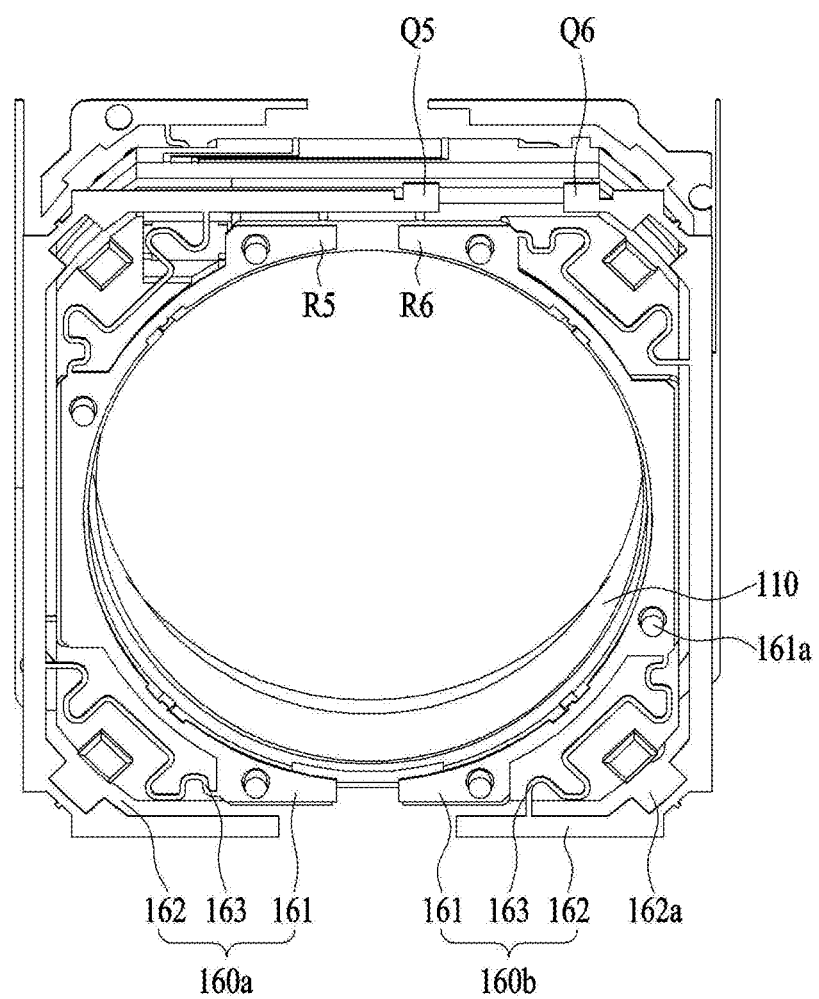
FIG. 6 shows the bobbin and a lower elastic member, which are illustrated in FIG. 1.

FIG. 5 shows the bobbin 110, the upper elastic member 150 and the circuit board 250, which are illustrated in FIG. 1, and FIG. 6 shows the bobbin 110 and the lower elastic member 160, which are illustrated in FIG. 1.

Referring to FIGS. 5 and 6, each of the upper elastic member 150 and the lower elastic member 160 is coupled both to the bobbin 110 and to the housing 140 so as to elastically support the bobbin 110.

For example, the upper elastic member 150 may be coupled both to the upper portion, the upper surface or the upper end of the bobbin 110 and to the upper portion, the upper surface or the upper end of the housing 140, and the lower elastic member 160 may be coupled both to the lower portion, the lower surface or the lower end of the bobbin 110 and to the lower portion, the lower surface or the lower end of the housing 140.

At least one of the upper and lower elastic members 150 and 160 may be divided or separated into two or more.

For example, the upper elastic member 150 may include first to fourth upper elastic members or springs 150a to 150d, which are spaced apart from one another, and the lower elastic member 160 may include first to second lower elastic members or springs 160a and 160b, which are spaced apart from each other. Although each of the upper elastic member 150 and the lower elastic member 160 may be embodied as a leaf spring, the disclosure is not limited thereto. Each of the upper and lower elastic members 150 and 160 may be embodied as a coil spring, a suspension wire or the like.

Each of the first to fourth upper springs 150a to 150d may include a first inner frame 151 coupled to the upper portion, the upper surface or the upper end of the bobbin 110, a first outer frame 152 coupled to the upper portion, the upper surface or the upper end of the housing 140, and a first connecting portion 153 connecting the first inner frame 151 to the first outer frame 152.

Each of the first and second lower springs 160a and 160b may include a second inner frame 161 coupled to the lower portion, the lower surface or the lower end of the bobbin 110, a second outer frame 162 coupled to the lower portion, the lower surface or the lower end of the housing 140, and a second connecting portion 163 connecting the second inner frame 161 to the second outer frame 162.

Each of the first and second connecting portions 153 and 163 of the upper and lower elastic members 150 and 160 may be bent or curved at least once so as to define a predetermined pattern. The upward and/or downward movement of the bobbin 110 in the first direction may be elastically (or flexibly) supported by virtue of positional variation and fine deformation of the first and second connecting portions 153 and 163.

For example, one end of the first coil 120 may be bonded to the first inner frame of one of the upper springs, and the other end of the first coil 120 may be bonded to the first inner frame of another of the upper springs.

For example, one end of the second coil 172 may be bonded to the first outer frame of another of the upper springs, and the other end of the second coil 172 may be bonded to the first outer frame of the remaining one of the upper springs.

The first inner frame 151 of each of the first to fourth upper springs 150a to 150d may include first inner coupling portions R1, R2, R3 and R4, and the first outer frame 152 may include first outer coupling portions Q1, Q2, Q3 and Q4.

The second inner frame 161 of each of the first and second lower springs 160a and 160b may include second inner coupling portions R5 and R6, and the second outer frame 162 of each of the first and second lower springs 160a and 160b may include second outer coupling portions Q5 and Q6.

For example, by means of solder or a conductive adhesive member, one end of the first coil 120 may be bonded to one (for example, R1) of the first and second inner coupling portions R1 to R6, and the other end of the first coil 120 may be bonded to another (for example, R2) of the first and second inner coupling portions R1 to R6.

Furthermore, by means of solder or a conductive adhesive member, one end of the second coil 172 may be bonded to another (for example, R3) of the first and second inner coupling portions R1 to R6, and the other end of the second coil 172 may be bonded to another (for example, R4) of the first and second inner coupling portions R1 to R6.

In another embodiment, by means of solder or a conductive adhesive member, one end of the second coil 120 may be bonded to one (for example, Q1) of the first and second outer coupling portions Q1 to Q6 of the upper springs, and the other end of the second coil 120 may be bonded to another (for example, Q2) of the first and second outer coupling portions Q1 to Q6 of the upper springs.

By means of solder or a conductive adhesive member, the first and second outer coupling portions Q1 to Q6 of the upper and lower elastic members 150 and 160 may be bonded to the circuit board 250, and each of the first and second outer coupling portions Q1 to Q6 may be conductively connected to a corresponding one of the terminals 251-1 to 251-6 of the circuit board 250.

The first to fourth upper springs 150a to 150d may include through holes or holes 151a, which are formed in the first inner frames 151 so as to be coupled to the upper support protrusions 113 of the bobbin 110, and through holes or blind holes 152a, which are formed in the first outer frame 152 so as to be coupled to the upper frame support protrusions 144 of the housing 140.

The first and second lower elastic members 160a and 160b may include through holes or blind holes 161a, which are formed in the second inner frames 161 so as to be coupled to the lower support protrusions of the bobbin 110, and through holes or holes 162a, which are formed in the second outer frames 162 so as to be coupled to the lower frame support protrusions 147 of the housing 140.

In order to absorb or buffer vibrations of the bobbin 110, the lens moving apparatus 100 may further include first damping members (not shown), each of which is disposed between a corresponding one of the upper springs 150a to 150d and the housing 140.

For example, each of the first damping members (not shown) may be disposed in the space between the first connecting portion 153 of a corresponding one of the upper springs 150a to 150d and the housing 140.

The lens moving apparatus 100 may further include second damping members (not shown), each of which is disposed between a corresponding one of the second connecting portions 163 of the lower springs 160a and 160b and the housing 140.

Furthermore, a damping member (not shown) may also be disposed between the inner surface of the housing 140 and the outer peripheral surface of the bobbin 110.

Next, the circuit board 250 will be described.

The circuit board 250 may be disposed, coupled or mounted to the housing 140, and may be conductively connected to at least one of the upper or lower elastic members 150 or 160. The circuit board 250 may be a printed circuit board, for example, an FPCB, a PCB or a ceramic board.

Although the circuit board 250 may be secured, supported or disposed to, for example, one (for example, 140c) of the four side sections 140a to 140d of the housing 140, the disclosure is not limited thereto. In another embodiment, the circuit board 250 may also be supported by the upper surface of the housing 140.

The circuit board 250 may include the plurality of terminals 251, which are conductively connected to the first coil 120 and the second coil 172.

By means of solder or a conductive adhesive member, the outer coupling portions Q1 to Q4 of the upper springs 150a to 150d may be bonded to the circuit board 250, and may be conductively connected to the circuit board 250. By means of solder or a conductive adhesive member, the second outer coupling portions Q5 and Q6 of the lower springs 160a to 160d may be bonded to the circuit board 250, and may be conductively connected to the circuit board 250.

A drive signal may be supplied to the first coil 120 via the upper springs 150a to 150d and/or the lower springs 160a and 160b and the terminals 251 of the circuit board 250, and the induction voltage of the second coil 172 may be output to the terminals 251 of the circuit board 250.

For example, the circuit board 250 may include two terminals 251-1 and 251-2 for supplying a drive signal to the first coil 120 and two terminals 251-3 and 251-4 to which induction voltage of the second coil 172 is output.

The lens moving apparatus 100 may include a driver IC provided on the circuit board 250 or a circuit board 1250 to be mentioned later so as to supply a drive signal to the first coil 120. In another embodiment, the driver IC may be provided at a camera module.

Next, the base 210 will be described.

The base 210 may be coupled to the cover member 300 so as to define a space for accommodating the bobbin 110 and the housing 140. The base 210 may include an opening or bore that corresponds to the opening or bore in the bobbin 110 and/or the opening or bore in the housing 140, and may have a shape that coincides with or corresponds to the cover member 300, for example, a square shape.

The base 210 may include guide members 216, which protrude upwards a predetermined height from the four corner portions thereof at a right angle with respect to the base. Although each of the guide members 216 may have a polygonal column shape, the disclosure is not limited thereto. The guide member 216 may be fitted, fastened or coupled to the lower guide grooves 148a in the housing 140.

A drive signal applied to the first coil 120 may be an AC signal, for example, an AC current. For example, a drive signal supplied to the first coil 120 may be a sinusoidal signal or a pulse signal (for example, a pulse-width-modulate (PWM) signal).

In another embodiment, a drive signal applied to the first coil 120 may include an AC signal and a DC signal. Application of an AC signal, for example, an AC current, to the first coil 120 serves to induce electromotive force or voltage to the second coil 172 by virtue of mutual induction. The frequency of a PWM signal may be 20 kHz or more, and may be 500 kHz or more for the purpose of reduction of consumption of current.

As the first coil 120 moves in the first direction, the distance between the first coil 120 and the second coil 172 varies, and induction voltage is generated in the second coil 172 based on variation in the distance.

For example, as the distance between the first coil 120 and the second coil 172 is decreased, the induction voltage induced to the second coil 172 may be increased. As the distance is increased, the induction voltage induced to the second coil 172 may be reduced. Accordingly, it is possible to detect displacement of the movable unit based on the intensity of the induction voltage generated in the second coil 172.

Because implementation of autofocus feedback control typically requires a position sensor capable of detecting displacement of the AF movable unit, for example, the bobbin, and an additional power-connecting structure for driving the position sensor, there may be an increase in the price of the lens moving apparatus and difficulty in manufacturing operation.

Furthermore, a linear zone (hereinafter, referred to as a "first linear zone") in a graph plotted between the distance of movement of the bobbin and the magnetic flux of the magnet detected by the position sensor may be restricted by positional relationships between the magnet and the position sensor.

Since the embodiment does not require an additional position sensor for detecting the displacement of the bobbin 110, it is possible to reduce the cost of manufacturing the lens moving apparatus and to facilitate manufacture thereof.

Furthermore, since mutual induction between the first coil 120 and the second coil 172 is employed, the linear zone in the graph plotted between the distance of movement of the bobbin 110 and induction voltage of the second coil 172 may be increased. Accordingly, the embodiment is able to ensure linearity over a wider zone, to decrease a processing defect rate, and to perform more precise AF feedback control.

Since it is possible to increase the intensity of the induction voltage of the second coil 172 by virtue of the magnetic member 171, it is possible to reduce the intensity of a drive signal applied to the first coil 120 within a range in which AF drive is not affected by virtue of interaction with the magnets 130. Consequently, the embodiment is able to inhibit the generation of noise in the output of the image sensor attributable to a drive signal of the first coil 120.

Figure 7:
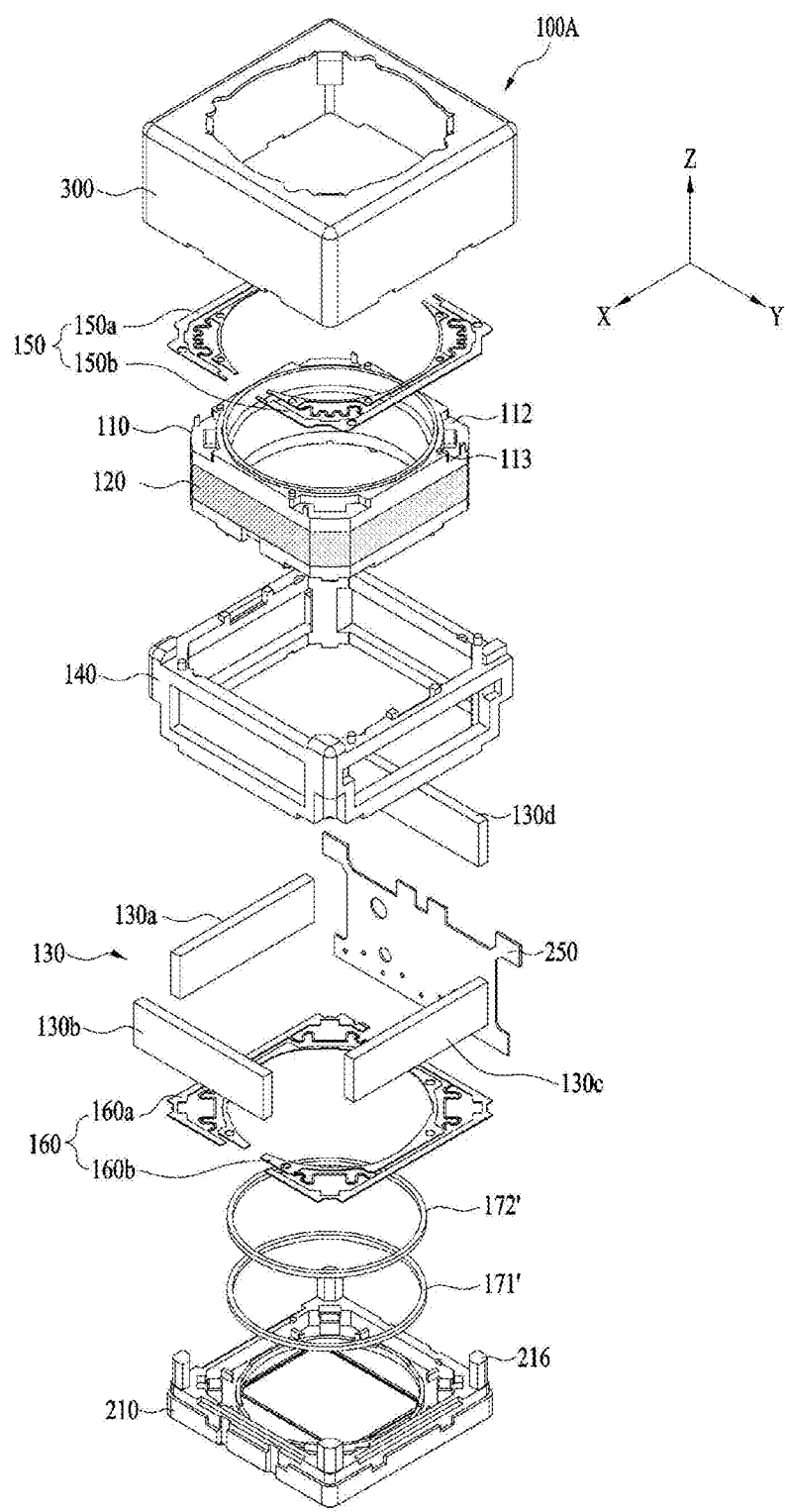
FIG. 7 is an exploded perspective view of a lens moving apparatus according to another embodiment.

FIG. 7 is an exploded perspective view of a lens moving apparatus 100A according to another embodiment. The same reference numeral as that in FIG. 1 denotes the same component, and a description of the same component will be briefly given or omitted.

Although FIG. 1 shows the magnetic member 171 and the second coil 172 disposed or secured to the housing 130, FIG. shows a magnetic member 171' and a second coil 172', which are disposed on the base 210.

Referring to FIG. 7, the magnetic member 171' and the second coil 172' may be disposed on the upper surface of the base 210. For example, the magnetic member 171' and the second coil 172' may be disposed between the lower elastic member 160 and the base 210, and may be secured to the base 210 by means of an adhesive member.

Figure 8A:
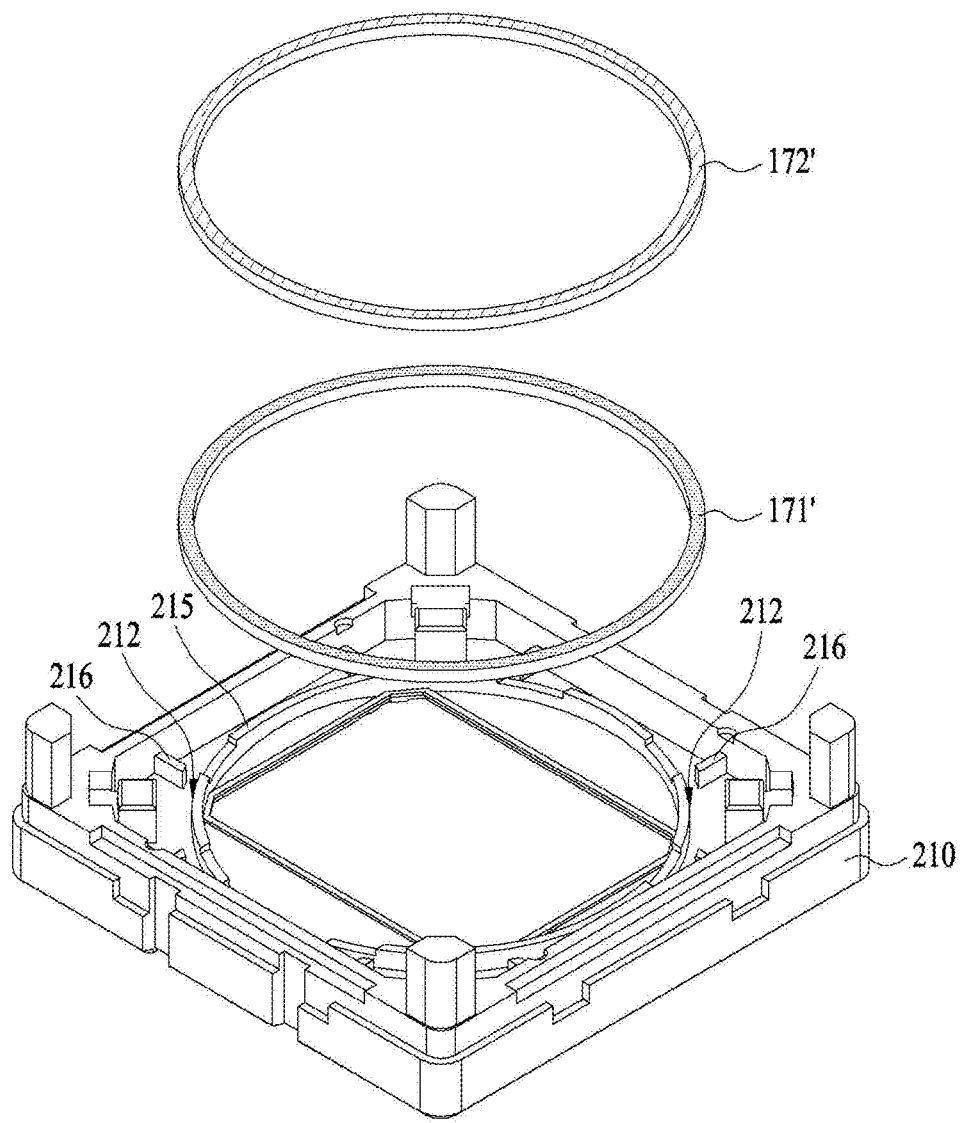
FIGS. 8a to 8e show embodiments of a magnetic member and a second coil, which are disposed on a base.

FIG. 8a shows an embodiment of the magnetic member 171' and the second coil 172' which are disposed on the base 210.

Referring to FIG. 8a, each of the magnetic member 171' and the second coil 172' may have a closed loop, for example, a ring shape.

The magnetic member 171' may be disposed on the upper surface of the base 210, and the second coil 172' may be disposed on the magnetic member 171'. For example, the upper surface of the base 210 may be provided with a groove 212, to which the magnetic member 171' and the second coil 170 are fitted, mounted or secured.

For example, the groove 212 may be composed of a projecting portion 215 and guide portions 216, which are provided on the upper surface of the base 210. For example, the groove 212 may be positioned between the projecting portion 215 and the guide portions 216 provided on the upper surface of the base 210.

The projecting portion 215 may project from the upper surface of the base 210 so as to be adjacent to the opening or bore of the base 210, and the guide portions 216 may project from the upper surface of the base 210 so as to be spaced apart from the projecting portion 215.

The magnetic member 171' and the second coil 172' may be disposed and fitted between the projecting portion 215 and the guide portions 216. The side surface of the projecting portion 215 and the side surfaces of the guide portions 216 may be brought into contact with the magnetic member 171' and the second coil 172'.

In another embodiment, the magnetic member 171' and the second coil 172' may be mounted on the side surface or the lower surface of the base 210, or may be disposed or mounted in a groove formed in the side surface or the lower surface of the base 210.

The lower surface of the magnetic member 171' may be brought into contact with the upper surface of the base 210, and the lower surface of the second coil 172' may be brought into contact with the upper surface of the magnetic member 171'.

The second coil 172' may be wound about the optical axis in a clockwise or counterclockwise direction so as to form a ring shape, and may be disposed so as to correspond to or be aligned with the first coil 120 in the first direction.

For example, the second coil 172' may have a shape that corresponds to or is identical to that of the magnetic member 171'. For example, each of the second coil 172' and the magnetic member 171' may have a circular, elliptical or polygonal shape. Although the diameter of the second coil 172' may be equal to, for example, the diameter of the magnetic member 171', the disclosure is not limited thereto.

Figure 8B:
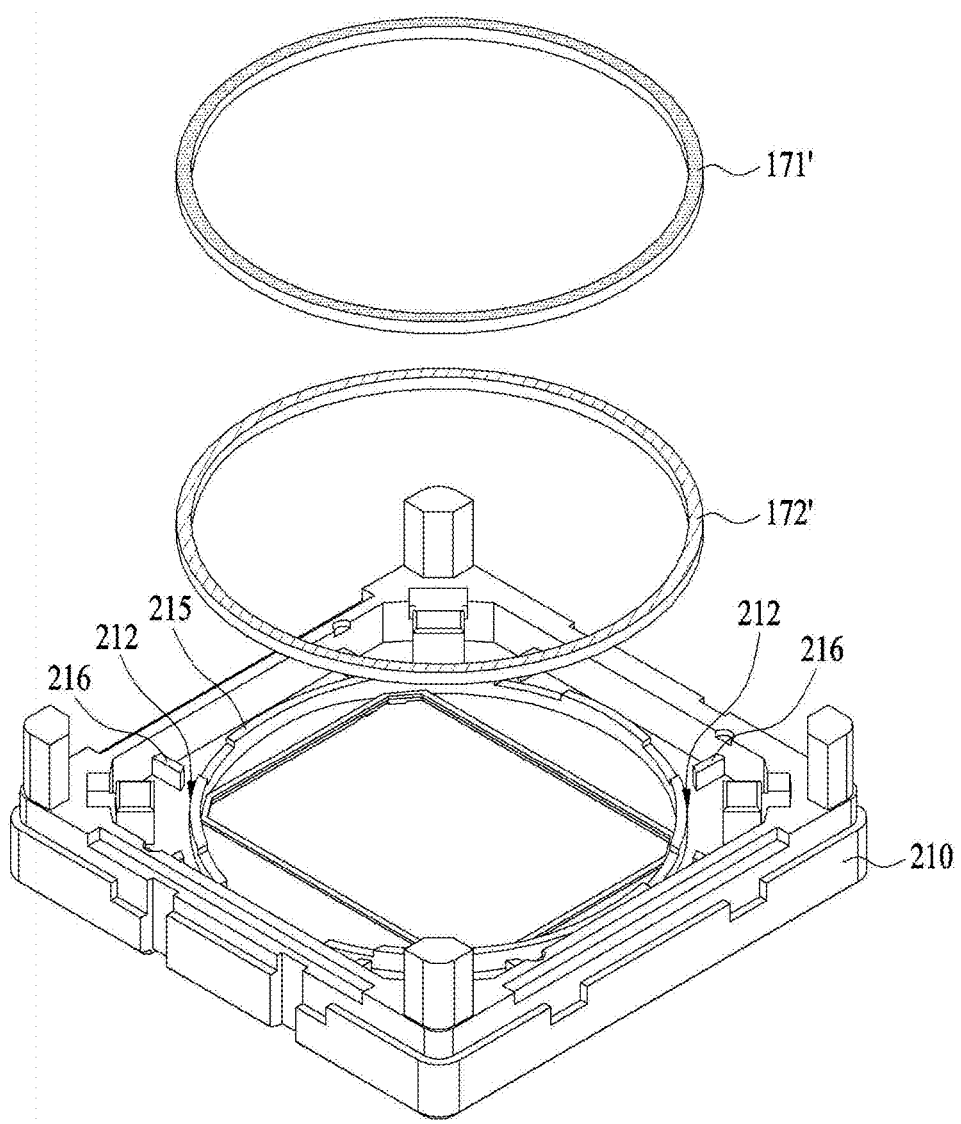

FIG. 8b shows another embodiment of the magnetic member 171' and the second coil 172', which are disposed on the base 210. In the embodiment of FIG. 8b, the positions of the magnetic member 171' and the second coil 172', which are illustrated in FIG. 8b, are exchanged with each other.

Referring to FIG. 8b, the magnetic member 171' is disposed on the second coil 172'. For example, the second coil 172' may be disposed on the bottom of a groove in the upper surface of the base 210, and the magnetic member 171' may be disposed on the second coil 172'.

For example, the lower surface of the second coil 172' may be brought into contact with the upper surface of the base 210, and the lower surface of the magnetic member 171' may be brought into contact with the upper surface of the second coil 172'.

Figure 8C:
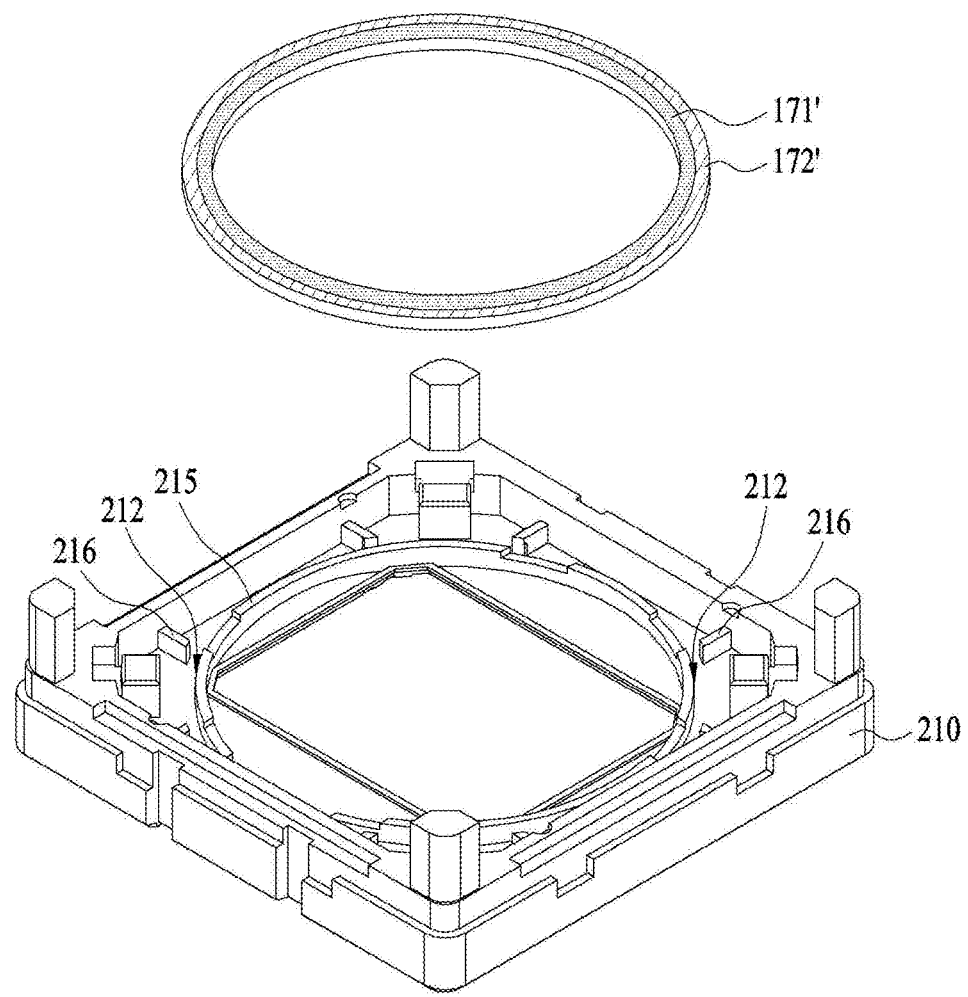

FIG. 8c shows the disposition of the magnetic member 171 and the second coil 172, according to a still another embodiment.

Referring to FIG. 8c, the second coil 172' may be disposed outside the magnetic member 171', and the outer surface of the magnetic member 171' may be brought into contact with the inner surface of the second coil 172'.

For example, the magnetic member 171' may be brought into contact with the side surface of the projecting portion 215, and the second coil 172' may be brought into contact with the side surface of the guide portions 216 of the base 210. The lower surface of each of the magnetic member 171' and the second coil 172' may be brought into contact with the upper surface of the base 210.

In the embodiment illustrated in FIG. 8c, the diameter of the ring defined by the magnetic member 171' may be smaller than the diameter of the ring defined by the second coil 172'.

In another embodiment, the magnetic member may be positioned outside the second coil, and the outer surface of the second coil may be brought into contact with the inner surface of the magnetic member.

Figure 8D:
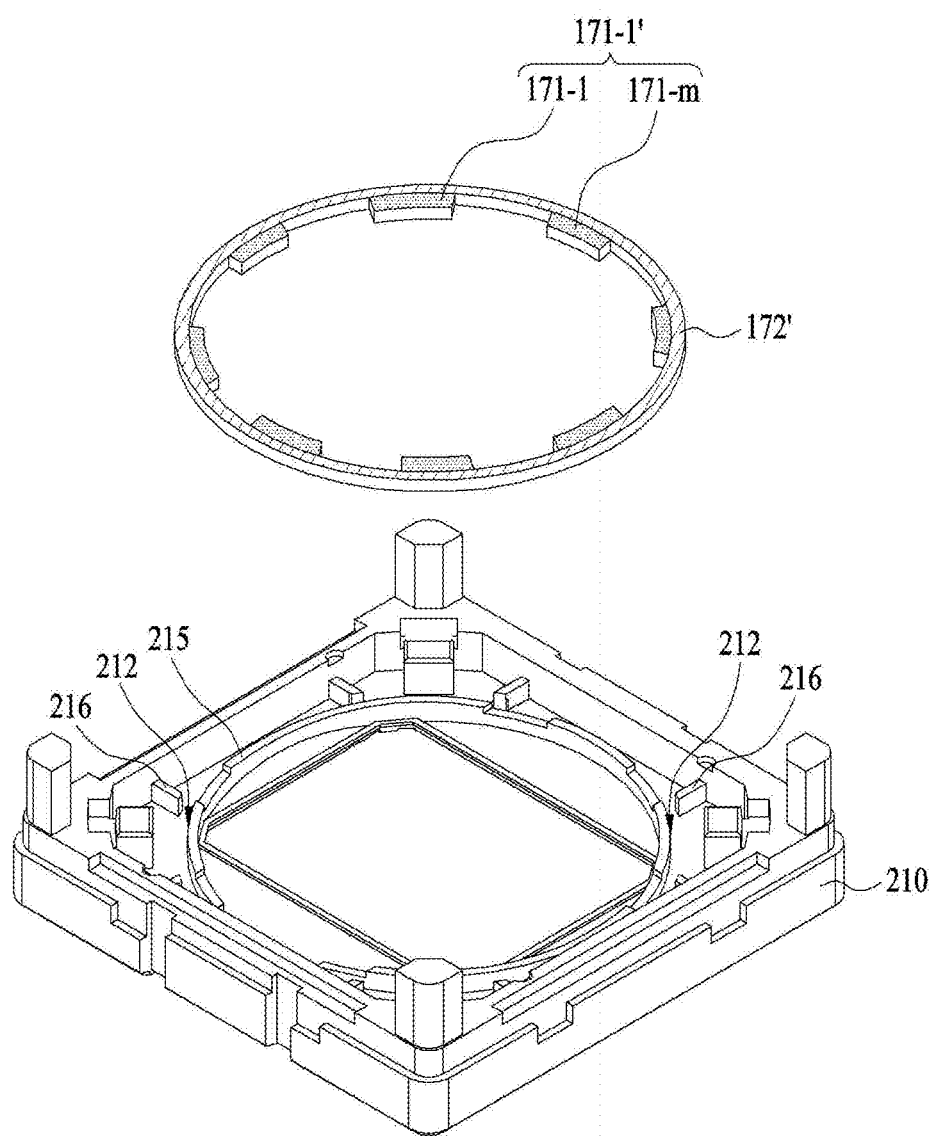

FIG. 8d shows the disposition of a magnetic member 171-1' and the second coil 172', according to yet another embodiment.

Referring to FIG. 8d, the magnetic member 171-1' may include a plurality of first magnetic members 171-1 to 171-m (m being a natural number >1), which are spaced apart from each other. While each of the magnetic members 171', which are illustrated in FIGS. 8a to 8c, has a ring shape, each of the first magnetic members 171-1 to 171-m, which are illustrated in FIG. 8d, may have a linear bar shape.

The first magnetic members 171-1 to 171-m may be positioned inside the second coil 172'. The first magnetic members 171-1 to 171-m may be brought into contact with the side surface of the projecting portion 215 of the base 210. The inner surface of the second coil 172' may be brought into contact with the outer surfaces of the first magnetic members 171-1 to 171-m. The lower surfaces of the first magnetic members 171-1 to 171-m and the lower surface of the second coil 172' may be brought into contact with the upper surface of the base 210.

Figure 8E:
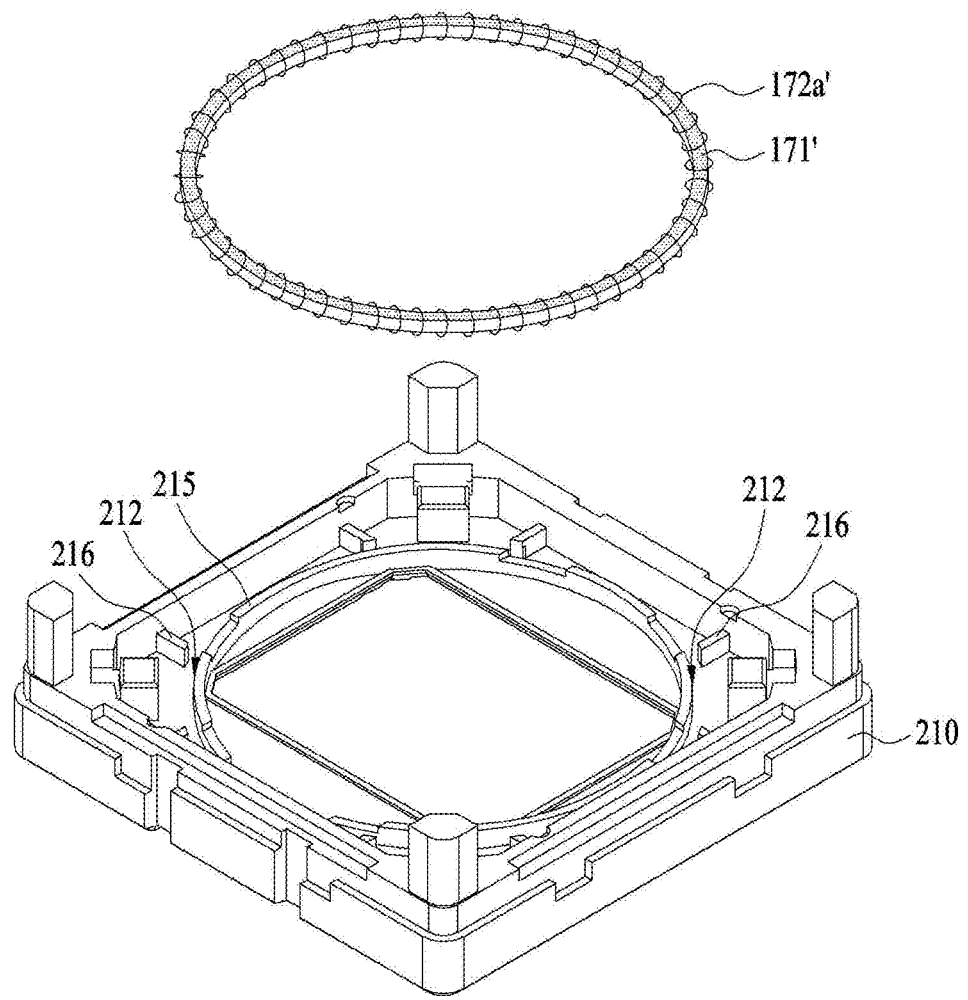

FIG. 8e shows the disposition of the magnetic member 171' and a second coil 172a' according to a further embodiment.

Referring to FIG. 8e, the second coil 172a' may be wound around the outer peripheral surface of the magnetic member 171'. For example, the second coil 172a' may be wound around the ring-shaped magnetic member 171f in a clockwise or counterclockwise direction.

The magnetic member 171', which is provided with the second coil 172a' wound around the outer peripheral surface thereof, may be disposed in the groove 212 provided in the upper surface of the base 210. For example, the magnetic member 171', which is provided with the second coil 172a' wound around the outer peripheral surface thereof, may be disposed between the projecting portion 215 and the guide portions of the base 210.

For example, at the position illustrated in FIGS. 8a to 8e, for example, at the initial position of the bobbin 1110, the second coil 172' or 172a' and the magnetic member 171' or 171-1' may not overlap the first coil 120 in the optical-axis direction or in the first direction, without being limited thereto. In another embodiment, at the initial position of the bobbin 1110, the second coil 172' or 172a' and the magnetic member 171' or 171-1' may overlap the first coil in the optical-axis direction or in the first direction.

Although the second coil 172' or 172a' and the magnetic member 171' or 171-1', which are illustrated in FIGS. 8a to 8e, may not overlap the magnets 130 in the optical-axis direction or in the first direction, the disclosure is not limited thereto. In another embodiment, the second coil 172' or 172a' and the magnetic member 171' or 171-1' may overlap the magnets in the optical-axis direction or in the first direction.

Figure 9:
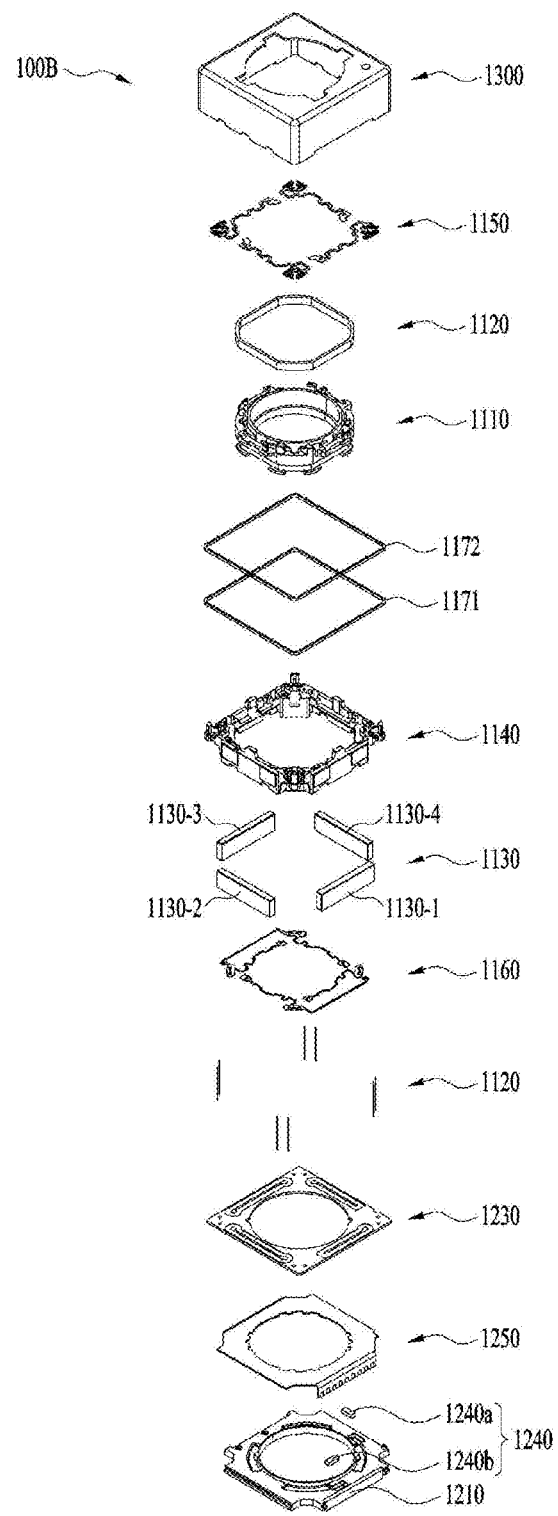
FIG. 9 is an exploded perspective view of a lens moving apparatus according to still another embodiment.
Figure 10:
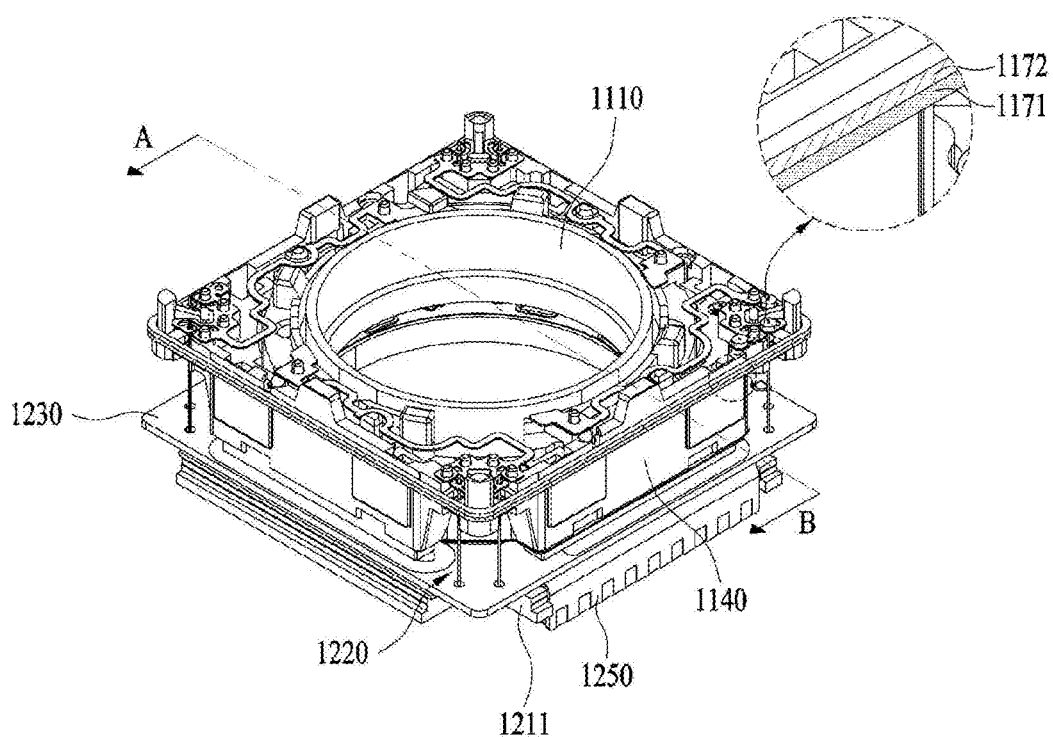
FIG. 10 is an assembled perspective view of the lens moving apparatus of FIG. 9, from which a cover member is removed.

FIG. 9 is an exploded perspective view of a lens moving apparatus 100B according to still another embodiment, and FIG. 10 is an assembled perspective view of the lens moving apparatus 100B illustrated in FIG. 9, from which a cover 1300 is removed.

Referring to FIGS. 9 and 10, the lens moving apparatus 100B includes a bobbin 1110, a first coil 1120, a magnet 1130, a housing 1140, an upper elastic member 1150, a lower elastic member 1160, a magnetic member 1171, a second coil 1172, support members 1220, a third coil 1230, a circuit board 1250 and position sensors 1240. The lens moving apparatus 100B may further include the cover member 1300 and a base 1210.

The description of the cover member 300 illustrated in FIG. 1 may be taken as a description of the cover member 1300.

The bobbin 1110 is disposed inside the housing 1140.

Figure 11A:
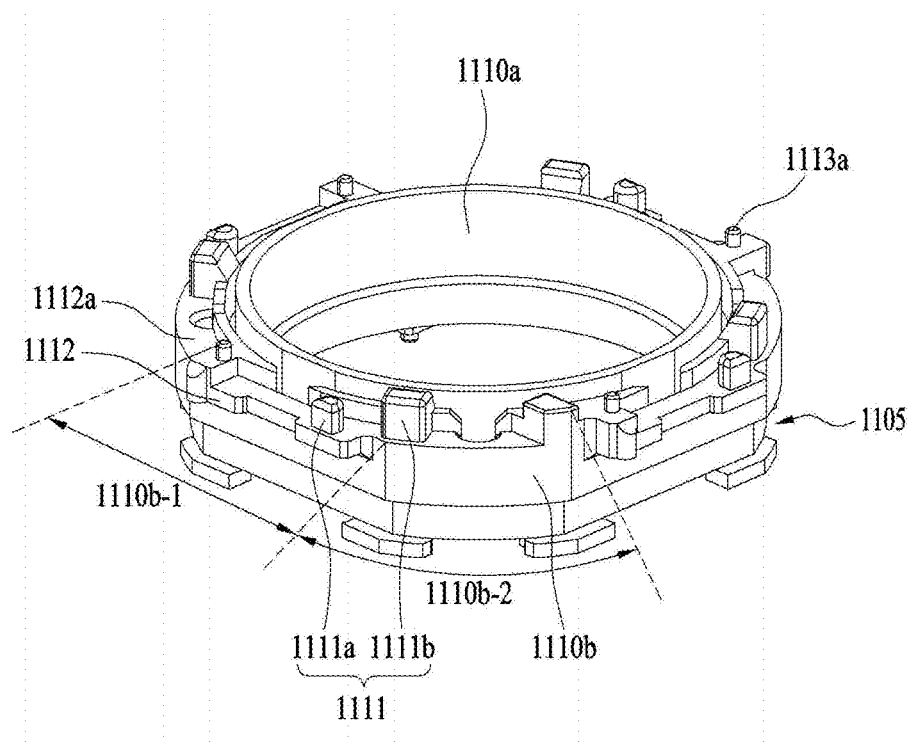
FIG. 11a is a first perspective view of a bobbin illustrated in FIG. 9.
Figure 11B:
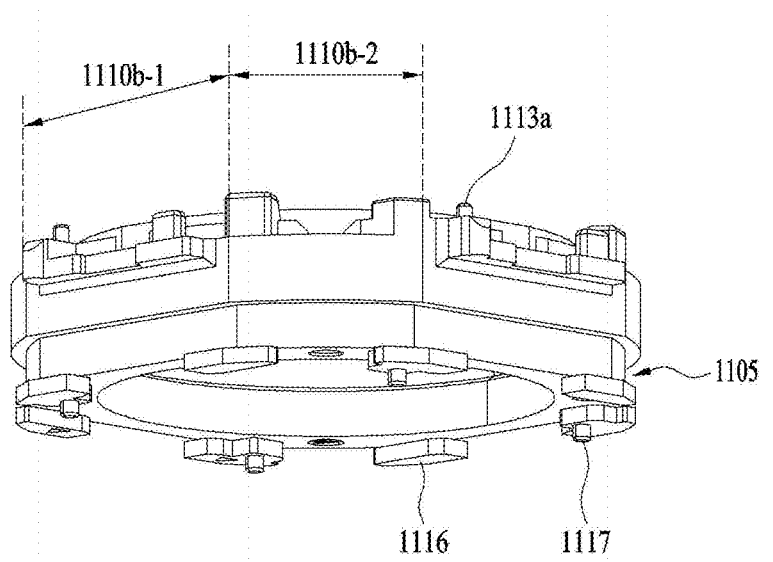
FIG. 11b is a second perspective view of the bobbin illustrated in FIG. 9.

FIG. 11a is a first perspective view of the bobbin 1110 illustrated in FIG. 9, and FIG. 11b is a second perspective view of the bobbin 1110 illustrated in FIG. 9.

Referring to FIGS. 11a and 11b, the bobbin 1110 may include a first projecting portion 1111, which projects upwards from the upper surface thereof in the first direction, and a second projecting portion 1112, which projects from the outer peripheral surface thereof in a direction perpendicular to the optical-axis direction.

The first projecting portion 111 of the bobbin 1110 may include a guide portion 1111a and a first stopper 1111b. The guide portion 1111a of the bobbin 1110 may function to guide the mounting position of the upper elastic member 1150. For example, the guide portion 1111a of the bobbin 1110 may guide a first frame-connecting portion 1153 of the upper elastic member 1150.

The second projecting portion 1112 of the bobbin 110 may project from the outer peripheral surface of the bobbin 1110 in the second and/or third directions, which are perpendicular to the first direction. The second projecting portion 1112 of the bobbin 1110 may be provided on the upper surface thereof with a first coupling protrusion 1113a, which is coupled to a through hole 1151a in a first inner frame 1151 of the upper elastic member 1150.

The first stopper 1111b of the first projecting portion 1111 and the second projecting portion 1112 may function to inhibit the upper surface of the bobbin 1110 from directly colliding with the inner surface of the cover member even when the bobbin 110 moves beyond a predetermined range due to external impact or the like during movement of the bobbin 1110 in the first direction to implement an autofocusing function.

The bobbin 1110 may include a second coupling protrusion 1117 provided on the upper surface thereof, which is coupled and secured to a through hole 1161a in the lower elastic member 1160.

The bobbin 1110 may include a second stopper 1116 projecting from the lower surface thereof. The second stopper 1116 may function to inhibit the upper surface of the bobbin 110 from directly colliding with the base 1210, the third coil 1230 or the circuit board 1250 even when the bobbin 1110 moves beyond a predetermined range due to external impact or the like during movement of the bobbin 1110 in the first direction to implement an autofocusing function.

The bobbin 1110 may include first side sections 1110b-1 and second side sections 1110b-2 disposed between the first side sections 1110b-1.

The first side sections 1110bb-1 of the bobbin 1110 may correspond to or be aligned with the magnets, and each of first coils 1120-1 to 1120-4 may be disposed on a corresponding one of the first side sections 1110b-1.

Each of the second side sections 1110b-2 of the bobbin 1110 may be disposed between two adjacent first side sections. The outer peripheral surface of each of the first side sections 1110b-1 may be a flat surface, and the outer peripheral surface of each of the second side sections 1110b-2 may be a curved surface, without being limited thereto.

The first coil 1120 is disposed on the outer or inner peripheral surface of the bobbin 1110. The description of the first coil 110 illustrated in FIG. 1 may be taken as a description of the first coil 1120 illustrated in FIG. 9.

The housing 140 accommodates therein the bobbin, on which the first coil 1120 is disposed.

Figure 12A:
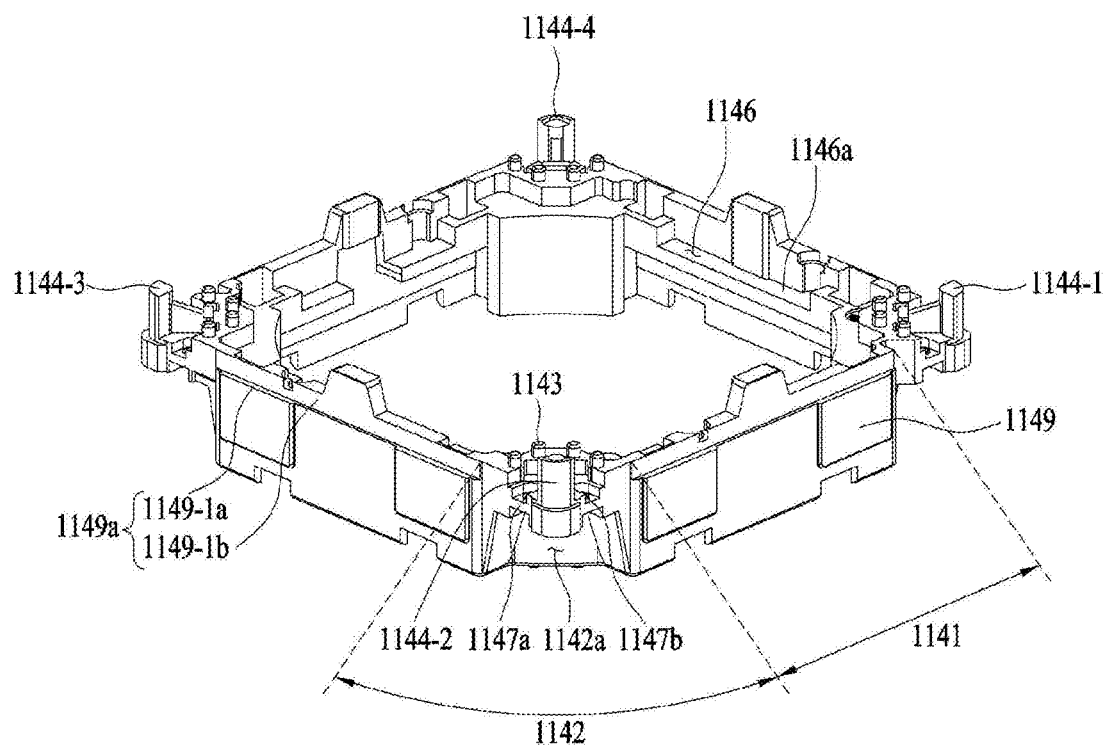
FIG. 12a is a first perspective view of a housing illustrated in FIG. 9.
Figure 12B:
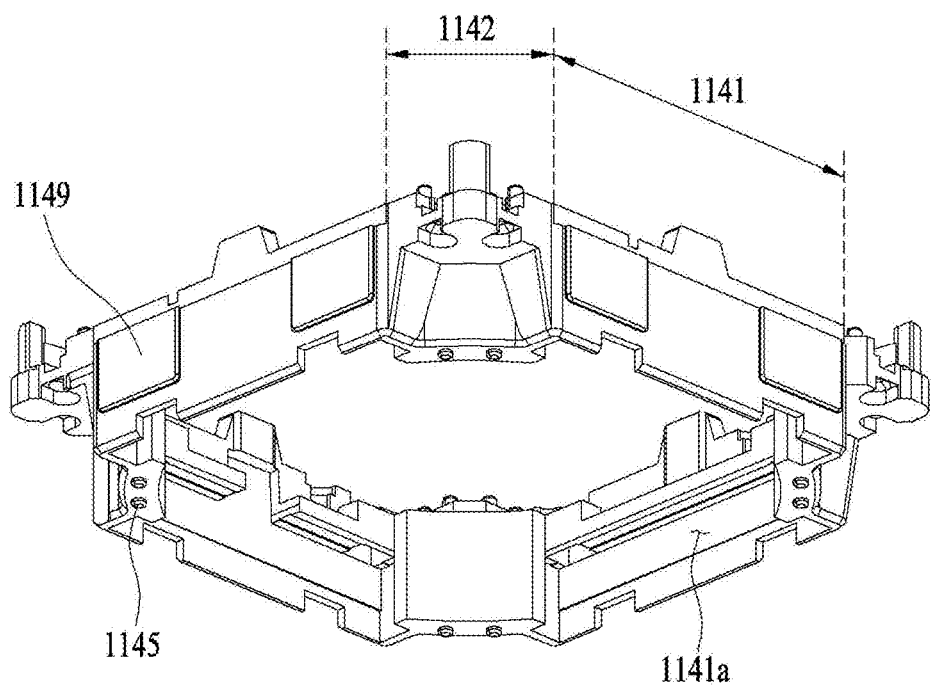
FIG. 12b is a second perspective view of the housing illustrated in FIG. 9.
Figure 13:
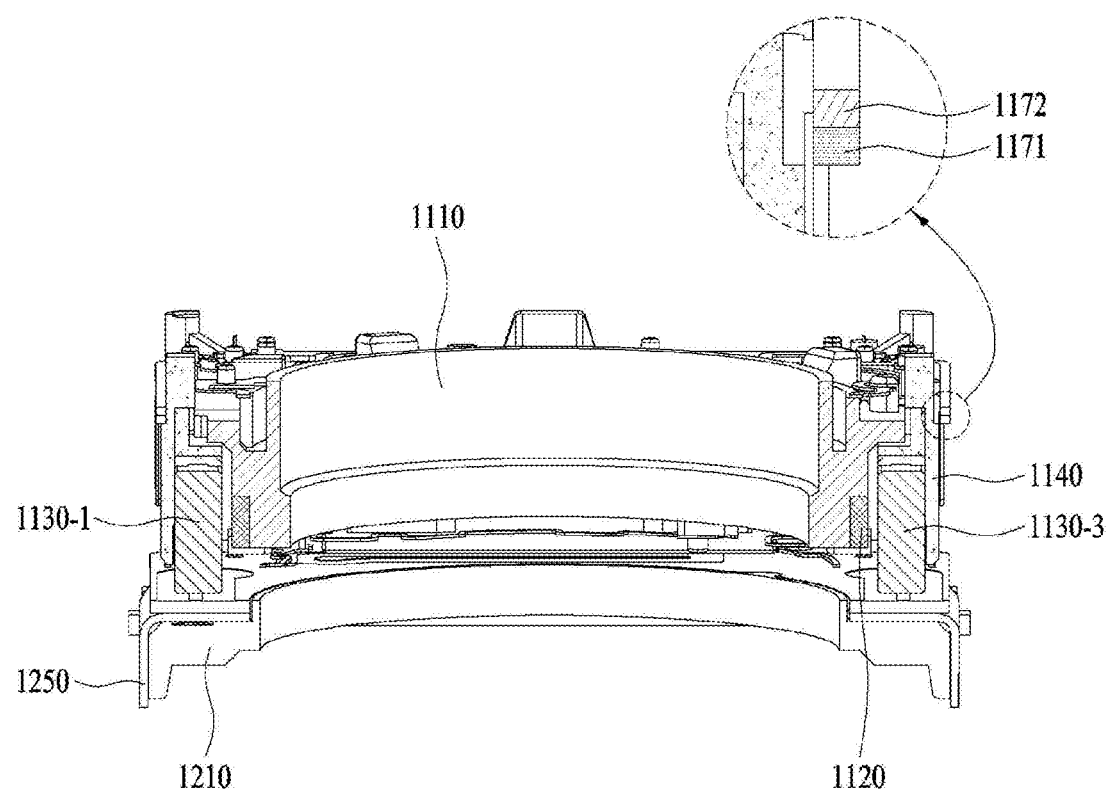
FIG. 13 shows a cross-sectional view of the lens moving apparatus taken along line A-B in FIG. 10.

FIG. 12a is a first perspective view of the housing 1140 illustrated in FIG. 9, and FIG. 12b is a second perspective view of the housing 140 illustrated in FIG. 9. FIG. 13 is a cross-sectional view of the lens moving apparatus 110B taken along line A-B in FIG. 10.

Referring to FIGS. 12a, 12b and 13, the housing 1140 may be configured to have a hollow column shape overall, and may include a plurality of first side sections 1141 and a plurality of side sections 1142, which define an opening or bore. The first side sections 1141 of the housing 140 may be referred to as "side sections", and the second side sections 1142 of the housing 140 may be referred to as "corner sections".

For example, the housing 1140 may include the first side sections 1141, which are spaced apart from each other, and the second side sections 1142, which are spaced apart from each other. Each of the first side sections 1141 of the housing 1140 may be disposed or positioned between two adjacent second side sections 1142 so as to connect the second side sections 1142 to each other, and may include a flat surface having a predetermined depth.

The magnet 1130 may be disposed or mounted on the first side sections 1141 of the housing 1140, and the support members 1220 may be disposed on the second side sections 1141 of the housing 1140.

The housing 1140 may include first mounting grooves 1146, which are provided at positions that correspond to the first and second projecting portions 1111 and 1112 of the bobbin 1110. For example, when the position at which the lower surfaces of the first and second projecting portions 1111 and 1112 are in contact with the bottom surfaces of the first mounting surfaces 1146 of the housing 1140 is set to be the initial position of the housing 1140, the autofocusing function may be controlled in a single direction (for example, in the positive z-axis direction at the initial position). Here, the description of the initial position of the bobbin 1110 may employ a description of the initial position of the bobbin 3110 illustrated in FIGS. 27 and 28.

However, when the position at which the lower surfaces of the first and second projecting portions 1111 and 1112 of the bobbin 1110 are spaced apart from the bottom surfaces 1146a of the first mounting grooves 1146 is set to be the initial position of the bobbin 1110, the autofocusing function may be controlled in two directions (for example, in the positive z-axis direction and in the negative z-axis direction at the initial position of the bobbin).

The housing 1140 may include magnet-mounting portions 1141a provided in the inner surfaces of the first side sections 1141 in order to support or accommodate magnets 1130-1 to 1130-4.

The first side sections 1141 of the housing 1140 may be disposed so as to be parallel to the side surfaces of the cover member 1300. The second side sections 1142 of the housing 1140 may be provided with through holes 1147a and 1147b, through which the support members 1220 extend.

In order to inhibit collisions with the inner surface of the cover member 1300, the upper surface of the housing 1140 may be provided with second stoppers 1144-1 to 1144-4.

For example, the second stoppers 1144-1 to 1144-4 may be positioned at the corners of the second sections 142.

The housing 1140 may include at least one first upper support protrusion 1143, which is provided on the upper surfaces of the second side sections 142, for the purpose of coupling to a through hole 1152a in the first outer frame 1152 of the upper elastic member 1150. Furthermore, the housing 1140 may include a second lower support protrusion 1145, which is provided on the lower surfaces of the second side sections 1142, for the purpose of coupling and securing to a through hole 1162a in the second outer frame 1162 of the lower elastic member 1160.

In order to provide not only paths, through which the support members 1220 extend, but also spaces, which are filled with silicone for performing a damping function, the housing 1140 may include recesses 1142a provided in the second side sections 1142. For example, the recesses 1142a in the housing 1140 may be filled with damping silicone.

The housing 1140 may include third stoppers 1149, which protrude from the side surfaces of the first side sections 1141 in the second or third direction. The third stoppers 1149 are intended to inhibit collisions with the cover member 1300 when the housing 1140 moves in the second and third directions.

In order to inhibit the bottom surface of the housing 1140 from colliding with the base 1210, the third coil 1230 and/or the circuit board 1250, which are to be described later, the housing 1140 may include a fourth stopper (not shown), which protrudes from the lower surface thereof. By virtue of this configuration, the housing 1140 may be spaced apart from the base 1210 in the downward direction, and may be spaced apart from the cover member 1300 in the upward direction. Consequently, it is possible to perform a handshake correction operation for the housing 140 and components mounted on the housing in a direction perpendicular to the optical axis.

Although the magnets 1130-1 to 1130-4 are disposed inside the first side sections 1141 of the housing 1140, the disclosure is not limited thereto. In another embodiment, the magnets 1130-1 to 1130-4 may be disposed outside the first side sections 1141 of the housing 1140. The description of the magnet 130 illustrated in FIG. 1 may be applied to the magnet 1130 illustrated in FIG. 9.

The first and second side sections 1141 and 1142 of the housing 1140 may be provided with mounting portions 1149a, in which the magnetic member 1171 and the second coil 1172 are disposed or mounted. The mounting portions 1149a may be a structure in which portions of the outer surfaces of the first and second side sections 1141 and 1142 of the housing 1140 are depressed.

For example, the mounting portions 1149 of the housing 1140 may be positioned at a peripheral region of the upper surface of the housing that is adjacent to the edge of the housing 1140 at which the upper surfaces and side surfaces of the first and second side sections 1141 and 1142 meet each other.

For example, a height difference may be provided between the mounting portions 1149 of the housing 1140 and the upper surface of the housing 140 in the vertical or first direction.

For example, the mounting portions 1149 of the housing 1140 may include support surfaces 1149-1a, which are positioned under the upper surfaces of the first and second side sections 1141 and 1142, and side surfaces 1149-1b, which are positioned between the upper surface of the housing 1140 and the support surfaces 1149-1*a* of the housing 1140.

A height difference may be present between the support surface 1149-1*a* and the upper surface of the housing 1140. For example, the height difference between the support surface 1149-1*a* and the upper surface of the housing 1140 may be greater than or equal to the sum of the thickness of the magnetic member 1171 and the thickness of the second coil 1172, without being limited thereto.

The magnetic member 1171 and the second coil 1172 may be disposed on the upper surface of the housing 1140 or the side surfaces of the upper portions of the first and second side sections 1141 and 1142 of the housing 1140.

For example, the magnetic member 1171 and the second coil 1172 may be disposed on the mounting portion 1149*a* of the housing 1140.

Figure 16A:
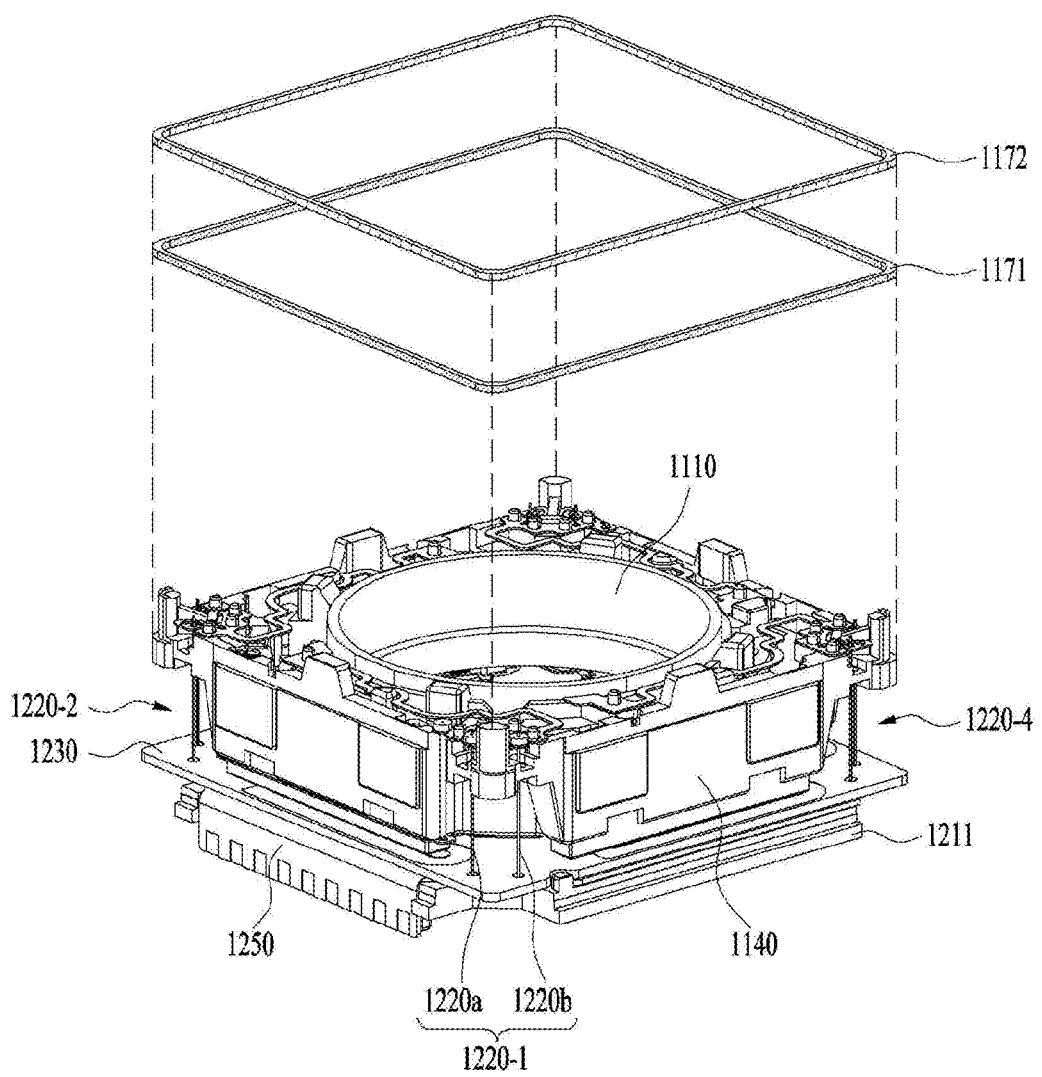
FIGS. 16a to 16e show embodiments of a magnetic member and a second coil disposed on a housing of FIG. 9.

FIG. 16*a* shows an embodiment of the magnetic member 1171 and the second coil 1172 disposed on the housing 1140.

Referring to FIG. 16*a*, the magnetic member 1171 may be disposed on the mounting portion 1149*a* of the housing 1140, and the second coil 1172 may be disposed on the magnetic member 1171. For example, the lower surface of the magnetic member 1171 may be brought into contact with the support surface 1149-1 of the mounting portion 1149*a* of the housing 1140, and the lower surface of the second coil 1172 may be brought into contact with the upper surface of the magnetic member 1171. In another embodiment, the magnetic member 1171 may be disposed under the second coil 1172 so as to be spaced apart from the second coil 1172*a*.

The second coil 1172 may be wound about the optical axis in the clockwise or counterclockwise direction so as to form a ring shape. For example, the second coil 1172 may have a closed loop shape, for example, a ring shape, which surrounds the side surface 1149-1*b* of the mounting portion 1149*a* of the housing 1140. The magnetic member 1171 and the second coil 1172 may be brought into contact with the side surface 1149-1*b* of the mounting portion 1149*a* of the housing 1140.

The second coil 1172 and the magnetic member 1171 may be brought into contact with the outer surfaces of the second stoppers 1144-1 to 1144-4, and may be positioned outside the second stoppers 1144-1 to 1144-4.

The description of the magnetic member 171 and the second coil 172, which are illustrated in FIG. 3*a*, may be applied to those illustrated in FIG. 16*a*.

Figure 16B:
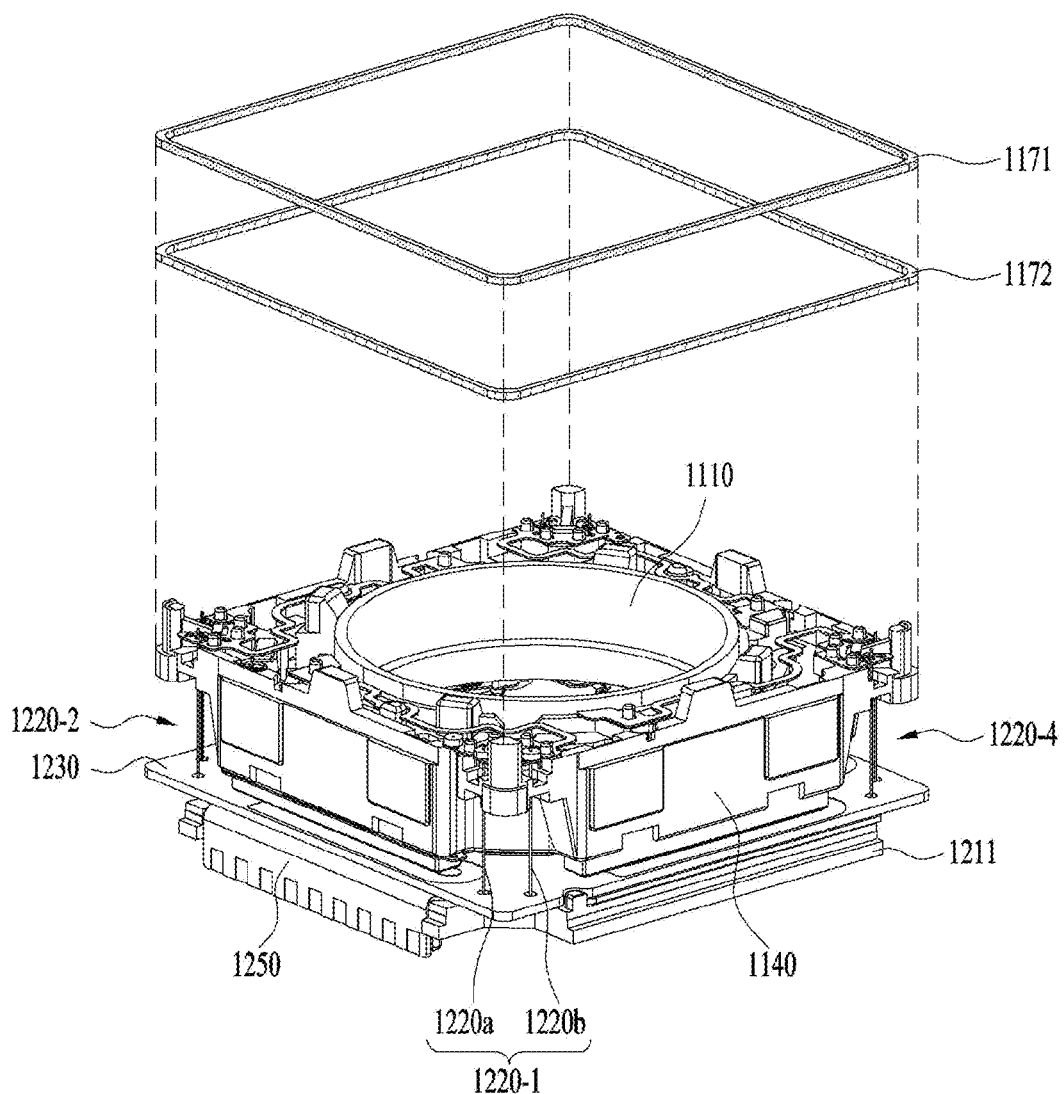

FIG. 16*b* shows another embodiment of the magnetic member 1171 and the second coil 1172, which are disposed on the housing 1140.

Referring to FIG. 16*b*, the magnetic member 1171 is disposed on the second coil 1172. For example, the second coil 1172 may be disposed on the support surface 1149-1*a* of the mounting portion 1149*a* of the housing 1140, and the magnetic member 1171 may be disposed on the second coil 1172. The description of the magnetic member 171 and the second coil 172, which are illustrated in FIG. 3*b*, may be applied to those illustrated in FIG. 16*b*.

Figure 16C:
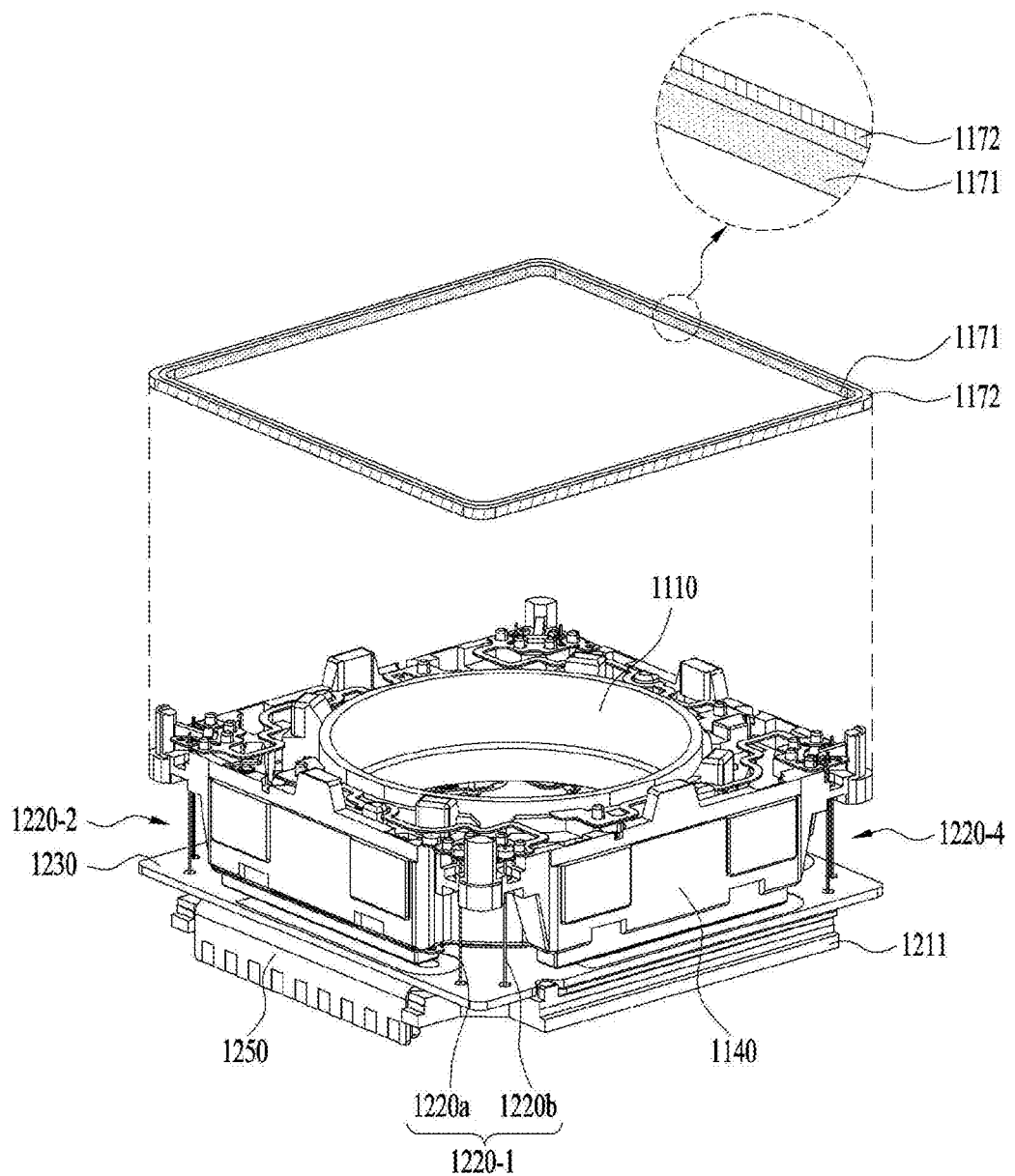

FIG. 16*c* shows still another embodiment of the magnetic member 1171 and the second coil 1172, which are disposed on the housing 1140 illustrated in FIG. 9.

Referring to FIG. 16*c*, the second coil 1172 may be disposed outside of the magnetic member 1171. In other words, the second coil 1172 may surround the outer surface of the magnetic member 1171. The description of the magnetic member 171 and the second coil 172, which are illustrated in FIG. 3*c*, may be applied to those illustrated in FIG. 16*c*. In another embodiment, the magnetic member 1171 may be disposed outside the second coil 1172, and the magnetic member 1171 may surround the outer surface of the second coil 1172.

Figure 16D:
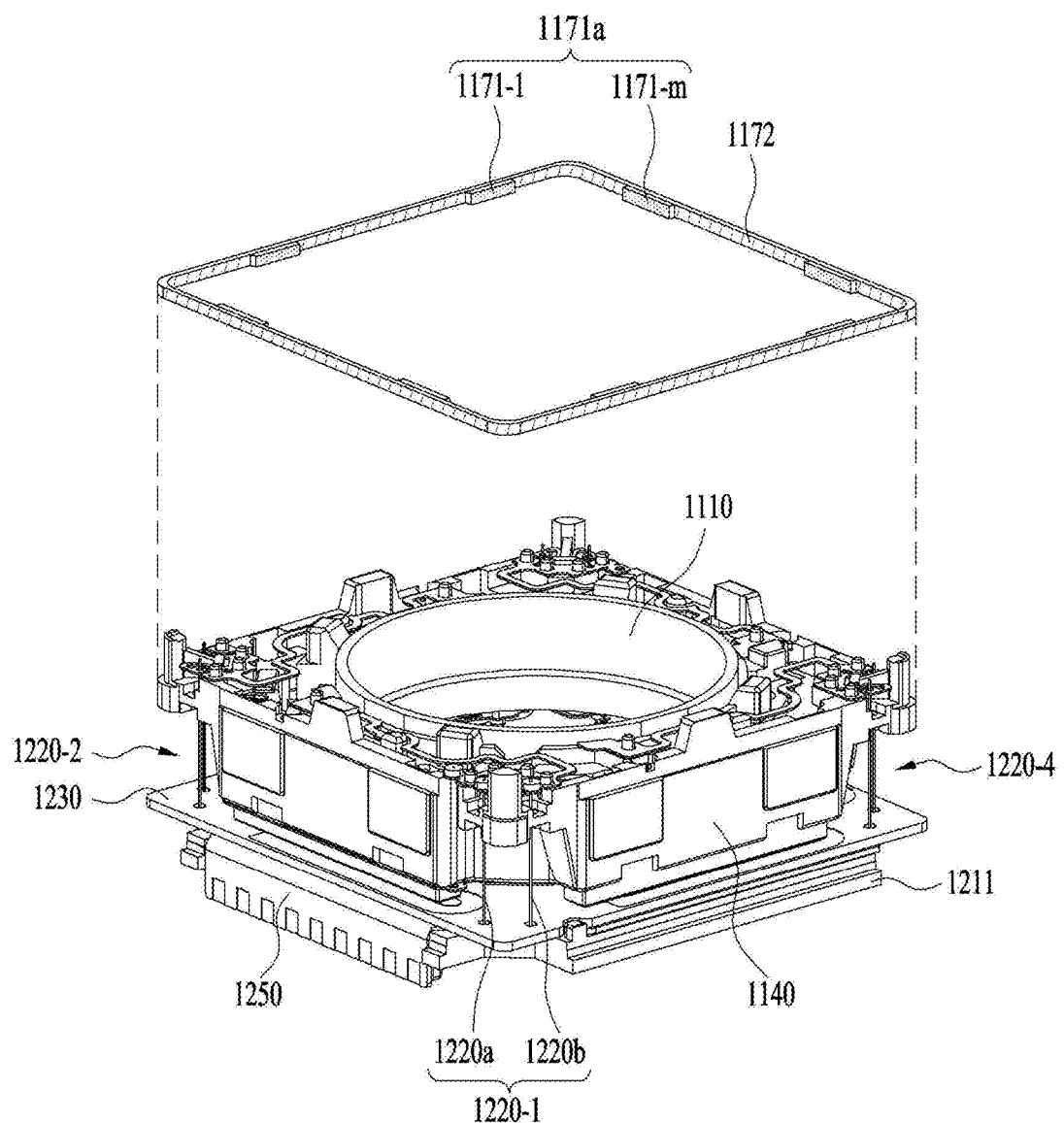

FIG. 16*d* shows yet another embodiment of the magnetic member 1171 and the second coil 1172, which are disposed on the housing 1140 illustrated in FIG. 9.

Referring to FIG. 16*d*, a magnetic member 1171*a* may include a plurality of first magnetic members 1171-1 to 1171-*m*, which are spaced apart from each other. The first magnetic members 1171-1 to 1171-*m* may be attached to the second coil 1172 by means of an adhesive member. The description of the magnetic member 171-1 and the second coil 172, which are illustrated in FIG. 3*d*, may be applied to those illustrated in FIG. 16*d*.

Figure 16E:
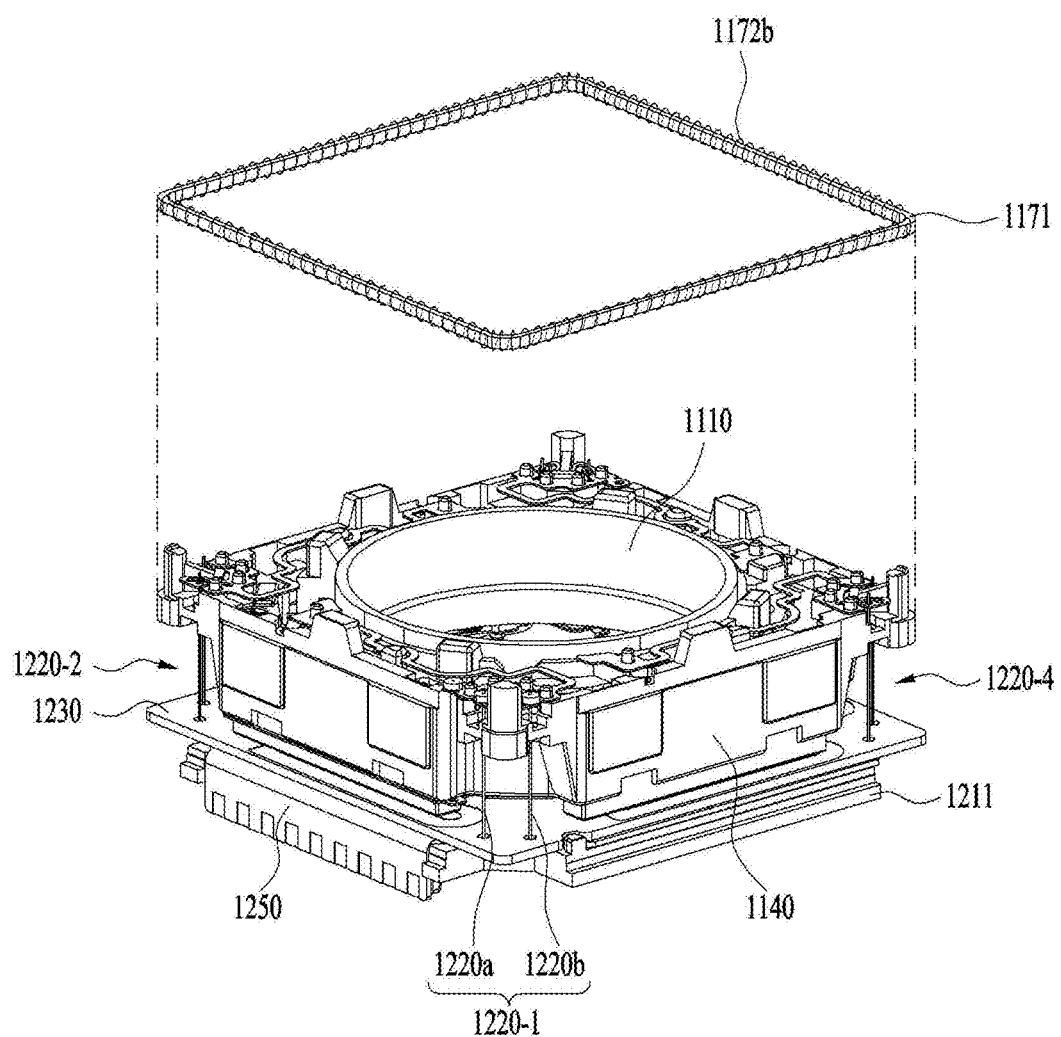

FIG. 16*e* shows a further embodiment of the magnetic member 1171 and the second coil 1172, which are disposed on the housing 1140 illustrated in FIG. 9.

Referring to FIG. 16*e*, a second coil 1172*b* may be wound around the outer peripheral surface of the magnetic member 1171. The description of the magnetic member 171 and the second coil 172*b*, which are illustrated in FIG. 3*e*, may be applied to those illustrated in FIG. 16*e*.

The magnetic member 1171 may have a closed loop shape, for example, a ring shape, and may be disposed on the upper surface of the housing 1140, or may be disposed so as to surround the outer surfaces of the first and second side sections of the housing 1140. The mounting portion 1149*a* of the housing 1140 may also be formed in the first and second side sections 1141 and 1142 of the housing 1140 so as to correspond to or coincide with the shapes of the magnetic member 1171 and the second coil 1172.

The magnetic member 1171 and the second coil 1172 may be secured or coupled to the mounting portion 1149*a* of the housing 1140 by means of epoxy, thermosetting adhesive, light curing adhesive or the like.

The upper elastic member 1150 and the lower elastic member 1160 may be coupled to the bobbin 1110 and the housing 1140 so as to elastically support the bobbin 1110.

Figure 14:
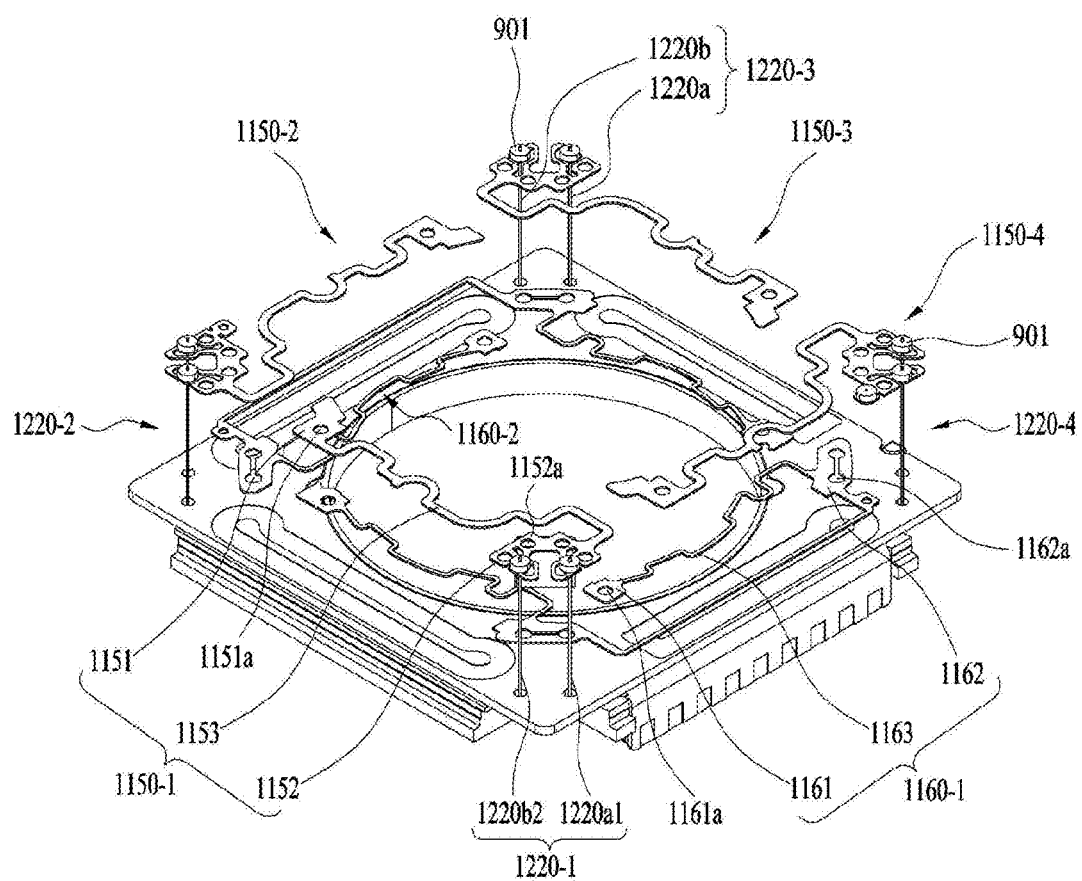
FIG. 14 is an assembled perspective view of an upper elastic member, a lower elastic member, a third coil, a circuit board and a base, which are illustrated in FIG. 9.
Figure 15:
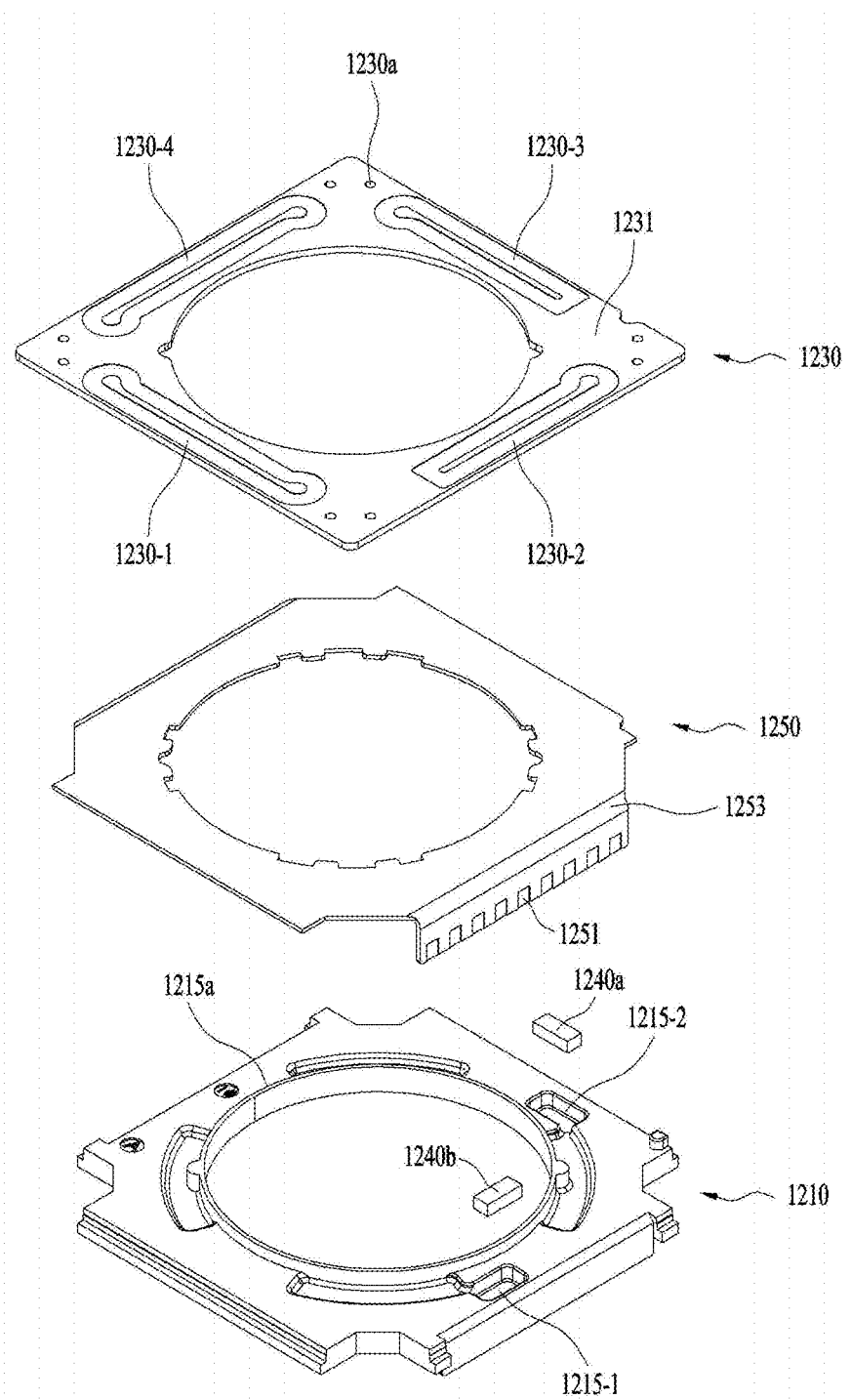
FIG. 15 is an exploded perspective view of the third coil, the circuit board, the base and first and second position sensors.

FIG. 14 is an assembled perspective view of the upper elastic member 1150, the lower elastic member 1160, the third coil 1230, the circuit board 1250 and the base 1210, and FIG. 15 is an exploded perspective view of the third coil 1230, the circuit board 1250, the base 1210 and the first and second position sensors 1240*a* and 1240*b*.

Referring to FIGS. 14 and 15, the upper elastic member 1150 may be divided into a plurality of segments. For example, the upper elastic member 1150 may include first to fourth elastic members or first to fourth upper springs 1150-1 to 1150-4, which are separated from one another.

Each of the first to fourth upper springs 1150-1 to 1150-4 may include a first inner frame 1151 coupled to the bobbin 1110, a first outer frame 1152 coupled to the housing 1140 and a first connecting portion 1153 connecting the first inner frame 1151 to the first outer frame 1152.

In another embodiment, the first outer frame 1152 of at least one of the first to fourth upper springs (1150-1 to 1150-4 may be divided into two or more segments, and at least one of the divided first outer frames may be conductively connected to the second coil 1172. Here, the at least one of the divided first outer frames may be provided with a coupling portion, to which the second coil 1172 is bonded.

The lower elastic member 1160 may be divided into a plurality of segments. For example, the lower elastic member 1160 may include a first lower spring 1160-1 and a second lower spring 1160-2, which are separated from each other. Each of the first and second lower springs 1160-1 and 1160-2 may include a second inner frame 1161 coupled to the bobbin 1110, the second outer frame 1162 coupled to the housing 1140, and a second connecting portion 1163 connecting the second inner frame 1161 to the second outer frame 1162.

As with the upper and lower elastic members 150 and 160 illustrated in FIG. 1, each of the upper springs 1150-1 to 1150-4 may include a first inner coupling portion provided at the first inner frame 1151 and a first outer coupling portion provided at the first outer frame 1152. Each of the lower springs 1160-1 and 1160-2 may include a second inner coupling portion provided at the second inner frame 1161 and a second outer coupling portion provided at the second outer frame 1162.

The first coil 1120 may be conductively connected to two of the plurality of first and second inner coupling portions of the upper and lower elastic members 1150 and 1160, and the second coil 1172 may be conductively connected to two other ones of the first and second inner coupling portions.

For example, the first coil 1120 may be conductively connected to the first inner frames of the first and second upper springs 1150-1 and 1150-2, and the second coil 1172 may be conductively connected to the first inner frames of the third and fourth upper springs 1150-3 and 1150-4.

The first and second outer coupling portions of the upper and lower elastic members 1150 and 1160 may be conductively connected to the circuit board 1250 via the support members 220.

A drive signal from the circuit board 1250 may be supplied to the first coil 1120 via the support members 220 and the upper and lower elastic members 1150 and 1160, and output from the second coil 1172 may be transmitted to the circuit board 1250.

For example, by means of solder or a conductive adhesive members 901, the first coil 1120 may be bonded to the first inner coupling portions of two of the first to fourth upper springs 1150-1 to 1150-4 (for example, 1150-1 and 1150-2), and the second coil 1172 may be bonded to two other ones (for example, 1150-3 and 1150-4) of the first to fourth upper springs 1150-1 to 1150-4.

For example, by means of solder or a conductive adhesive members 901, two of the first to fourth support members 1220-1 to 1220-4 (for example, 1220-1 and 1220-2) may conductively connect the first and second upper springs 1150-1 and 1150-2 to the first and second terminals of the circuit board 1250, and the two remaining ones of the first to fourth support members 1220-1 to 1220-4 (for example, 1220-3 and 1220-4) may conductively connect the third and fourth upper springs 1150-3 and 1150-4 to the third and fourth terminals of the circuit board 1250.

The base 1210 may be positioned under the bobbin 1110 and the housing 1140, and may include a support groove formed in the surface thereof that faces a terminal rib 1253 of the circuit board 1250.

The base 1210 may include position-sensor-mounting grooves 215a and 215b, which are depressed from the upper surface thereof and in which the position sensors 240a and 240b are disposed.

Furthermore, the base 1210 may include a projecting portion 1215a, which projects from the upper surface thereof adjacent to the opening or bore.

The first and second position sensors 1240a and 1240b may be disposed in the position-sensor-mounting grooves 1215-1 and 1215-2 in the base 1210, which are positioned under the circuit board 1250, and may be conductively connected to the circuit board 1250. The first and second position sensors 1240a and 1240b may be mounted or disposed on the lower surface of the circuit board 1250.

When the housing 1140 moves in the second and/or third directions, the first and second position sensors 1240a and 1240b may detect variation in the magnetic force generated from the magnet 1130.

For example, each of the first and second position sensors 1240a and 1240b may be embodied as a hall sensor alone, or may be embodied as a driver including a hall sensor. However, this is for illustration only, and any sensor other than one using magnetic force may be used as long as it can detect position. The first and second position sensors 1240a and 1240b may be sensors for optical image stabilizers (OIS).

The third coil 1230 may be disposed above the circuit board 1250, and the first and second position sensors 1240a and 1240b may be disposed under the circuit board 1250.

The circuit board 1250 may be disposed on the upper surface of the base 1210, and may include an opening or bore that corresponds to the opening or bore in the bobbin 1110, the opening or bore in the housing 1140 and/or the opening or bore in the base 1210.

The circuit board 1250 may include at least one terminal rib 1253, which is bent from the upper surface, the terminal rib 1253 including a plurality of terminals or pins 1251, which are conductively connected to the support members 1220 and which receive electrical signals from the outside or supply electrical signals to the outside.

Although the circuit board 1250 may be a FPCB, the disclosure is not limited thereto, and the terminals may be formed by forming terminals on a surface of a PCB or the surface of the base 1210 through surface electrode technology.

The circuit board 1250 may be provided in the corners thereof with escape cuts, which inhibit spatial interference with the support members 1220, or holes, through which the support members 1220 extend.

The third coil 1230 is disposed on the upper surface of the circuit board 1250 so as to correspond to or be aligned with the magnets 130. The number of third coil 1230 may be one or more, and may be equal to the number of magnets 1130, without being limited thereto.

Although the third coil 1230 may include, for example, a plurality of coils 1230-1 to 1230-4, which are formed in an additional board or circuit member 1231 separated from the circuit board 1250, the disclosure is not limited thereto. In another embodiment, the plurality of coils may be disposed on the circuit board 1250 so as to be spaced apart from each other without an additional board or circuit member.

The circuit member 1231 may include an opening or bore that corresponds to the opening or bore in the base 1210 and the opening or bore in the circuit board 1250. Furthermore, the circuit member 1231 may include through holes 1230a, through which the support members 1220 extend.

The projecting portion 1215a of the base 1210 may be fitted into the opening in the circuit board 1250 and the opening in the circuit member 1231.

The third coil 1230 may be conductively connected to the circuit board 1250. For example, the circuit board 1231 may be conductively connected to the circuit board 1250.

A drive signal, for example, a drive current, may be supplied to the third coil 1230. The housing 1140 may be moved in the second and/or third directions, for example, in the x-axis and/or y-axis directions, by virtue of electromagnetic force resulting from interaction between the magnets 1130, which are disposed so as to face or be aligned with each other, and the third coil 1230, which is provided with a drive signal. Handshake correction may be performed by controlling the movement of the housing 1140.

By means of solder or a conductive adhesive members, first ends of the support members 220 may be coupled to the first outer frame 151 of the upper elastic member 1150, and second ends of the support members may be bonded to the third coil 1230, the circuit board 1250 and/or the base 1210. The support members 1220 may support the bobbin 110 and the housing 1140 such that the bobbin 1110 and the housing 1140 can be moved in a direction perpendicular to the first direction.

For example, by means of solder, a first end of each of the support members 1220-1 to 1220-4 may be coupled to a corresponding first outer frame of the first to fourth upper springs, and a second end of each of the support members 1220-1 to 1220-4 may be connected to the lower surface of an additional board or circuit member or the lower surface of the circuit board 1250. In another embodiment, the second ends of the support members 1220-1 to 1220-4 may be connected to pads or electrodes provided on the upper surface of the circuit member 1231 or the upper surface of the circuit board 1250.

The support members 1220 may include a plurality of support members. Each of the plurality of support members 1220-1 to 1220-4 may be disposed on a corresponding one of the second side sections 1141 of the housing 1140.

The plurality of support members 1220-1 to 1220-4 may be made of additional members separated from the upper elastic member 1150, and may be embodied as members having elastic supporting ability, for example, leaf springs, coil springs, suspension wires or the like. In another embodiment, the support members 1220-1 to 1220-4 may be integrally formed with the upper elastic member 1150.

The reason why the magnetic member 1171 and the second coil 1172 are disposed on the upper surfaces or the upper end of the outer surface of the first and second side sections 1141 and 1142 of the housing 1140 is to suppress the influence of the third coil 1230 on the output of the second coil 1172.

The drive signal applied to the third coil 1230 may be an AC signal. When a drive signal is applied to the third coil 1230, an electromagnetic wave or an electromagnetic field may be generated from the third coil 1230. The electromagnetic wave or the electromagnetic field may cause electromotive force, current and voltage to be generated from the second coil 117 by virtue of mutual induction action.

Because electromotive force or induction voltage, which is induced to the second coil 1172 by the third coil 1230, has an influence on the output of the second coil 117, precise detection of the bobbin 1110 by the second coil 117 may be hindered.

By detecting displacement of the bobbin 1110 using the second coil 1172, from which electromotive force or induction voltage is generated by virtue of mutual induction, without using an additional AF position sensor, the embodiment is able to simplify the structure of the lens moving apparatus 100B and to reduce manufacturing costs.

Figure 17:
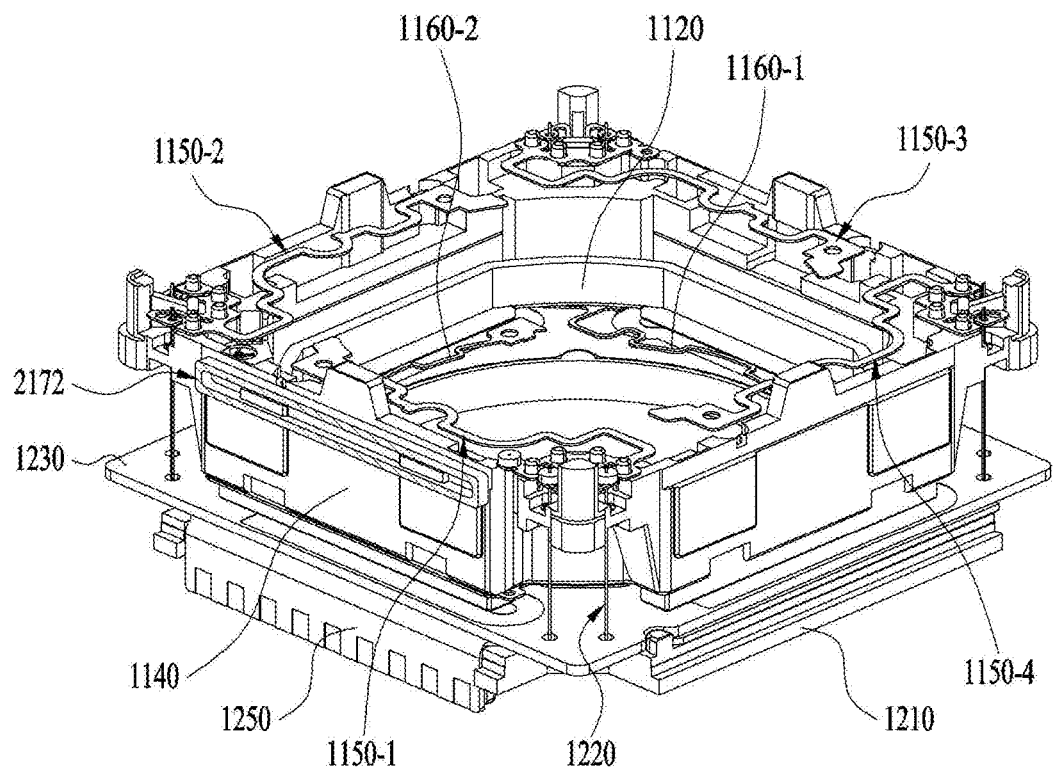
FIG. 17 shows the disposition of a magnetic member and a second coil according to another embodiment.
Figure 18:
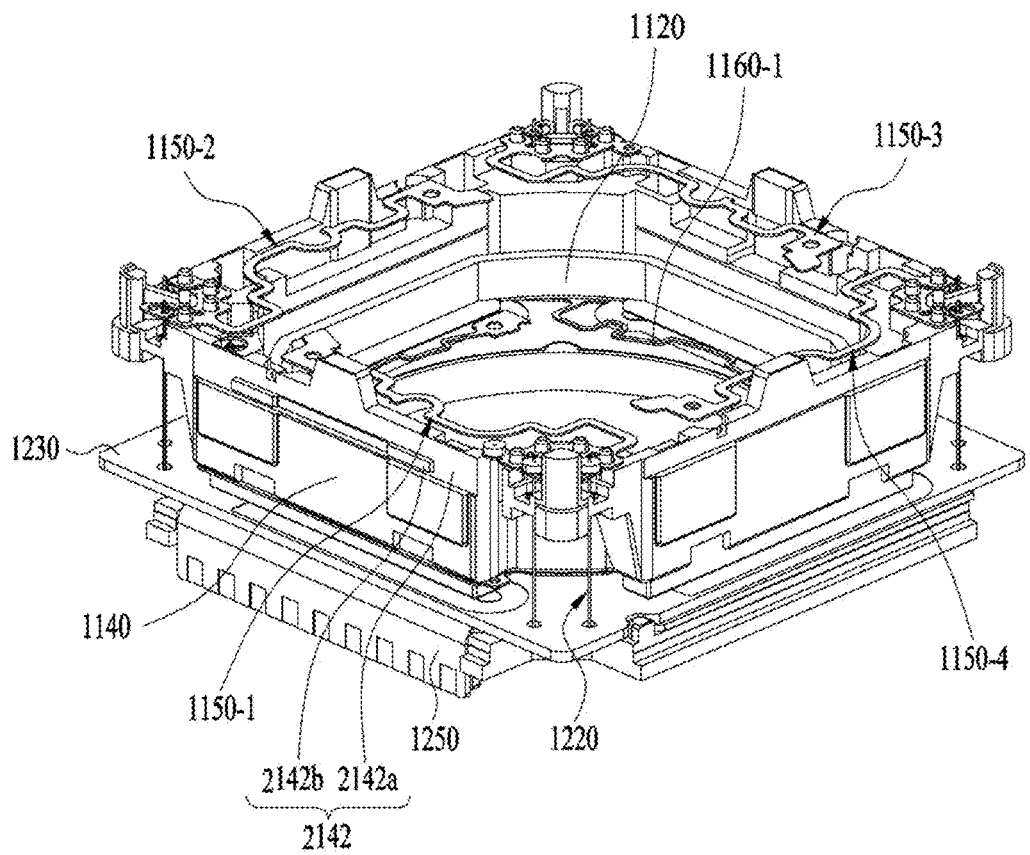
FIG. 18 is a perspective view of FIG. 17, from which the second coil is removed.
Figure 19A:
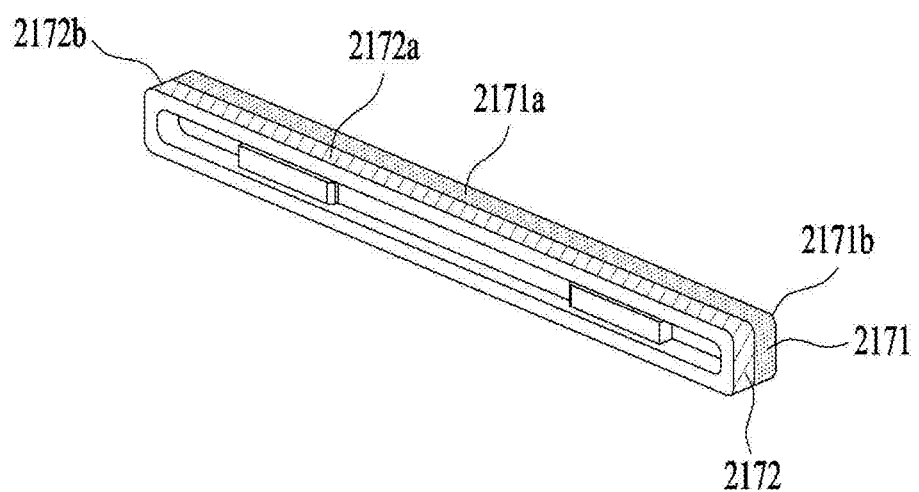
FIGS. 19a and 19b show embodiments of the magnetic member and the second coil, which are illustrated in FIG. 17.

FIG. 17 shows the disposition of a magnetic member 2171 and a second coil 2172 according to another embodiment, and FIG. 18 is a perspective view of FIG. 17, from which the second coil 2172 is removed. FIG. 19a shows an embodiment of the magnetic member 2171 and the second coil 2172, which are illustrated in FIG. 17.

Referring to FIGS. 17, 18 and 19a, the magnetic member 2171 may be disposed on the outer surface of one of the first side sections 1141 of the housing 1140, and may have a closed loop shape, for example, a ring shape. The central axis of the magnetic member 2171 may be perpendicular to the optical axis.

The second coil 2172 may be disposed on one of the first side sections 1141 of the housing 1140, and may be wound in the clockwise or counterclockwise direction about an axis perpendicular to the optical axis so as to form a coil-ring shape.

Referring to FIG. 18, the outer surface of one of the first side sections of the housing 1140 may be provided with a mounting portion 2142 having at least one winding protrusion 2142b on which the magnetic member 2171 and the second coil 2172 are fitted or mounted.

For example, the mounting portion 2142 of the housing 1140 may include a groove portion 2142a, which is depressed from the outer surface of one of the first side sections of the housing 1140, and at least one winding protrusion 2142b protruding from the groove portion 2142a.

For example, the magnetic member 2171 may have a closed loop shape, which includes first linear zones 2171a and first curved zones 2171b, and may be fitted onto the winding protrusion 2142b and disposed in the groove portion 2142a.

The second coil 2172 may have a closed loop shape, which includes second linear zones 2172a and second curved zones 2172b, and may be fitted onto the winding protrusion 2142b and disposed in the groove portion 2142a.

Although the magnetic member 2171 may be disposed in the groove portion 2142a so as to contact the outer surface of the first side section and the second coil 2172 may be disposed outside the magnetic member 2171, the disclosure is not limited thereto.

In another embodiment, the second coil 2172 may be disposed in the groove portion 2142a so as to contact the outer surface of the first side section of the housing 1140, and the magnetic member 2171 may be disposed outside the second coil 2172.

The magnetic member 2171 and the second coil 2172 may not overlap the first coil 1120 in the optical-axis direction or in the first direction.

The magnetic member 2171 and the second coil 2172 may not overlap the first coil 1120 in a direction perpendicular to the optical axis.

Although the magnetic member 2171 and the second coil 2172 may not overlap the magnets 1130 in the optical-axis direction or in the first direction, the disclosure is not limited thereto. In another embodiment, at least one of the magnetic member 2171 and the second coil 2172 may overlap the magnets 1130 in the optical-axis direction or in the first direction.

The magnetic member 2171 and the second coil 2172 may not overlap the upper elastic member 150 in the optical-axis direction or in the first direction. Furthermore, although the magnetic member 2171 and the second coil 2172 may not overlap the lower elastic member 150 in the optical-axis direction or first direction, the disclosure is not limited thereto. In another embodiment, the magnetic member 2171 and the second coil 2172 may overlap the lower elastic member 150 in the optical-axis direction or first direction.

Although the magnetic member 2171 and the second coil 2172 may not overlap the third coils 1230 in the optical-axis direction of in the first direction, the disclosure is not limited thereto. In another embodiment, at least one of the magnetic member 2171 and the second coil 2172 may overlap a corresponding one of the third coils 1230 in the optical-axis direction or in the first direction.

Figure 19B:
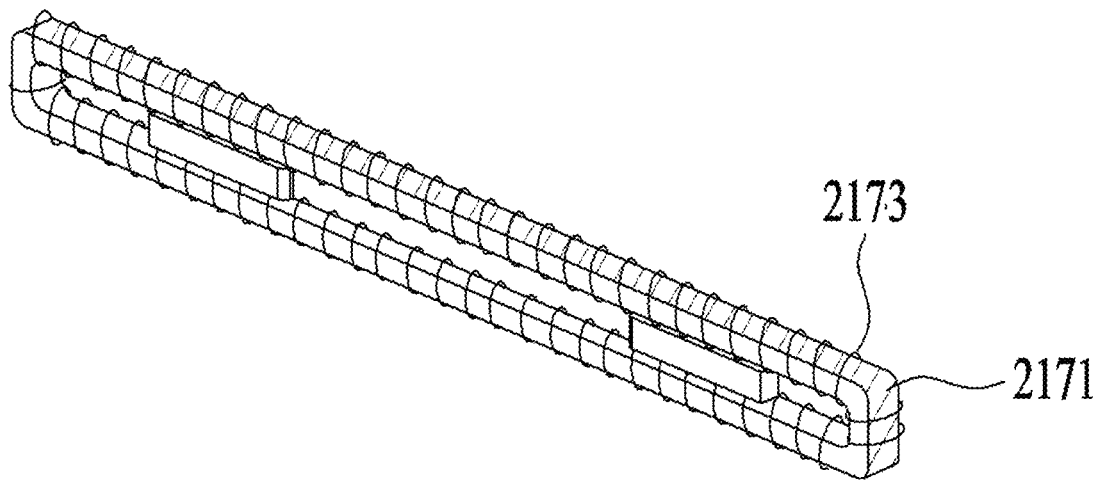

FIG. 19b shows the disposition of the magnetic member 2171 and a second coil 2173, according to another embodiment.

Referring to FIG. 19b, the second coil 2173 may be disposed so as to be wound around the outer peripheral surface of the magnetic member 2171. For example, the second coil 2173 may be wound around the ring-shaped magnetic member 2171 in the clockwise or counterclockwise direction.

The drive signal applied to the first coil 1120 may be a high-frequency pulse signal. Owing to the high-frequency pulse signal, undesired induction current may be generated in the third coil 1230, and thus malfunction in operation for optical image stabilization (OIS) may be generated.

In addition, owing to the high-frequency pulse signal applied to the first coil 1120, errors in output values of the position sensors 1240a and 1240b may be generated.

Furthermore, owing to the high-frequency pulse signal applied to the first coil 1120, noise in the output of the image sensor of the camera module may be generated.

Since it is possible to reduce the intensity of a drive signal applied to the first coil 1120 by virtue of increase in the induction voltage of the second coil 1120 by the magnetic member 1171, the embodiment is able to suppress malfunction of OIS operation attributable to drive signals of the first coil 1120, error in output of the position sensors 1240a and 1240b and noise generation in output of the image sensor.

Typically, an equivalent circuit of a coil may be composed of a resistance component, an inductance component and a capacitance component, and a coil causes resonance phenomenon at a self-resonant frequency. At this time, current and voltage flowing in the coil become the maximum.

In order to inhibit functional deterioration in autofocusing function and handshake function of the lens moving apparatus, the self-resonant frequencies of the first coil 1120 and the second coil 1172 may be designed differently, and the self-resonant frequencies of the second coil 1172 and the third coil 1230 may be designed differently.

For example, in order to suppress audio noise, the self-resonant frequencies of the first coil 1120 and the second coil 1172 may be designed to have a difference of 20 kHz or more therebetween.

For example, the self-resonant frequencies of the first coil 1120 and the second coil 1172 may have a difference therebetween of 20 kHZ to 3 MHz, and the self-resonant frequencies of the second coil 1172 and the third coil 1230 may have a difference therebetween of 20 kHZ to 3 MHz.

The self-resonant frequency of the third coil 1230 may be designed to be higher than the self-resonant frequency of the first coil 1120. The self-resonant frequency of the third coil 1230 may be designed to be higher than the self-resonant frequency of the second coil 1172.

For example, the self-resonant frequency of the third coil 1230 and the self-resonant frequency of the first coil 1120 may be designed to have a difference therebetween of 50 kHz or more.

Furthermore, in order to suppress high-frequency noise attributable to PWM driving, the first and second coils 1120 and 1172 may be driven such that the self-resonant frequencies of the first and second coils 1120 and 1172 are 20 kHz or more. In addition, in order to reduce current consumption, the first and second coils 1120 and 1172 may be driven such that the self-resonant frequencies of the first and second coils 1120 and 1172 are 500 kHz or more.

The lens moving apparatus 100A or 100B according to the embodiment may further include a capacitor, which is connected to the second coil 172 or 1172 in parallel, in order to remove PWM noise. The lens moving apparatus 100A or 100B may further include a capacitor, which is connected to two terminals of the circuit board 1250 in parallel, the circuit board 1250 being conductively connected to the second coils 172 or 1172.

Figure 20:
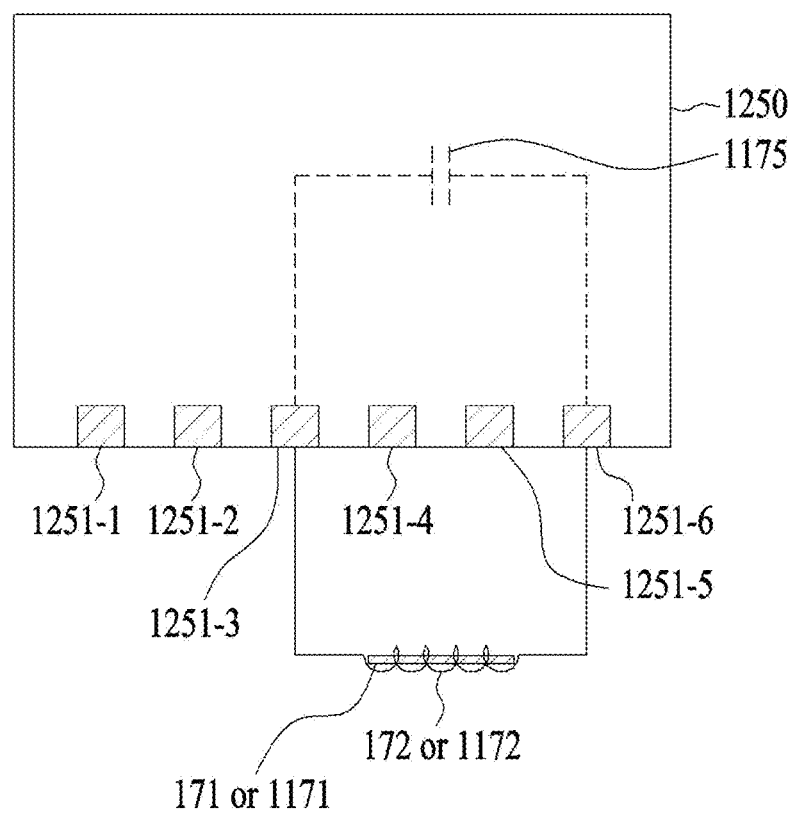
FIG. 20 shows a capacitor for removing PWM noise.

FIG. 20 shows a capacitor 1175 for removing PWM noise.

Referring to FIG. 20, the second coil 172 or 1172 may be conductively connected to two terminals (for example, 1251-3 and 1251-6) of the circuit board 250.

The capacitor 1175 may be connected to two terminals 1251-3 and 1251-6 of the circuit board 1250, to which two ends of the second coil 172 or 1172 are conductively connected, in order to suppress noise component included in the output of the second coil 172 or 1172.

One end of the capacitor 1175 may be connected to the third terminal 1251-3 of the circuit board 250, and the other end of the capacitor 1175 may be connected to the sixth terminal 1251-6 of the circuit board 250. The capacitor 1175 may be connected in parallel to the second coil 172 or 1172, which is connected to the third terminal 1251-3 and the sixth terminal 1251-6.

In another embodiment, the capacitor 1175 may be formed on the circuit board of the camera module rather than the circuit board 250 or 1250 of the lens moving apparatus 100A or 110B.

Figure 21A:
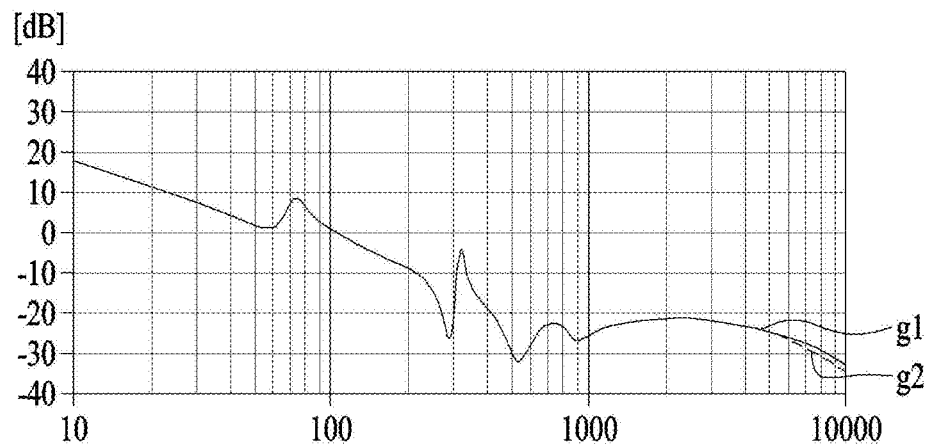
FIG. 21a shows frequency response characteristics with output gain of the second coil depending on whether or not the capacitor is provided.
Figure 21B:
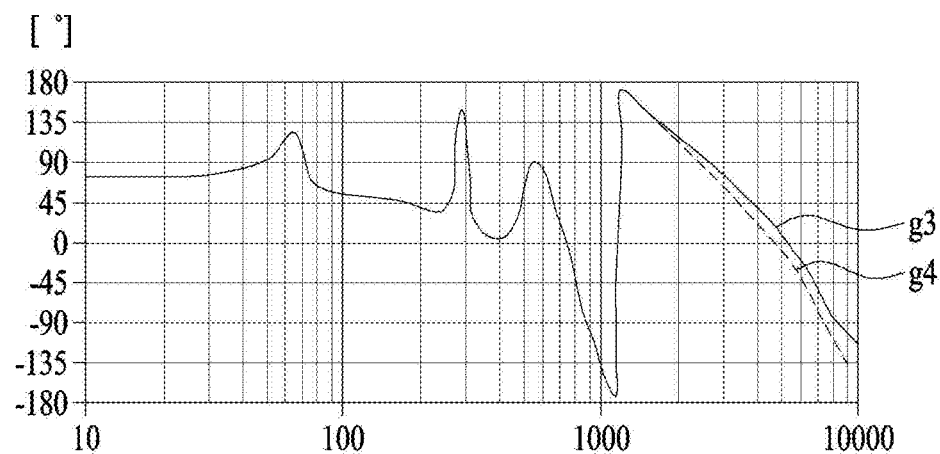
FIG. 21b shows frequency response characteristics with output phase of the second coil depending on whether or not the capacitor is provided.

FIG. 21a shows frequency response characteristics with output gain of the second coil 172 or 1172 depending on whether or not the capacitor 1175 is provided, and FIG. 21b shows frequency response characteristics with output phase of the second coil 172 or 1172 depending on whether or not the capacitor 1175 is provided. Here, g1 represents the output gain of the second coil 172 or 1172 in the case of absence of the capacitor 1175, and g2 represents the output gain of the second coil 172 or 1172 in the case of presence of the capacitor. g3 represents the output phase of the second coil 172 or 1172 in the case of absence of the capacitor 1175, and g4 represents the output phase of the second coil 172 or 1172 in the case of presence of the capacitor 1175.

Referring to FIGS. 21a and 21b, it is possible to remove PWM noise by virtue of addition of the capacitor 1175 and to reduce gain in a frequency range of 1 kHz or more within an audible frequency range.

Figure 23:
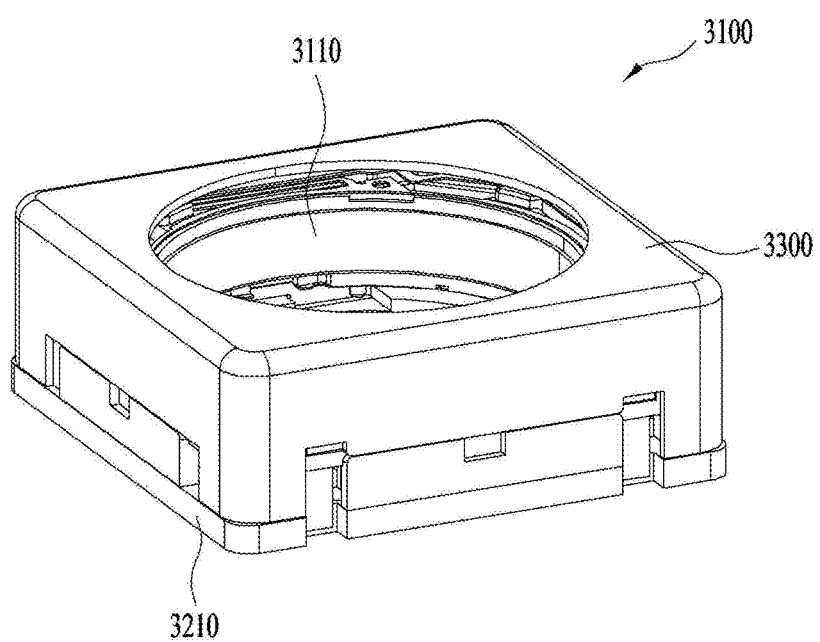
FIG. 23 is a perspective view of a lens moving apparatus according to yet another embodiment.
Figure 24:
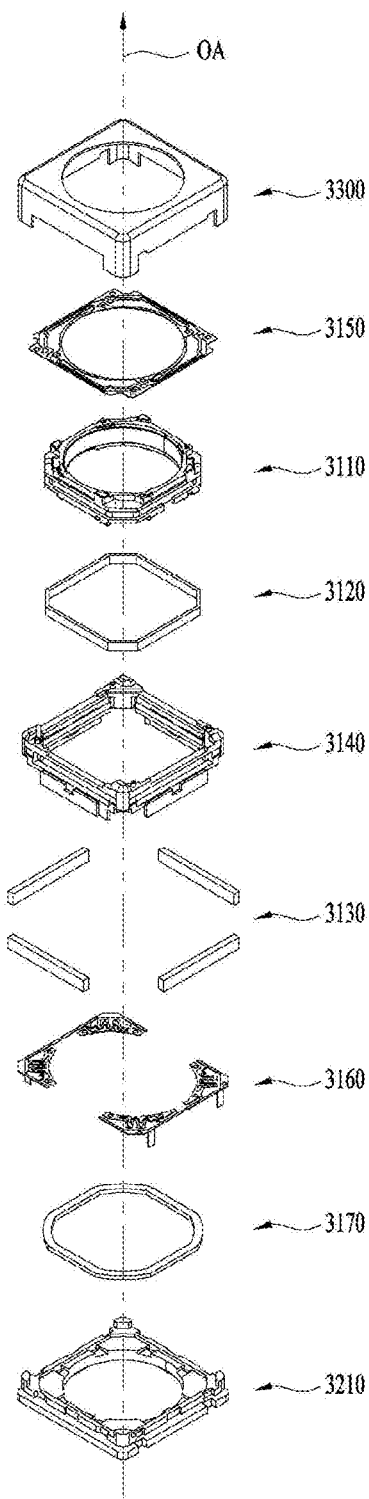
FIG. 24 is an exploded perspective view of the lens moving apparatus illustrated in FIG. 23.
Figure 25:
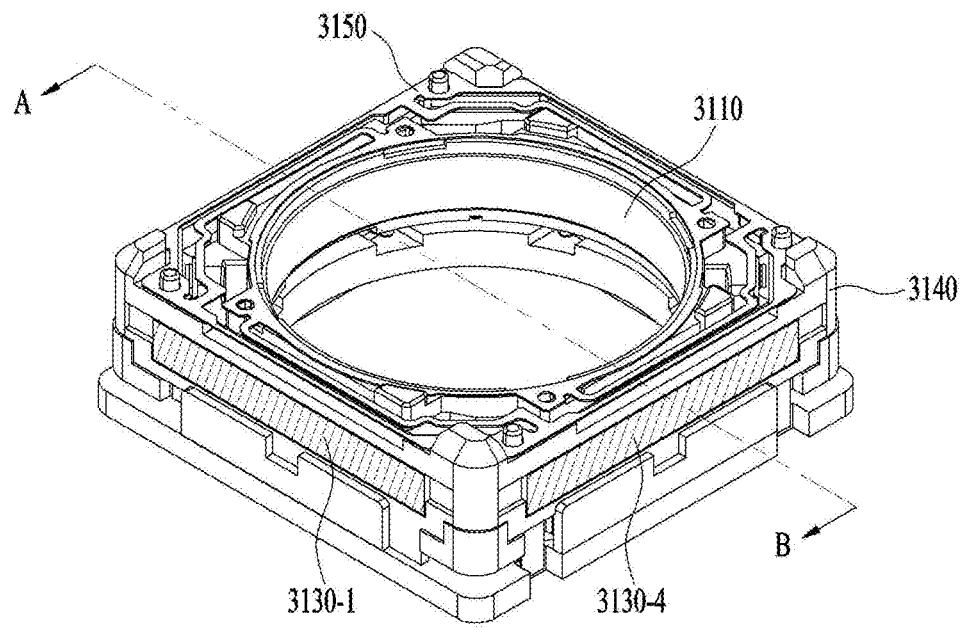
FIG. 25 is an assembled perspective view of the lens moving apparatus of FIG. 23, from which a cover member is removed.

FIG. 23 is a perspective view of a lens moving apparatus 3100 according to yet another embodiment, and FIG. 24 is an exploded perspective view of the lens moving apparatus 3100 illustrated in FIG. 23. FIG. 25 is an assembled perspective view of the lens moving apparatus 2100, from which a cover member 3300 illustrated in FIG. 23 is removed.

Referring to FIGS. 23 to 25, the lens moving apparatus 3100 includes a bobbin 3110, a first coil 3120, magnets 3130, an upper elastic member 3150, a lower elastic member 3160, a second coil 3170, a base 3210 and the cover member 3300.

First, the cover member 330 will be described.

The cover member 3300 accommodates the bobbin 3110, the first coil 3120, the magnets 3130, the housing 3140, the upper elastic member 3150, the lower elastic member 3160 and the second coil 3170, in the space defined between the cover member 3300 and the base 3210. The description of the cover member 300 illustrated in FIG. 1 may be applied to the cover member 3300.

Next, the bobbin 3110 will be described.

Figure 26A:
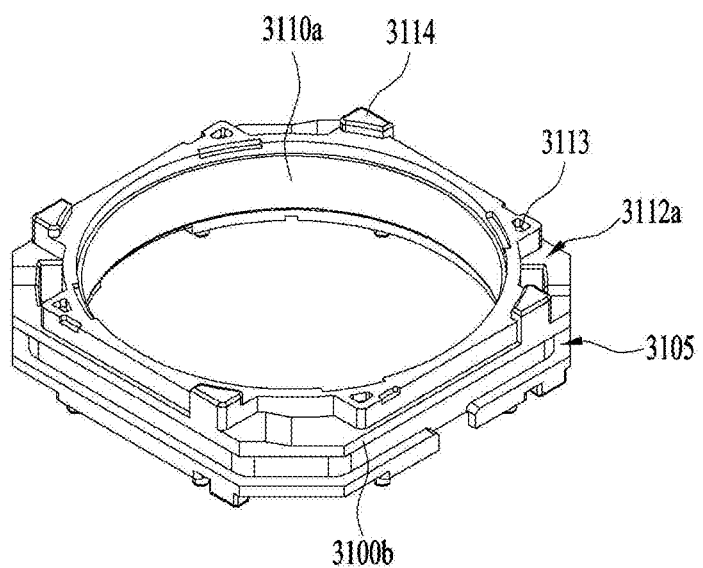
FIG. 26a is a first perspective view of a bobbin illustrated in FIG. 23.
Figure 26B:
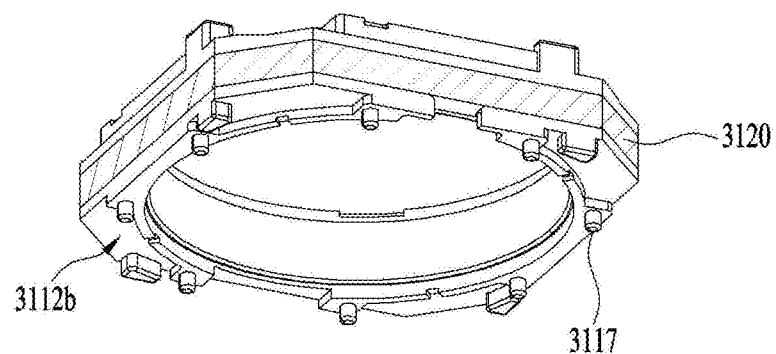
FIG. 26b is an assembled perspective view of the bobbin and a first coil of FIG. 23.

FIG. 26a is a first perspective view of the bobbin 3110 illustrated in FIG. 24, and FIG. 26b is an assembled perspective view of the bobbin 3110 and the first coil 3120, which are illustrated in FIG. 24.

Referring to FIGS. 26a and 26b, the bobbin 3110 is disposed inside the housing 3140, and may be moved in the first direction by virtue of electromagnetic interaction between the coil 3120 and the magnets 3130.

Although a lens (not shown) may be directly coupled to the inner peripheral surface 3110a of the bobbin 3110, the disclosure is not limited thereto. For example, the bobbin 3110 may include a lens barrel (not shown), in which at least one lens is mounted, and the lens barrel may be coupled to the interior of the bobbin 3110 in various ways.

The bobbin 3110 may include an opening or bore for the purpose of mounting a lens or a lens barrel. The shape of the opening or bore in the bobbin 3110 may coincide with the shape of a lens or a lens barrel mounted in the bobbin 3110. Although the shape may be, for example, a circular, elliptical or polygonal shape, the disclosure is not limited thereto.

The bobbin 3110 may include at least one coupling groove or protrusion 3113, which is disposed on the upper surface thereof and is coupled and secured to a first inner frame 3151 of the upper elastic member 150, and at least one coupling protrusion 3117, which is disposed on the lower surface thereof and is coupled and secured to a second inner frame of the lower elastic member 3160.

The bobbin 3110 may include an upper escape groove 3112a, which is provided in the region of the upper surface thereof that corresponds to or is aligned with a first connecting portion 3153 of the upper elastic member 3150. Furthermore, the bobbin 3110 may include a lower escape groove 3112b, which is provided in the region of the lower surface thereof that corresponds or is aligned with a second connecting portion 3163 of the lower elastic member 3160. By virtue of the upper escape groove 3112a and the lower escape groove 3112b of the bobbin 3110, when the bobbin 3110 moves in the first direction, spatial interference between the first and second connecting portions 3153 and 3163 of the upper and lower elastic members 3150 and 3160 may be eliminated, and thus the first and second connecting portions 3153 and 3163 of the upper and lower elastic members 3150 and 3160 may be more easily deformed in an elastic manner.

In another embodiment, there may be no necessity to provide the upper and/or lower escape grooves in the bobbin by designing the connecting portion of the upper elastic member and the bobbin so as not to interfere with each other.

The bobbin 3110 may include at least one groove 3105 formed in the outer peripheral surface thereof, in which the first coil 3120 is disposed.

The first coil 3120 may be disposed or mounted in the groove 3105, or may be directly wound along the groove 3105 in the bobbin 3110 in a clockwise or counterclockwise direction about the optical axis OA.

The shape and number of groove 3105 in the bobbin 3110 may correspond to the shape and number of coil disposed on the outer peripheral surface of the bobbin 3110. In another embodiment, the bobbin 3110 may not include the groove, in which the coil is mounted, and the first coil 3120 may be wound around the outer peripheral surface of the bobbin 3110 without the groove.

Next, the first coil 3120 will be described.

The first coil 3120 is disposed on the outer peripheral surface 3110b of the bobbin 3110 so as to perform electromagnetic interaction with the magnets 3130 disposed on the housing 3140.

In order to create electromagnetic force due to electromagnetic interaction with the magnets 3130, a drive signal may be applied to the first coil 3120. The drive signal may include an AC signal, or may include DC and AC signals. For example, the AC signal may be a sinusoidal wave or a pulse signal (for example, PWM signal).

By virtue of the electromagnetic force resulting from electromagnetic interaction between the first coil 3120 and the magnets 3130, the bobbin 3110, which is elastically supported by the upper and lower elastic members 3150 and 3160, may be moved in the first direction. By controlling the electromagnetic force, it is possible to control the movement of the bobbin 3110 in the first direction, and thus it is possible to perform an autofocusing function.

The first coil 3120 may be wound around the outer peripheral surface 3110b of the bobbin 3110 in a clockwise or counterclockwise direction about the optical axis. For example, the first coil 3120 may be disposed or wound in the groove 3105 provided in the outer peripheral surface 3110b of the bobbin 3110.

In another embodiment, the first coil 3120 may be wound in a clockwise or counterclockwise direction about an axis perpendicular to the optical axis so as to form a coil-ring shape. Although the number of coil ring may be equal to the number of magnets 3130, the disclosure is not limited thereto.

The first coil 3120 may be conductively connected to at least one of the upper and lower elastic members 3150 and 3160. A drive signal may be applied to the first coil 3120 via at least one of the upper and lower elastic members 3150 and 3160.

Next, the housing 3140 will be described.

Figure 27:
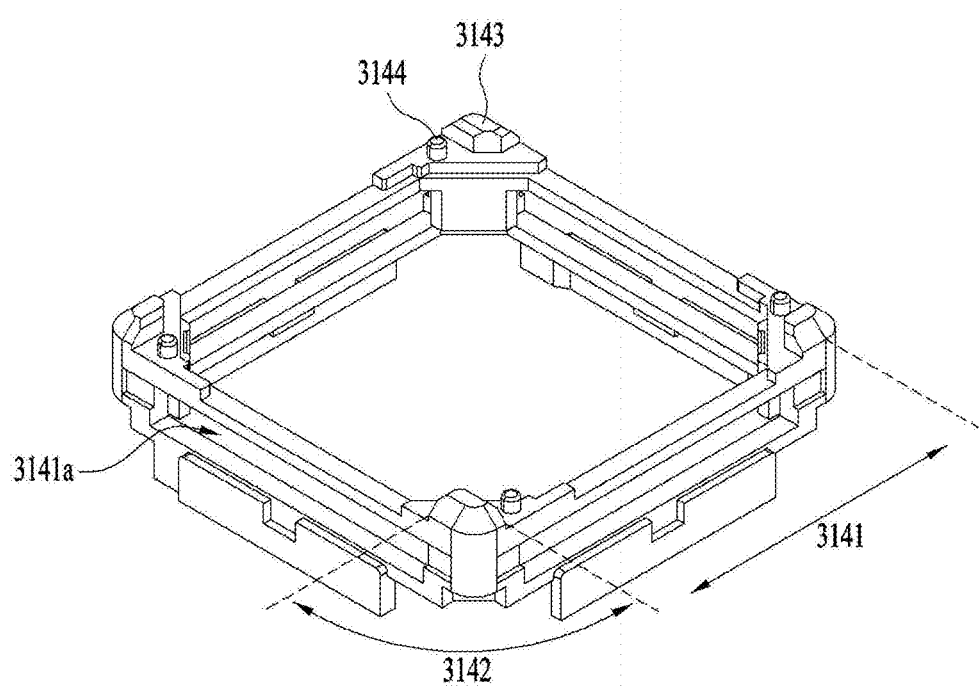
FIG. 27 is a perspective view of a housing illustrated in FIG. 23.
Figure 28:
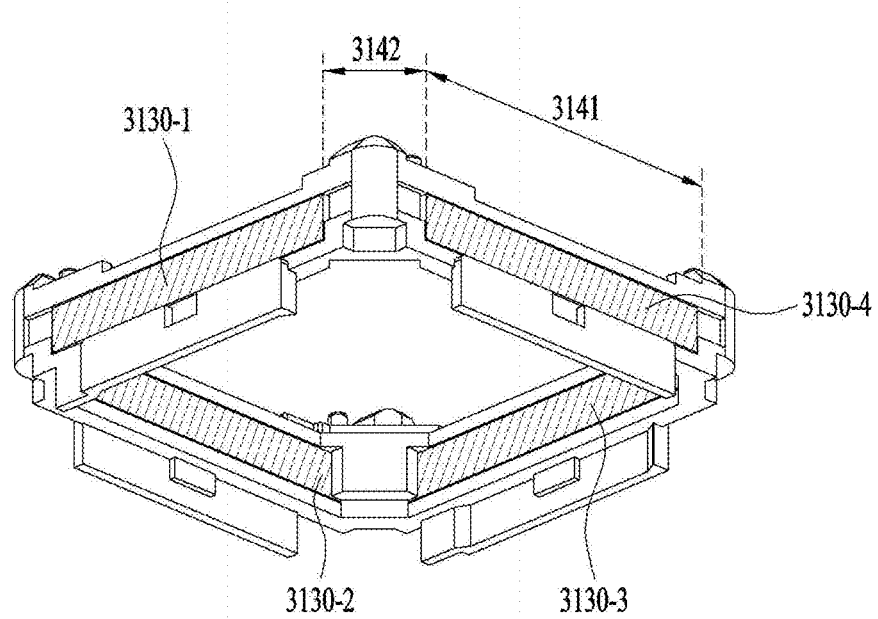
FIG. 28 is an assembled perspective view of a housing and magnets.

FIG. 27 is a perspective view of the housing 3140 illustrated in FIG. 23, and FIG. 28 is an assembled perspective view of the housing 3140 and the magnets 3130.

Referring to FIGS. 27 and 28, the housing 3140 supports the magnets 3130 and accommodates the bobbin 3110 therein such that the bobbin 3110 moves in the first direction.

The housing 3140 may be configured to have a hollow column shape overall, and may include first side sections 3141 and second side sections 3142, which define an opening or bore. For example, the housing 3140 may include a plurality of side sections 3141 and 3142, which define a polygonal (for example, square or octagonal) or circular opening or bore. The upper surfaces of the plurality of side sections 3141 and 3142 may define the upper surface of the housing 3140.

For example, the housing 3140 may include the first side sections 3141, which are spaced apart from each other, and the second side sections 3142, which are spaced apart from each other. For example, the length of each of the first side sections 3141 of the housing 3140 may be greater than the length of each of the second side sections 3142. For example, the first side sections 3141 of the housing 3140 may be portions that correspond to sides of the housing 3140, and the second side sections 3142 of the housing 3140 may be portions that correspond to the corners of the housing 3140. The second side section of the housing 3140 may be referred to as "corner section", and the second side sections 3142 of the housing 3140 may be referred to as "corner sections".

The magnets 3130 may be disposed or mounted on the first side sections 3141 of the housing 3140. For example, each of the first side sections 3141 of the housing 3140 may include a groove 3141a, into which the magnets 3130 are mounted, disposed or secured. Although the grooves 3141a for magnets are illustrated as being elongate through holes in FIG. 27, the grooves may be recesses, without being limited thereto.

The housing 3140 may include a first stopper 3143 projecting from the upper surface thereof.

The first stopper 3143 of the housing 3140, which is intended to inhibit the upper surface of the housing 3140 from colliding with the cover member 3300, may inhibit the upper surface of the housing 3140 from directly colliding with the inner surface of the top plate of the cover member 330.

The upper surface of the housing 3140 may be provided with upper frame support protrusions 3144, to which the first outer frame 3152 of the upper elastic member 3150 is coupled. The lower surface of the housing 3140 may be provided with lower frame support protrusions (not shown), to which the second outer frame 3162 of the lower elastic member 3160 is coupled.

The first and second side sections 3141 and 3142 of the housing 3140 may be provided in the corners thereof with lower guide grooves 3148a, to which guide members 3216 of the base 3210 are fitted, fastened or coupled.

Next, the magnet 3130 will be described.

At the initial position of the bobbin 3110, the magnets 3130 may be disposed on the side sections of the housing 3140 so as to correspond to or be aligned with the first coil 3120. The initial position of the bobbin 3110 may be the starting position of an AF movable unit when power is not applied to the first coil 3120, or a position at which the AF movable unit is disposed when the upper and lower elastic members 3150 and 3160 are elastically deformed by the weight of the AF movable unit. Furthermore, the initial position of the bobbin 3110 may be a position at which the AF movable unit is disposed when gravity is applied toward the base 3210 from the bobbin 3110 or when gravity is applied in the opposite direction, toward the bobbin 3110 from the base 3210. The AF movable unit may include the bobbin 3110 and components mounted on the bobbin 3110.

For example, the magnets 3130 may be disposed in the grooves 3141a in the housing 3140 so as to overlap the first coil 3120 in a direction perpendicular to the optical axis or in the second or third direction.

In another embodiment, the grooves 3141a may not be formed in the first side sections 3141 of the housing 3140, and the magnets 3130 may be disposed on either the outer surfaces or inner surfaces of the first side sections 3141 of the housing 3140.

Each of the magnets 3130 may have a shape that corresponds to a corresponding one of the first side sections 3141, for example, a rectangular shape, without being limited thereto.

Each of the magnets 3130 may be a monopole-magnetized magnet constructed such that a first surface thereof that faces the first coil 3120 is an S pole and the opposite second surface thereof is an N pole, or a bipole-magnetized magnet. However, the disclosure is not limited thereto, and the reverse disposition is also possible.

Although the number of magnets 3130 is four in the embodiment, the disclosure is not limited thereto, and the number of magnets 3130 may be at least two. Although each of the surfaces of the magnets 3130 that face the first coil 3120, may be a flat surface, the disclosure is not limited thereto, and the surface may be a curved surface.

Next, the upper elastic member 3150 and the lower elastic member 3160 will be described.

Figure 29:
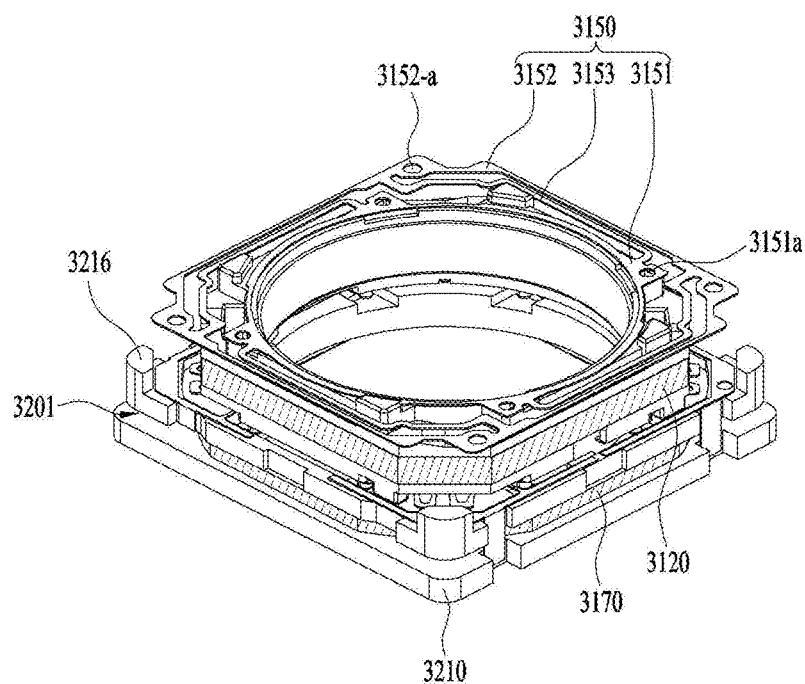
FIG. 29 is an assembled perspective view of a bobbin, a first coil, an upper elastic member, a lower elastic member, a base and a second coil.
Figure 30:
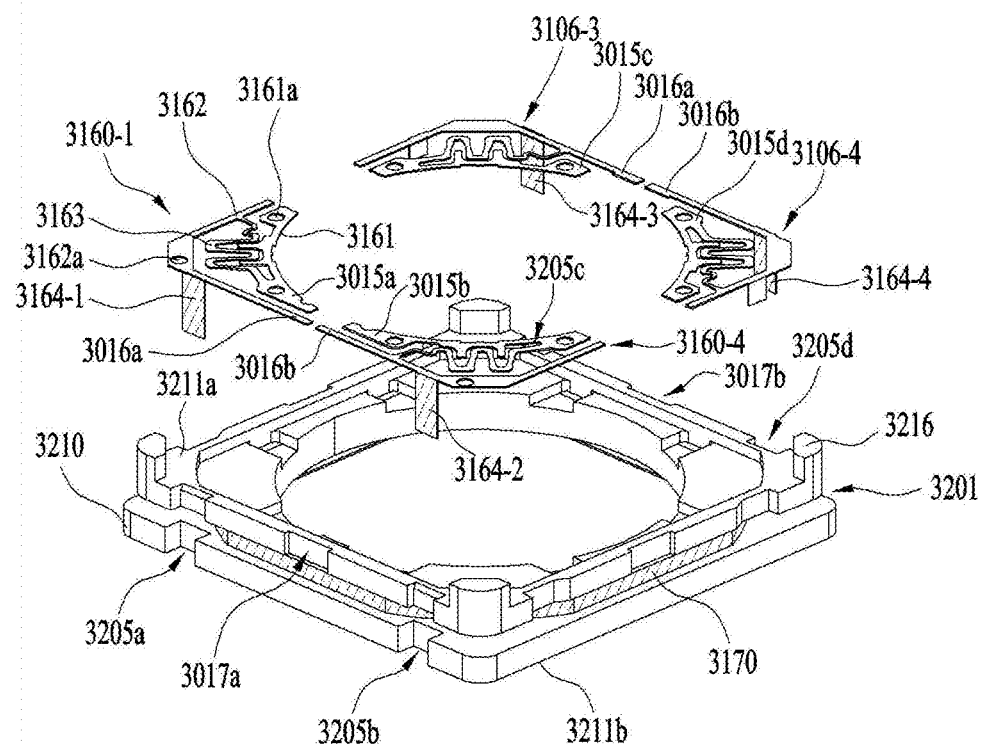
FIG. 30 is an exploded perspective view of the base with the second coil coupled thereto and the lower elastic member.
Figure 31:
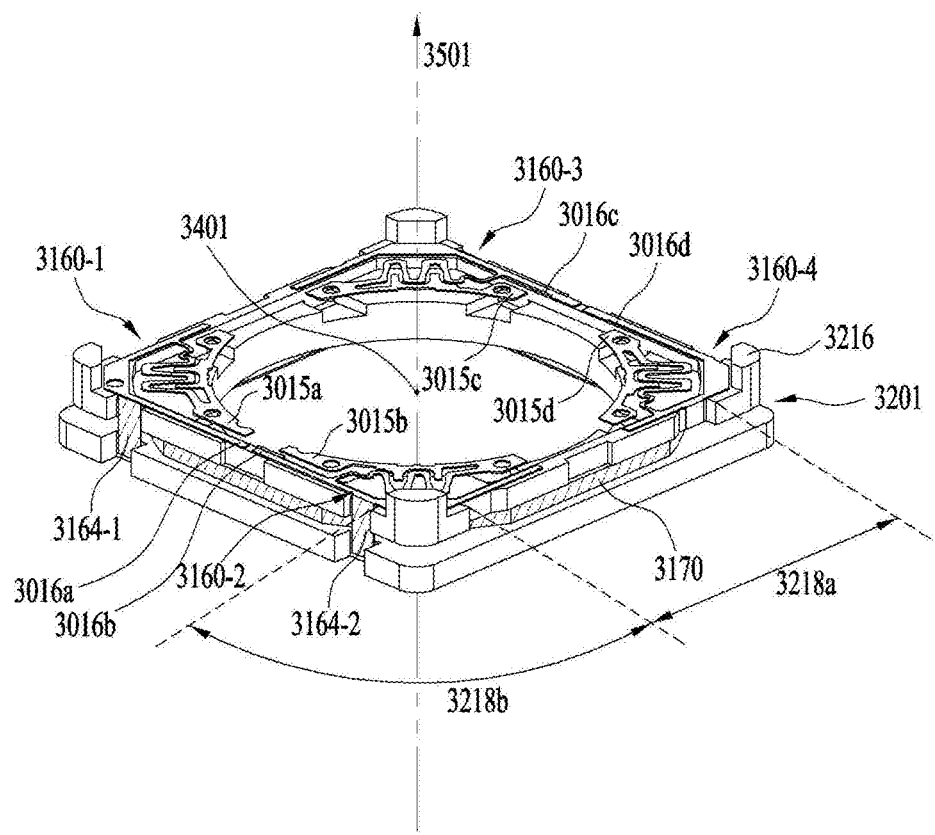
FIG. 31 is an assembled perspective view of the second coil, the base and the lower elastic member, which are illustrated in FIG. 30.
Figure 32:
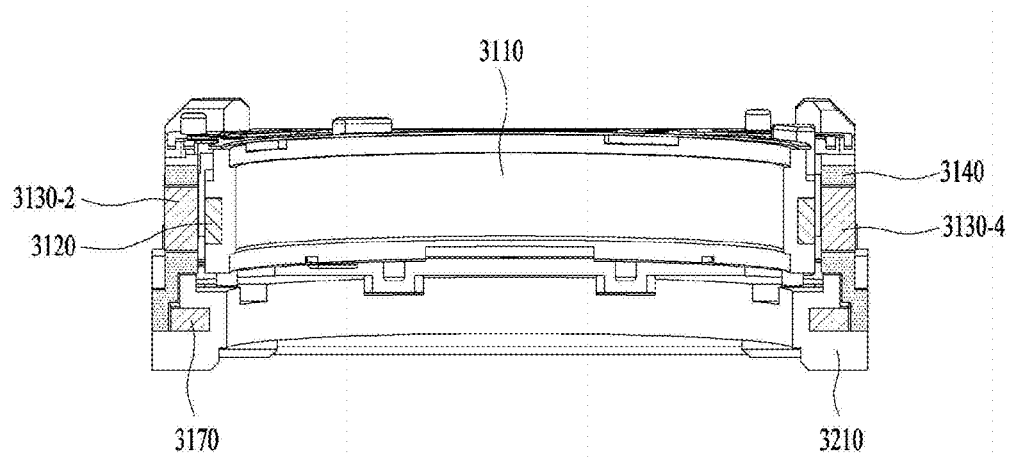
FIG. 32 is a cross-sectional view of the lens moving apparatus taken along line A-B in FIG. 25.

FIG. 29 is an assembled perspective view of the bobbin 3110, the first coil 3120, the upper elastic member 3150, the lower elastic member 3160, the base 3210 and the second coil 3170, and FIG. 30 is an exploded perspective view of the base 3210 with the second coil 3170 coupled thereto and the lower elastic member 3160. FIG. 31 is an assembled perspective view of the second coil 3170, the base 3210 and the lower elastic member 3160, which are illustrated in FIG. 30, and FIG. 32 is a cross-sectional view of the lens moving apparatus taken along line A-B in FIG. 25.

Referring to FIGS. 29 to 32, the upper elastic member 3150 and the lower elastic member 3160 are coupled to the bobbin 3110 and the housing 3140 so as to elastically support the bobbin 3110.

For example, the upper elastic member 3150 may be coupled both to the upper portion (or the upper surface or the upper end) of the bobbin 3110 and to the upper portion (or the upper surface or the upper end) of the housing 3140.

The lower elastic member 3160 may be coupled both to the lower portion (or the lower surface or the lower end) of the bobbin 3110 and to the lower portion (or the lower surface of the lower end) of the housing 3140.

Although the upper elastic member 3150 is not divided or separated into a plurality of segments in FIG. 29, the disclosure is not limited thereto. In another embodiment, the upper elastic member 3150 may include a plurality of elastic members, which are spaced apart from each other.

The upper elastic member 3150 may include a first inner frame 3151 coupled to an upper portion of the bobbin 3110, a first outer frame 3152 coupled to an upper portion of the housing 3140, and a first connecting portion 3153 connecting the first inner frame 3151 to the second outer frame 3152. The first inner frame 3151 of the upper elastic member 3150 may include through holes 3151a, into which the upper support protrusions 3113 of the bobbin 3110 are coupled, and the first outer frame 3152 may include through holes 152a, into which the upper frame support protrusions 3144 of the housing 3140 are coupled.

The lower elastic member 3160 may be divided or separated into two or more lower elastic members. The lower elastic members may also be referred to as lower springs, or simply as springs.

For example, the lower elastic member 3160 may include first to fourth lower springs 3160-1 to 3160-4, which are spaced apart from one another.

For example, the first coil 3120 may be conductively connected to two of the lower springs 3160-1 to 3160-2, and the second coil 3170 may be conductively connected to the two remaining ones of the lower springs 3160-1 to 3160-2.

Each of the first to fourth lower springs 3160-1 to 3150-4 may include a second inner frame 3161 coupled to a lower portion of the bobbin 3110, a second outer frame 3162 coupled to a lower portion of the housing 3140, and a second connecting portion 3163 connecting the second inner frame 3161 to the second outer frame 3162. The second inner frame 3161 of the lower elastic member 3160 may include through holes 3161a coupled to the lower support protrusions 3117 of the bobbin 3110, and the second outer frame 3162 may include through holes 3162a coupled to the lower frame support protrusions of the housing 3140.

For example, the first coil 3120 may be bonded to second inner frames 3161 of two of the lower springs 160-1 to 160-4, and the second coil 170 may be bonded to the second outer frames 3162 of the two other remaining ones of the lower springs 160-1 to 160-4.

Although each of the upper elastic member 3150 and the lower elastic member 3160 may be embodied as a leaf spring, the disclosure is not limited thereto, and each of the upper elastic member 3150 and the lower elastic member 3160 may be embodied as a coil spring, a suspension wire or the like.

Each of the first and second connecting portions 3153 and 3163 may be bent or curved at least once so as to form a predetermined pattern. Upward and/or downward movement of the bobbin 3110 in the first direction may be elastically (or resiliently) supported by virtue of positional variation and fine deformation of the first and second connecting portions 3153 and 3163.

In order to inhibit an oscillation phenomenon during movement of the bobbin 3110, a damper may be disposed between the first connecting portion 3153 of the upper elastic member 3150 and the upper surface of the bobbin 3110. Furthermore, a damper (not shown) may also be disposed between the second connecting portion 3163 of the lower elastic member 3160 and the lower surface of the bobbin 3110.

Alternatively, a damper may be applied to a coupling region between each of the bobbin 3110 and the housing 3140 and the upper elastic member 3150 or a coupling region between each of the bobbin 3110 and the housing 3140 and the lower elastic member 3160. The damper may be, for example, gel-type silicone.

For example, the first to fourth lower springs 3160-1 to 3160-4 may be separated or spaced apart from each other at the first side sections 3141 of the housing 3140.

First ends of the second inner frames 3161 of the first to fourth lower springs 3160-1 to 3160-4 may be provided with first bonding portions 3015a to 3015d, and first ends of the second outer frames 3162 of the first to fourth lower springs 3160-1 to 3160-4 may be provided with second bonding portions 3016a to 3016d.

For example, the first coil 3120 may be bonded to two of the first bonding portions 3015a to 3015d, and the second coil 170 may be bonded to two of the second bonding portions 3015a to 3015d. Since the first coil 3120 is disposed on the outer peripheral surface of the outer surface of the bobbin 3120, which is disposed inside the housing 3140, while the second coil 3170 is disposed on the outer surface of the base 3210, the embodiment is able to reduce the distance between two bonding points and to make bonding work easy by connecting the first coil 3120 to the second inner frame 3161 of the lower elastic member 3160 while connecting the second coil 3170 to the second outer frame 3162 of the lower elastic member 3160.

For example, the first coil 3120 may be bonded to the first bonding portions 3015a and 3015b, which are provided at the first ends of the second inner frames 3161 of the lower springs (for example, 3160-1 and 3160-2) coupled to one of the first side sections of the housing 3140.

The second coil 3170 may be bonded to the second bonding portions 3016a and 3016b, which are provided at the first ends of the second outer frames 3162 of the lower springs (for example, 3160-3 and 3160-4) coupled to one of the first side sections.

Each of the first to fourth lower springs 3160-1 to 3160-4 may further include a corresponding one of extending portions 3164-1 to 3164-4, which are connected to the second outer frames 3162 and are bent from the outer surfaces of the second outer frames 3162.

Each of the extending portions 3164-1 to 3164-1 of the first to fourth lower springs 3160-1 to 3160-4 may be bent in a direction toward the base 3210 from the second outer frames 3162.

Each of the extending portions 3164-1 to 3164-4 of the first to fourth lower springs 3160-1 to 3160-4 may be disposed, mounted or fitted into first depressed portions 3205a to 3205d provided at the base 3210.

For example, the first extending portions 3164-1 to 3164-2 of the first and second lower springs 3160-1 and 3160-2 may be brought into contact with a first outer surface of the base 3210, and the second extending portions 3164-3 and 3154-4 of the third and fourth lower springs 3160-3 and 3160-4 may be brought into contact with a second outer surface of the base 3210. Here, the first and second outer surfaces of the base 3210 may be positioned opposite each other.

The extending portions 3164-1 to 3164-4 of the first to fourth lower springs 3160-1 to 3160-4 may be exposed from the base 3210, and may be conductively isolated from one another.

The inner surface of each of the extending portions 3164-1 to 3164-4, which are disposed in the first depressed portions 3205a to 3205d, may be brought into contact with a first surface (for example, the bottom surface) of a corresponding one of the first depressed portions 3205a to 3205d, and the outer surface of each of the extending portions 3164-1 to 3164-4 may be exposed from the side surface of the base 3210. The lower ends of the extending portions 3164-1 to 3164-4 may be exposed from the lower surface of the base 3210.

A drive signal to drive the first coil 3120 may be provided via two of the extending portions 3164-1 to 3164-4, and the induction voltage of the second coil 3170 may be output to the outside via the two remaining ones of the extending portions 3164-1 to 3164-4.

In another embodiment, the lens moving apparatus may further include a circuit board, which includes terminals conductively connected to the extending portions 3164-1 to 3164-4 of the first to fourth lower springs 3160-1 to 3160-4.

In a further embodiment, the upper elastic member may be divided or separated into a plurality of springs, and the lens moving apparatus may further include a circuit board, which includes terminals conductively connected to respective ones the divided upper springs resulting from the division. A drive signal is supplied to the first coil via the circuit board and two of the upper springs, and induction voltage of the second coil may be output to the outside via the other two ones of the upper springs and the terminals of the circuit board.

The base 3210 may be coupled to the cover member 3300 so as to form a space for accommodating the bobbin 3110 and the housing 3140. The base 3210 may include an opening or bore that corresponds to the opening or bore in the bobbin 3110 and/or the opening or bore in the housing 3140, and may have a shape that coincides with or corresponds to the cover member 3300, for example, a square shape.

The base 3210 may include a stepped portion, to which an adhesive is applied when the cover member 300 is adhesively secured thereto. Here, the stepped portion of the base 3210 may guide the cover member 3300, and may be brought into surface contact with the lower end of the cover member 3300.

The base 3210 may include the guide members 3216, which project upwards a predetermined height from the four corner portions thereof. Although each of the guide members 3216 may have a polygonal column shape, the disclosure is not limited thereto. The guide members 3216 may be fitted, fastened or coupled to the lower guide grooves 3148a in the housing 3140.

The second coil 3170 may be disposed under the lower elastic member 3160, and may be disposed so as to be wound along the side surface of the base 3210 in a clockwise or counterclockwise direction about the optical axis.

For example, the outer surface of the base 3210 may be provided with a groove 3201.

For example, the groove 3201 in the base 3210 may be a structure depressed from the outer surface of the base 3210. The groove 3210 may be spaced apart both from the upper surface of the base 3210 and from the lower surface of the base 3210. This configuration inhibits the second coil 3170 disposed or wound in the groove 3201 from being separated from the base 3210.

The second coil 3170 wound along the groove 3201 in the base may have a total length in the optical-axis direction that is less than the total length in a direction toward the outer peripheral surface from the inner peripheral surface of the base 3210 and perpendicular to the optical axis. Consequently, it is possible to reduce the height or length of the lens moving apparatus 3100 in the optical-axis direction.

The base 3210 may include first side sections 3218a that correspond to or are aligned with the first side sections 3141 of the housing 3140, and second side sections 3218b that correspond to or are aligned with the second side sections 3142 of the housing 3140.

The groove 3201 in the base 3210 may be provided in the first side sections 3218a and the second side sections 3218b, and may have a ring shape.

The outer surface of the first side sections 3218a of the base 3210 may be provided with the first depressed portions 3205a to 3205d, which correspond to the extending portions 3164-1 to 3164-4 of the first to fourth lower springs 3160-1 to 3160-4 of the lower elastic member 3160.

Although the first depressed portions 3205a to 3205d of the base 3210 may be provided in, for example, the first outer surface and the second outer surface of the base 3210 which face opposite to each other, the disclosure is not limited thereto. The first depressed portions may also be provided in two outer surfaces which do not face opposite to each other depending on the position of the extending portions.

For example, each of the first depressed portions 3205a to 3205d may include an upper portion, which is open at the upper surface of the base 3210, and a lower portion, which is open at the upper surface of the base 3210.

The distance between the bottom surface of each of the first depressed portions 3205a to 3205d from the side surface of the base 3210 may be less than the distance between the bottom surface of the groove 3201 from the side surface of the base 3210.

Consequently, the extending portions 3154-1 to 3154-4 of the lower elastic members 3160 disposed in the first depressed portions 3205a to 3205d may be positioned outside the second coil 3170 disposed in the groove 3201.

A first distance may be less than a second distance. Here, the first distance may be the distance between a reference line 3501 that extends through the center of the base 3210 and is parallel to the optical axis and the second coil 3170 disposed in the groove 3201 in the base 3210, and the second distance may be the distance between the reference line 3501 and the extending portions 3164-1 to 3164-4 disposed in the first depressed portions 3205a to 3205d.

In order to inhibit conductive contact, the extending portions 3164-1 to 3154-4 of the lower elastic members 3160 disposed in the first depressed portions 3205a to 3205d and the second coil 3107 disposed in the groove 3201 may be spaced apart from each other.

The first side sections 3218a of the base 3210 may include second depressed portions 3017a and 3017b, through which one end and the other end of the second coil 3170 extend.

For example, at least one of the first outer surface and the second outer surface of the base 3210 may be provided with the second depressed portions 3017a and 3017b, through which at least one (not shown) of the two ends of the second coil extends.

For example, each of the first outer surface and the second outer surface of the base 3210 may be provided with two of the first depressed portions 3205a and 3205d, and each of the second depressed portions 3017a and 3017b may be positioned between two first depressed portions 3205a and 3205b or 3205c and 3205d, which are formed in each of the first and second outer surfaces.

The upper end of each of the second depressed portions 3017a and 3017b may be open at the upper surface of the base 3210, and the lower end of each of the second depressed portions 3017a and 3017b may be open at the groove 3201.

One side plate of the cover member 330 coupled to the base 3210 may face the first coil 3120 and the second coil 3170 in a direction perpendicular to the optical axis.

In another embodiment, the second coil 3170 may be mounted on a surface of a lower portion of the base 3210, or may be mounted in a groove formed in the surface of the lower portion.

Figure 33:
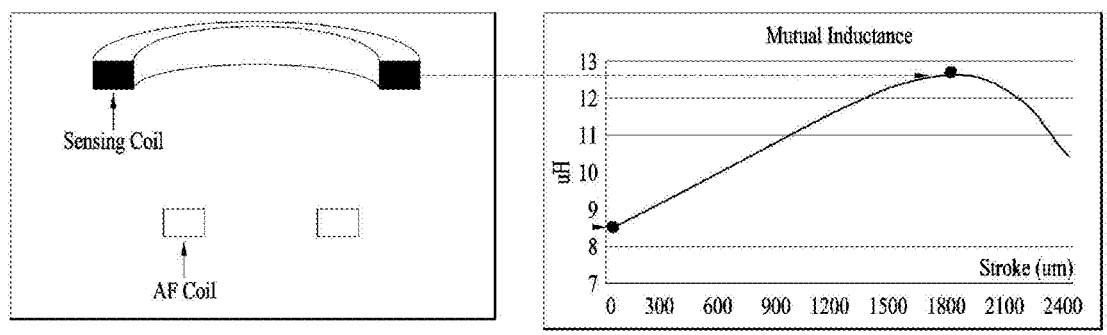
FIG. 33 shows a mutual inductance with a distance between the first coil and the second coil.

FIG. 33 shows mutual inductance with a distance between the first coil (AF coil) and the second coil (sensing coil).

FIG. 33 shows, in a structure in which the first coil, which is an AF drive coil, is disposed above the second coil, which is a sensing coil, variation in mutual inductance between the first coil and the second coil with upward movement of the first coil mounted on the bobbin.

Referring to FIG. 33, when the distance between the first coil and the second coil is 100 μm or less, linearity of variation in mutual inductance between the first coil and the second coil becomes drastically worse. This is the case in which the stroke of the bobbin is positioned between 1700 μm-1800 μm.

Because an induction voltage generated in the second coil is proportional to mutual inductance between the first coil and the second coil, linearity of variation in induction voltage of the second coil with displacement of the bobbin become drastically worse when the distance between the first coil and the second coil is 100 μm or less.

In a structure in which a first coil, which is an AF drive coil, is disposed above a second coil, which is a sensing coil, because the distance between the first coil and the second coil at the highest point of the bobbin has to be designed to be 100 μm or more in order to ensure linearity of induction voltage of the second coil, the design of the disposition of the first coil and the second coil may be restricted, and the total thickness of the lens moving apparatus may increase.

However, because the embodiment is a structure in which the second coil is disposed on the base 3210, which is positioned under the first coil, the distance between the first coil and the second coil increases when the bobbin 3110 moves upward. Accordingly, when the distance between the first coil and the second coil is set to be about 100 μm at the starting position of the bobbin 3110 in the case of unidirectional driving or at the lowest point of the bobbin in the case of bidirectional driving, linearity is automatically maintained even when the bobbin moves upwards, thereby alleviating restriction in the design of the disposition of the first coil and the second coil and reducing the thickness of the lens moving apparatus.

In addition, although the thickness of the base 3210 has to be sufficiently considered in order to inhibit interference with the lower elastic member in the case in which the second coil 3170 is disposed on the upper surface of the base 3210, the embodiment is able to reduce the thickness of the base because the second coil 3170 is disposed on the side surface of the base 3210.

Furthermore, since the second coil 3170 is disposed so as to be wound around the outer peripheral surface of the base 3210, it is possible to increase the length of the second coil that corresponds to one turn. Accordingly, when compared with the second coil, which is disposed on the upper surface of the base 3210, it is possible to increase the intensity of the induction voltage of the second coil 3170 for the same number of turns.

Although the number of turns of the second coil 3170 wound around the base 3210 may be greater than that of the first coil 3120 wound around the bobbin 3110, the embodiment is not limited thereto. In another embodiment, the number of turns of the second coil 3170 wound around the base 3210 may be less than or equal to the number of turns of the first coil 3120 wound around the bobbin 3110.

Since the embodiment does not require an additional position sensor for detecting displacement of the bobbin 3110, it is possible to reduce the cost of manufacturing the lens moving apparatus and to improve ease of manufacture. In addition, the embodiment is able to realize wider linearity, a decreased defective fraction, and more precise AF feedback control.

Figure 34:
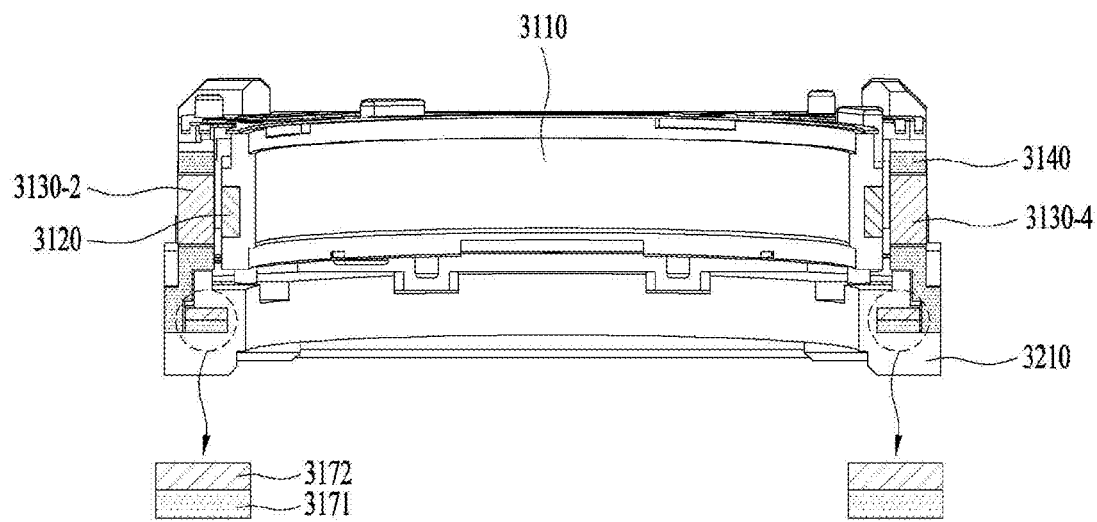
FIG. 34 is a cross-sectional view of a lens moving apparatus according to a further embodiment.

FIG. 34 is a cross-sectional view of a lens moving apparatus according to a further embodiment.

The lens moving apparatus illustrated in FIG. 34 may further include a magnetic-property-reinforcing member or core 3172, which is disposed on a second coil 3171 in order to increase the intensity of the induction voltage generated in the second coil 3171. The magnetic-property-reinforcing member 3171 and the second coil 3171 may have a closed loop shape, for example, a ring shape, and may have the same diameter. Although the width of the magnetic-property-reinforcing member 3171 may be equal to the width of the second coil 3172 in FIG. 34, the embodiment is not limited thereto. In another embodiment, the width of the magnetic-property-reinforcing member 3171 may be greater than the width of the second coil 3172.

The magnetic-property-reinforcing member 3171 and the second coil 3172 may be disposed in the groove 3201. The lower surface of the magnetic-property-reinforcing member 3171 may be brought into contact with the upper surface of the second coil 3172.

In another embodiment, the magnetic-property-reinforcing member 3172 may be disposed under the second coil 3171.

The magnetic-property-reinforcing member 3171 may be an iron core having no magnetism.

Alternatively, the magnetic-property-reinforcing member 3171 may be a magnetic member, for example, a ferrite core. The ferrite core may be made of, for example, MnZn or NiZn. A MnZn-based ferrite core may be used for low frequency, and a NiZn-based ferrite core may be used for high frequency.

Figure 35:
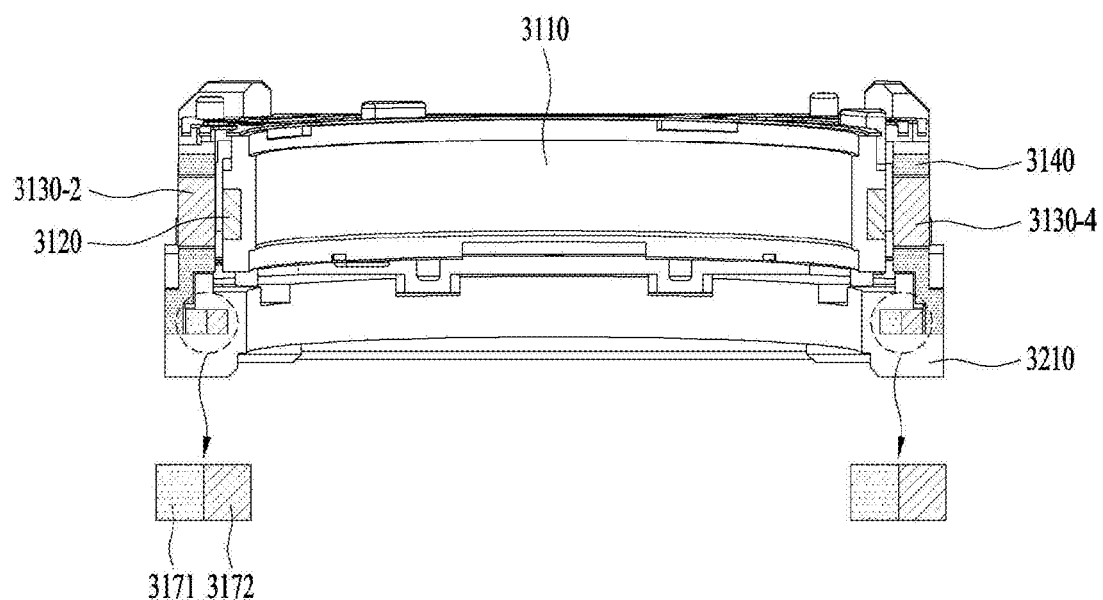
FIG. 35 is a cross-sectional view of a lens moving apparatus according to a further embodiment.

FIG. 35 is cross-sectional view of a lens moving apparatus according to a further embodiment.

Referring to FIG. 35, the magnetic-property-reinforcing member 3171 may be disposed outside the second coil 3171. The inner surface of the magnetic-property-reinforcing member 3171 may be brought into contact with the outer surface of the second coil 3171. In another embodiment, the second coil may be positioned outside the magnetic-property-reinforcing member, and the outer surface of the magnetic-property-reinforcing member may be brought into contact with the inner surface of the second coil.

Figure 36:
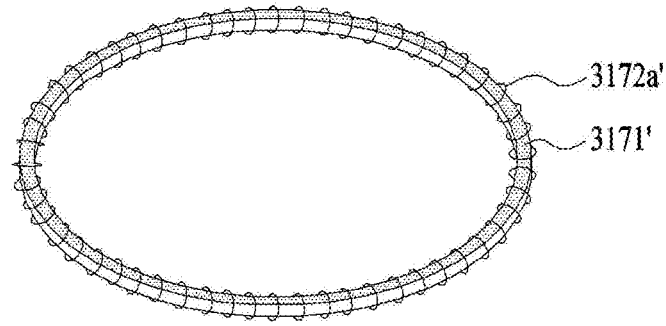
FIG. 36 shows the disposition of a core and a second coil according to another embodiment.

FIG. 36 shows the disposition of a magnetic-property-reinforcing member 171*a'* and a second coil 172*a'* according to another embodiment.

Referring to FIG. 36, the second coil 172*a'* may be wound around the magnetic-property-reinforcing member 3171'. For example, the second coil 3172*a'* may be wound around the ring-shaped magnetic-property-reinforcing member 3171' in a clockwise or counterclockwise direction.

Meanwhile, the lens moving apparatuses according to the above-described embodiments may be used in various fields, such as, for example, those of a camera module or an optical device.

Figure 37:
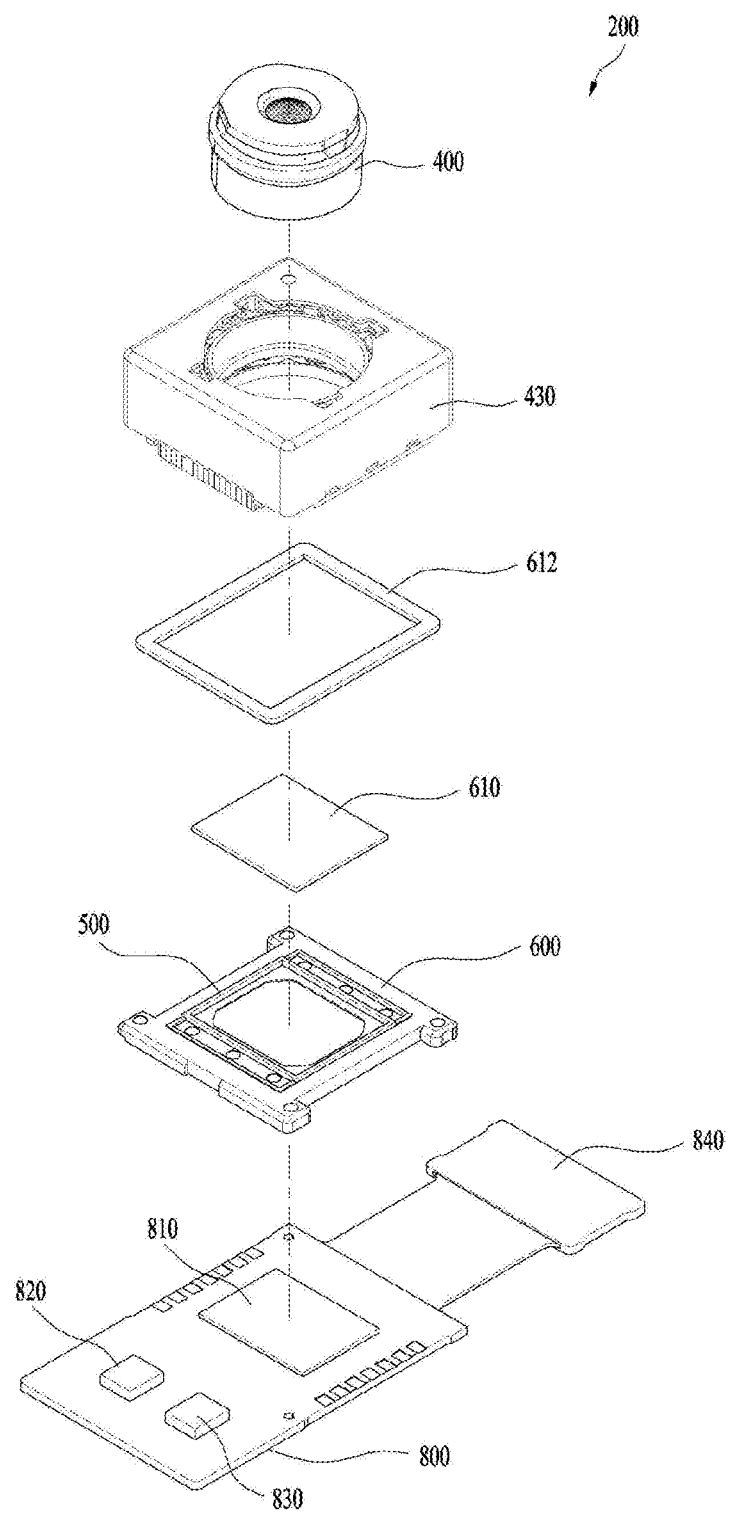
FIG. 37 is an exploded perspective view of a camera module according to an embodiment.

FIG. 37 is an exploded perspective view illustrating a camera module according to an embodiment.

Referring to FIG. 37, the camera module may include a lens barrel 400, the lens moving apparatus 430, a filter 610, an image sensor 810, a sensor 820, a controller 830, and a connector 840.

The camera module may include an adhesive member 612, a first holder 600 and a second holder 800. The lens moving apparatus 430 illustrated in FIG. 37 may be the lens moving apparatus according to the embodiments illustrated in FIGS. 1 to 36.

The lens barrel 400 may be mounted in the bobbin 110, 1110 or 3110 of the lens moving apparatus 430.

The first holder 600 may be located under the base 210, 1210 or 3210 of the lens moving apparatus 430. The filter 610 may be mounted on the first holder 600, and the first holder 600 may have a raised portion 500 on which the filter 610 is seated.

The adhesive member 612 may couple or attach the base 210, 1210 or 3210 of the lens moving apparatus 430 to the first holder 600. In addition to the attachment function described above, the adhesive member 612 may serve to inhibit contaminants from entering the lens moving apparatus 430.

The adhesive member 612 may be, for example, epoxy, thermohardening adhesive, or ultraviolet hardening adhesive.

The filter 610 may serve to inhibit light within a specific frequency band that passes through the lens barrel 400 from being introduced into the image sensor 810. The filter 610 may be an infrared-light-blocking filter, without being limited thereto. Here, the filter 610 may be oriented parallel to the X-Y plane.

The region of the first holder 600 in which the filter 610 is mounted may be provided with an opening or bore in order to allow the light that passes through the filter 610 to be introduced into the image sensor 810.

The second holder 800 may be disposed under the first holder 600, and the image sensor 810 may be mounted on the second holder 800. The light that passes through the filter 610 is introduced into the image sensor 810 so as to form an image on the image sensor 810.

The second holder 800 may include, for example, various circuits, devices, and a controller in order to convert the image, formed on the image sensor 810, into electrical signals and to transmit the electrical signals to an external component.

The second holder 800 may be embodied as a circuit board on which the image sensor 810 may be mounted, a circuit pattern may be formed, and various devices may be coupled.

The image sensor 810 may receive an image contained in the light introduced through the lens moving apparatus 430, and may convert the received image into electrical signals.

The filter 610 and the image sensor 810 may be spaced apart from each other so as to be opposite each other in the first direction.

The sensor 820 may be mounted on the second holder 800, and may be conductively connected to the controller 830 through the circuit pattern formed on the second holder 800.

The sensor 820 may be a device capable of detecting motion of the camera module 200. For example, the sensor 820 may be embodied as a motion sensor, a dual-axis or triple-axis gyro sensor, an angular speed sensor, an acceleration sensor, a gravity sensor or the like.

The controller 820 may be mounted on the second holder 800, and may be conductively connected to the second position sensor 240 and the third coil 1230 of the lens moving apparatus 430. For example, the second holder 800 may be conductively connected to the circuit board 250 or 1250 of the lens moving apparatus 430, and the controller 820 mounted on the second holder 800 may be conductively connected to the second position sensor 240 and the third coil 1230 through the circuit board 250 or 1250.

The controller 830 may include at least one of an AF feedback controller for driving AF feedback and an OIS feedback controller for performing OIS feedback control.

The controller 830 may be mounted on the second holder 800.

The AF feedback controller may be conductively connected to the first coil 120, 1120 or 3120 and the second coil 172, 1172 or 3172 of the lens moving apparatus 430.

The AF feedback controller may supply a drive signal to the first coil 120 or 1120.

The AF feedback controller may perform AF feedback control for displacement of the movable unit depending on the result of detection of the displacement of the movable unit based on the induction voltage of the second coil 172, 1172 or 3172.

The OIS feedback controller may be conductively connected to the position sensors 240a and 240b and the third coils 1230-1 to 1230-4. The OIS feedback controller may supply a drive signal to the third coils 1230-1 to 1230-4, and may perform OIS feedback control for the OIS movable unit depending on the result of displacement of the OIS movable unit based on output supplied from the position sensors 240a and 240b. Here, the OIS movable unit may include the AF movable unit and components mounted on the housing 1140.

The connector 840 may be conductively connected to the second holder 800, and may have a port for the electrical connection of an external component.

Unlike the embodiment in which the capacitor 1175 is added to the circuit board 250 or 1250 in order to remove PWM noise, the second holder 800 of the camera module may be provided with a capacitor, which is connected in parallel to the second coil 172 or 1172.

The lens moving apparatus 100A or 100B according to the embodiment may be embedded in an optical instrument, which is intended to form an image of an object in a space so as to increase a user's visual perception using reflection, refraction, absorption, interference, diffraction and the like, which are properties of light, which is intended to record an image formed through a lens and to reproduce the image, or which is intended to perform optical measurement, propagation or transmission of an image or the like. For example, the optical instrument according to the embodiment may include a portable terminal, on which a smartphone and a camera are mounted.

Figure 38:
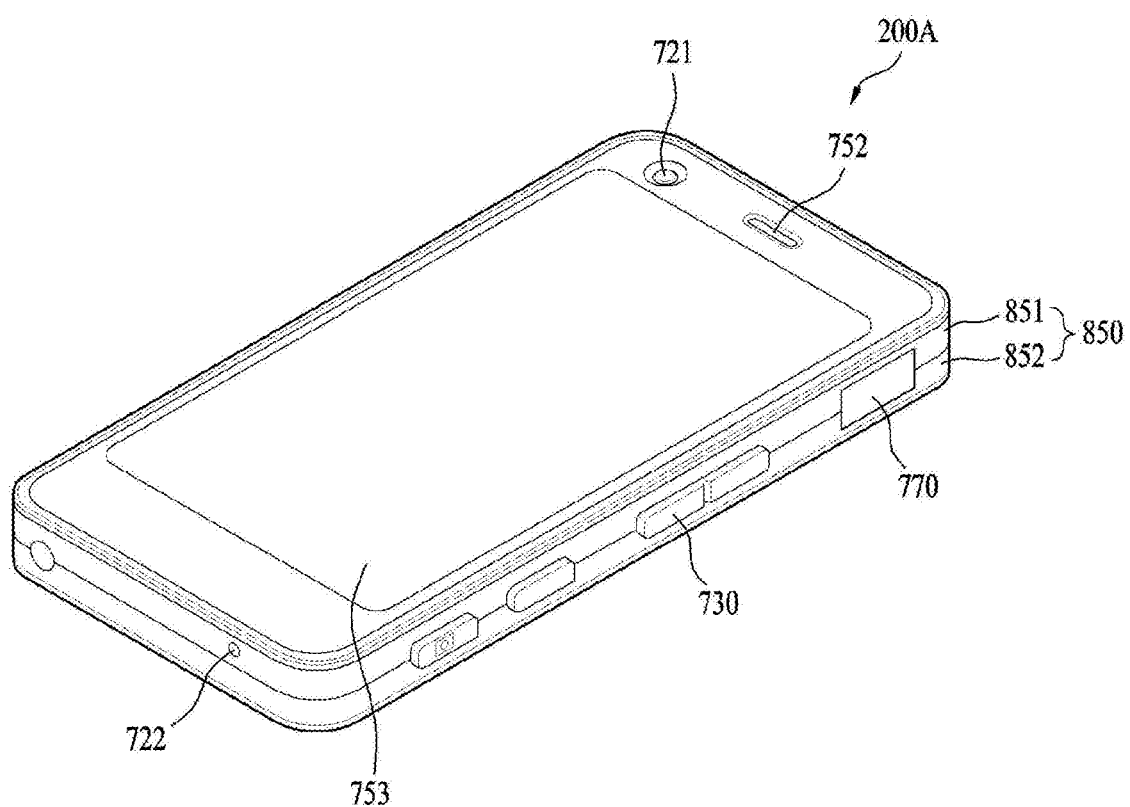
FIG. 38 is a perspective view illustrating a portable terminal according to an embodiment.
Figure 39:
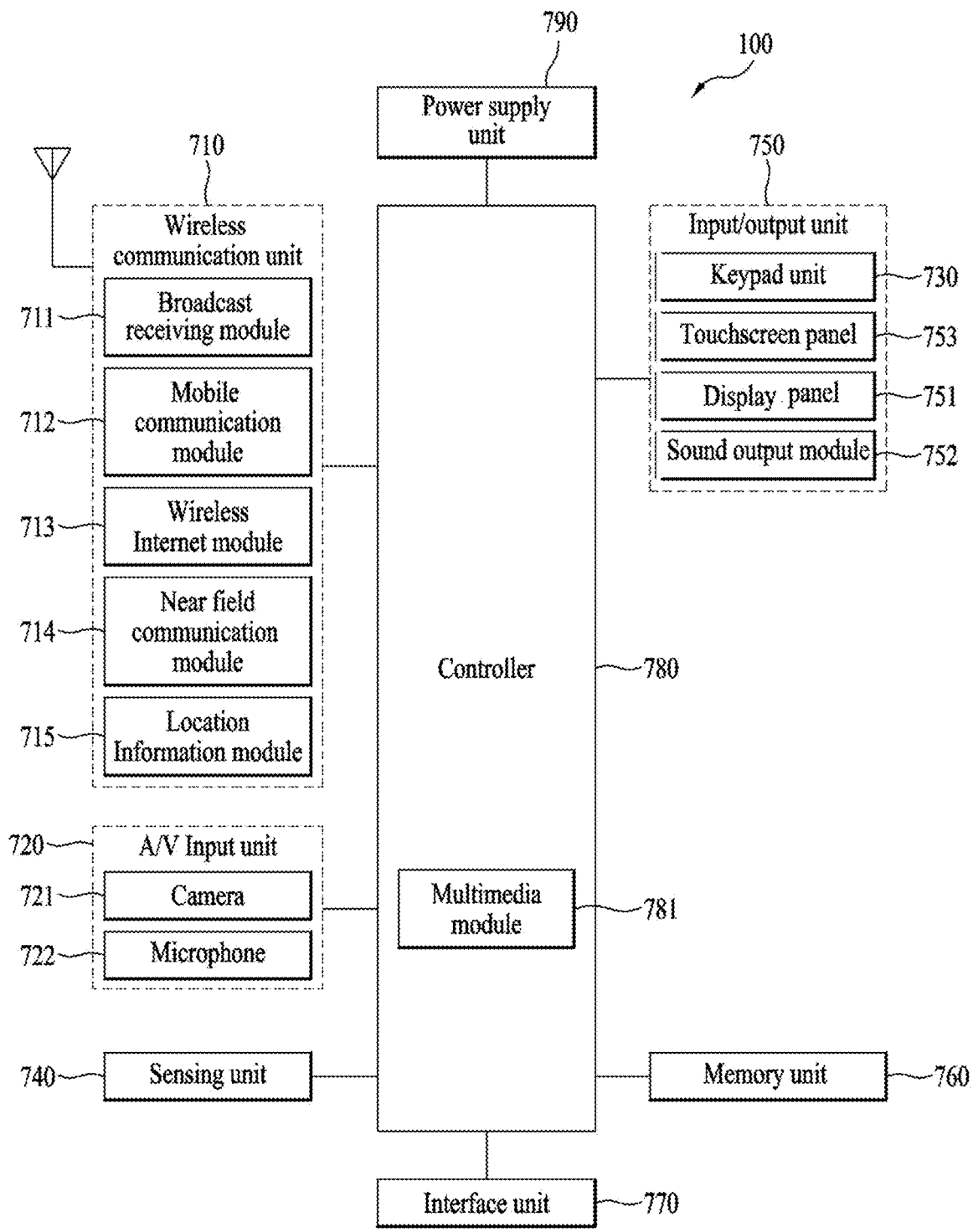
FIG. 39 is a view illustrating the configuration of the portable terminal illustrated in FIG. 28.

FIG. 38 is a perspective view illustrating a portable terminal 200A according to an embodiment. FIG. 39 is a view illustrating the configuration of the portable terminal 200A illustrated in FIG. 38.

Referring to FIGS. 38 and 39, the portable terminal 200A (hereinafter referred to as a "terminal") may include a body 850, a wireless communication unit 710, an audio/video (A/V) input unit 720, a sensing unit 740, an input/output unit 750, a memory unit 760, an interface unit 770, a controller 780, and a power supply unit 790.

The body 850 illustrated in FIG. 38 has a bar shape, without being limited thereto, and may be any of various types such as, for example, a slide type, a folder type, a swing type, or a swivel type, in which two or more subbodies are coupled so as to be movable relative to each other.

The body 850 may include a case (e.g. casing, housing, or cover) defining the external appearance of the terminal. For example, the body 850 may be divided into a front case 851 and a rear case 852. A variety of electronic components of the terminal may be mounted in the space defined between the front case 851 and the rear case 852.

The wireless communication unit 710 may include one or more modules, which enable wireless communication between the terminal 200A and a wireless communication system or between the terminal 200A and a network in which the terminal 200A is located. For example, the wireless communication unit 710 may include a broadcast receiving module 711, a mobile communication module 712, a wireless Internet module 713, a near field communication module 714, and a location information module 715.

The A/V input unit 720 serves to input audio signals or video signals, and may include, for example, a camera 721 and a microphone 722.

The camera 721 may be the camera 200 including the camera module 200 according to the embodiment illustrated in FIG. 37.

The sensing unit 740 may sense the current state of the terminal 200A, such as, for example, the opening or closing of the terminal 200A, the location of the terminal 200A, the presence of a user's touch, the orientation of the terminal 200A, or the acceleration/deceleration of the terminal 200A, and may generate a sensing signal to control the operation of the terminal 200A. For example, when the terminal 200A is a slide-type phone, the sensing unit 740 may detect whether the slide-type phone is open or closed. In addition, the sensing unit 740 serves to sense, for example, whether power is supplied from the power supply unit 790, or whether the interface unit 770 is coupled to an external component.

The input/output unit 750 serves to generate, for example, visual, audible, or tactile input or output. The input/output unit 750 may generate input data to control the operation of the terminal 200A, and may display information processed in the terminal 200A.

The input/output unit 750 may include a keypad unit 730, a display module 751, a sound output module 752, and a touchscreen panel 753. The keypad unit 730 may generate input data in response to input to a keypad.

The display module 751 may include a plurality of pixels, the color of which varies in response to electrical signals. For example, the display module 751 may include at least one of a liquid crystal display, a thin film transistor liquid crystal display, an organic light emitting diode display, a flexible display and a 3D display.

The sound output module 752 may output audio data received from the wireless communication unit 710 in, for example, a call signal receiving mode, a call mode, a recording mode, a voice recognition mode, or a broadcast receiving mode, or may output audio data stored in the memory unit 760.

The touchscreen panel 753 may convert variation in capacitance, caused by a user's touch on a specific region of a touchscreen, into electrical input signals.

The memory unit 760 may store programs for the processing and control of the controller 780, and may temporarily store input/output data (e.g. a phone book, messages, audio, still images, pictures, and moving images). For example, the memory unit 760 may store images captured by the camera 721, for example, pictures or moving images.

The interface unit 770 serves as a passage for connection between the terminal 200A and an external component. The interface unit 770 may receive power or data from the external component, and may transmit the same to respective constituent elements inside the terminal 200A, or may transmit data inside the terminal 200A to the external component. For example, the interface unit 770 may include, for example, a wired/wireless headset port, an external charger port, a wired/wireless data port, a memory card port, a port for the connection of a device having an identification module, an audio input/output (I/O) port, a video I/O port, and an earphone port.

The controller 780 may control the general operation of the terminal 200A. For example, the controller 780 may perform control and processing related to, for example, voice calls, data communication, and video calls.

The controller 780 may include a multimedia module 781 for multimedia playback. The multimedia module 781 may be provided inside the controller 780, or may be provided separately from the controller 780.

The controller 780 may perform pattern recognition processing, by which writing or drawing, input to a touchscreen is perceived as characters and images respectively.

For example, the controller 780 may drive signals to drive the first coil 120, 1120 or 3120 or the third coil 230 of the lens moving apparatus 430 to the camera module 200 included in the camera 721. Furthermore, the controller 780 may receive a signal (induction voltage) output from the second coil 172, 1172 or 3172.

The power supply unit 790 may supply power required to operate the respective constituent elements upon receiving external power or internal power under the control of the controller 780.

The features, configurations, effects and the like described above in the embodiments are included in at least one embodiment, and but are not necessary to be limited to only one embodiment. In addition, the features, configuration, effects and the like exemplified in the respective embodiments may be combined with other embodiments or modified by those skilled in the art. Accordingly, content related to these combinations and modifications should be construed as falling within the scope of the embodiments.

INDUSTRIAL APPLICABILITY

The embodiments may be applied to a lens moving device capable of suppressing malfunction of OIS operation, error in output of a position sensor or noise generation in output of an image sensor, and a camera module and an optical device including the lens moving apparatus.

The invention claimed is:

1. A lens moving apparatus comprising:
   a housing;
   a bobbin disposed in the housing, to which a lens is mounted;
   a first coil disposed on an outer peripheral surface of the bobbin, wherein a first drive signal is applied to the first coil;
   a magnet disposed on the housing;
   a second coil disposed on the housing;
   a magnetic member attached to the second coil;
   a circuit board disposed below the housing and conductively connected to the second coil; and
   a third cod disposed on the circuit board and facing the magnet,
   wherein the bobbin is movable in a first direction via an electromagnetic interaction with the first coil and the magnet,
   wherein the second coil is configured to generate an induced voltage by an interaction with the first coil for detecting a displacement of the bobbin, and
   wherein the magnetic member is configured to increase an intensity of the induced voltage.

2. The lens moving apparatus according to claim 1, wherein the housing includes a mounting portion, the mounting portion including:
   a support surface positioned under a peripheral region of an upper surface of the housing and having a height difference with respect to the upper surface in an optical-axis direction; and
   a side surface positioned between the upper surface and the support surface,
   wherein the magnetic member and the second coil are disposed on the mounting portion.

3. The lens moving apparatus according to claim 1, wherein each of the second coil and the magnetic member has a ring shape.

4. The lens moving apparatus according to claim 2, wherein the second coil is disposed above the magnetic member.

5. The lens moving apparatus according to claim 2, wherein the magnetic member is disposed above the second coil.

6. The lens moving apparatus according to claim 1, wherein the magnetic member surrounds a side portion of the second coil.

7. The lens moving apparatus according to claim 1, wherein the second coil surrounds a side portion of the magnetic member.

8. The lens moving apparatus according to claim 1, wherein the magnetic member includes a plurality of magnetic segments disposed on a side portion of the housing so as to be spaced apart from each other.

9. The lens moving apparatus according to claim 1, comprising:
   an upper elastic member coupled to the housing and the bobbin; and
   a support member conductively connecting the upper elastic member and the circuit board,
   wherein the circuit board is configured to receive the induced voltage.

10. The lens moving apparatus according to claim 9, wherein the upper elastic member comprises first to fourth elastic members coupled to an upper portion of the bobbin and an upper portion of the housing,
    wherein the support member comprises first to fourth supporting members conductively connected to the first to fourth elastic members, respectively, and wherein the first coil is conductively connected to the first and second elastic members, and the third and fourth elastic members are conductively connected to the second coil.

11. The lens moving apparatus according to claim 1, comprising:
a base disposed under the circuit board; and
a position sensor disposed between the circuit board and the base and conductively connected to the circuit board, and
wherein the third coil is conductively connected to the circuit board, and a second drive signal is applied to the third coil to move the housing by an interaction between the magnet and the third coil.

12. The lens moving apparatus according to claim 1, wherein the magnetic member is a ferrite core or an iron core.

13. The lens moving apparatus according to claim 1, wherein each of the second coil and the magnetic member has a square shape.

14. The lens moving apparatus according to claim 1, wherein each of the second coil and the magnetic member is configured to have a shape with at least four sides.

15. A camera module comprising:
a lens;
the lens moving apparatus according to claim 1; and
an image sensor.

16. A lens moving apparatus comprising:
a housing;
a bobbin disposed in the housing;
a first coil disposed on an outer peripheral surface of the bobbin, configured to receive a first drive signal applied to the first coil;
a magnet disposed on a side portion of the housing;
a base disposed under the housing;
a second coil disposed on the base; and
a magnetic member disposed on the second coil,
wherein the bobbin is movable in a first direction via an electromagnetic interaction between the first coil and the magnet,
wherein the second coil is configured to generate an induced voltage by an interaction with the first coil for detecting a displacement of the bobbin, and
wherein the magnetic member is configured to increase an intensity of the induced voltage.

17. The lens moving apparatus according to claim 16, wherein the base includes a groove formed in an outer surface thereof, and the second coil is disposed in the groove.

18. A lens moving apparatus comprising:
a housing;
a bobbin disposed in the housing;
a first coil disposed on the bobbin;
a magnet disposed on a side portion of the housing, configured to apply a first drive signal to the first coil;
a second coil disposed on the housing;
an upper elastic member coupled to an upper portion of the bobbin and an upper portion of the housing and comprising a first elastic member, a second elastic member, a third elastic member, and a fourth elastic member;
a lower elastic member coupled to a lower portion of the bobbin and a lower portion of the housing;
a circuit member disposed under the lower elastic member and including a third coil;
a circuit board disposed under the circuit member;
a base disposed under the circuit board;
a support member comprising first to fourth supporting members corresponding to the first to fourth elastic members, respectively; and
a magnetic member disposed on the second coil,
wherein the bobbin is movable in a first direction via an electromagnetic interaction between the first coil and the magnet,
wherein the second coil is configured to generate an induced voltage by an interaction with the first coil for detecting a displacement of the bobbin,
wherein the magnetic member is configured to increase an intensity of the induced voltage,
wherein the first and second elastic members are connected to the first coil,
wherein the third and fourth elastic members are connected to the second coil, and
wherein each of the first to fourth supporting members connects the corresponding one of the first to fourth elastic members to the circuit board, respectively.

19. The lens moving apparatus according to claim 16, comprising a lower elastic member coupled to a lower portion of the bobbin and a lower portion of the housing,
wherein the second coil and the magnetic member are disposed between the lower elastic member and the base.

20. The lens moving apparatus according to claim 16, comprising a circuit board having terminals conductively connected to the second coil, and
wherein the induced voltage is output to the terminals.

* * * * *